(12) United States Patent
Taraschi et al.

(10) Patent No.: US 9,128,289 B2
(45) Date of Patent: Sep. 8, 2015

(54) DISPLAY APPARATUS INCORPORATING HIGH-ASPECT RATIO ELECTRICAL INTERCONNECTS

(71) Applicant: Pixtronix, Inc., San Diego, CA (US)

(72) Inventors: Gianni Taraschi, Arlington, MA (US); Mark B. Andersson, Northborough, MA (US); Jasper Lodewyk Steyn, Winchester, MA (US)

(73) Assignee: Pixtronix, Inc., San Diego, CA (US)

( * ) Notice: Subject to any disclaimer, the term of this patent is extended or adjusted under 35 U.S.C. 154(b) by 367 days.

(21) Appl. No.: 13/730,359

(22) Filed: Dec. 28, 2012

(65) Prior Publication Data

US 2014/0185121 A1    Jul. 3, 2014

(51) Int. Cl.
G02B 26/02     (2006.01)
G02B 26/04     (2006.01)

(52) U.S. Cl.
CPC ..................................... *G02B 26/04* (2013.01)

(58) Field of Classification Search
CPC ............... H01L 2924/0002; H01L 2924/00; H01L 23/481; H05K 1/02; H05K 1/0296; B81C 1/00095; G02B 26/04; G02B 26/02; B81B 2201/047; B81B 2207/07
USPC ............... 359/230, 238, 291; 345/48, 84, 204
See application file for complete search history.

(56) References Cited

U.S. PATENT DOCUMENTS

| | | | |
|---|---|---|---|
| 6,060,383 A | 5/2000 | Nogami et al. | |
| 6,181,011 B1 | 1/2001 | Rostoker et al. | |
| 6,566,251 B2 | 5/2003 | Allen et al. | |
| 6,731,513 B2 | 5/2004 | Rodgers et al. | |
| 7,161,226 B2 | 1/2007 | Chen et al. | |
| 7,330,166 B2 | 2/2008 | Marcotte | |
| 7,580,172 B2 | 8/2009 | Lewis et al. | |
| 7,706,042 B2 | 4/2010 | Chung et al. | |
| 7,812,918 B2 | 10/2010 | Choi et al. | |
| 7,867,891 B2 | 1/2011 | O'brien et al. | |
| 8,097,174 B2 | 1/2012 | Chung et al. | |
| 8,102,059 B2 | 1/2012 | Inohara | |
| 2002/0061392 A1 | 5/2002 | Jacobsen et al. | |
| 2006/0073670 A1 | 4/2006 | Bae et al. | |
| 2006/0118604 A1 | 6/2006 | Buchwalter et al. | |

(Continued)

FOREIGN PATENT DOCUMENTS

| | | |
|---|---|---|
| EP | 1986180 A2 | 10/2008 |
| TW | 451111 | 8/2001 |

(Continued)

OTHER PUBLICATIONS

Taiwan Search Report—TW102147850—TIPO—Dec. 11, 2014.

(Continued)

*Primary Examiner* — James Phan

(74) *Attorney, Agent, or Firm* — Edward A. Gordon; Foley & Lardner LLP

(57) ABSTRACT

This disclosure provides systems, methods and apparatus for enabling a display to have a faster switching rate and an increased aperture ratio by using looped electrical interconnects with a reduced footprint. In one aspect, a display apparatus includes an array of display elements and a high-aspect ratio electrical interconnect connected to at least one display element in the array of display elements, wherein the high-aspect ratio electrical interconnect forms a loop that defines a closed boundary.

13 Claims, 39 Drawing Sheets

(56) References Cited

U.S. PATENT DOCUMENTS

| | | |
|---|---|---|
| 2007/0019280 A1 | 1/2007 | Sasagawa et al. |
| 2007/0086078 A1 | 4/2007 | Hagood et al. |
| 2008/0037104 A1 | 2/2008 | Hagood et al. |
| 2008/0158635 A1 | 7/2008 | Hagood et al. |
| 2008/0158636 A1 | 7/2008 | Hagood et al. |
| 2008/0186298 A1 | 8/2008 | Mamiya et al. |
| 2008/0238836 A1 | 10/2008 | Uchino et al. |
| 2008/0251281 A1 | 10/2008 | Buchwalter et al. |
| 2008/0266474 A1 | 10/2008 | Hazeyama |
| 2008/0290756 A1 | 11/2008 | Huang |
| 2009/0072407 A1 | 3/2009 | Furman et al. |
| 2009/0244678 A1 | 10/2009 | Hagood, IV et al. |
| 2010/0014146 A1 | 1/2010 | Lan |
| 2010/0320606 A1 | 12/2010 | Jain et al. |
| 2011/0049648 A1 | 3/2011 | Geisberger |
| 2011/0157679 A1 | 6/2011 | Fike, III et al. |
| 2011/0235147 A1 | 9/2011 | Lee et al. |
| 2011/0279356 A1 | 11/2011 | Takemura |
| 2012/0081348 A1 | 4/2012 | Tung |
| 2014/0071142 A1 | 3/2014 | Steyn |

FOREIGN PATENT DOCUMENTS

| | | |
|---|---|---|
| TW | 560801 | 11/2003 |
| TW | 200632492 | 9/2006 |
| WO | 2014042991 | 3/2014 |

OTHER PUBLICATIONS

Partial International Search Report—PCT/US2013/077490—ISA/EPO—Apr. 24, 2014.

International Search Report and Written Opinion—PCT/US2013/077490—ISA/EPO—Jul. 4, 2014.

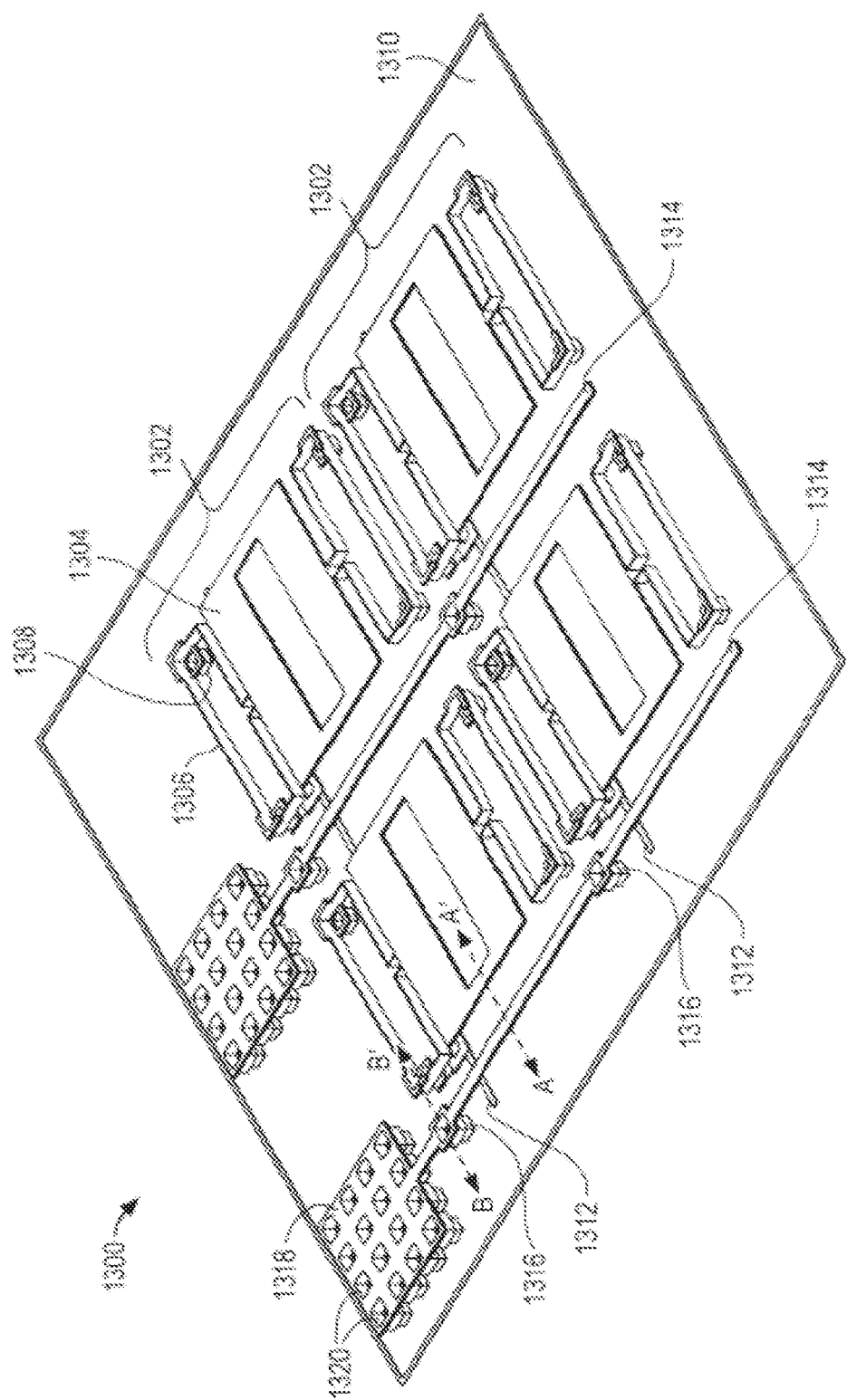

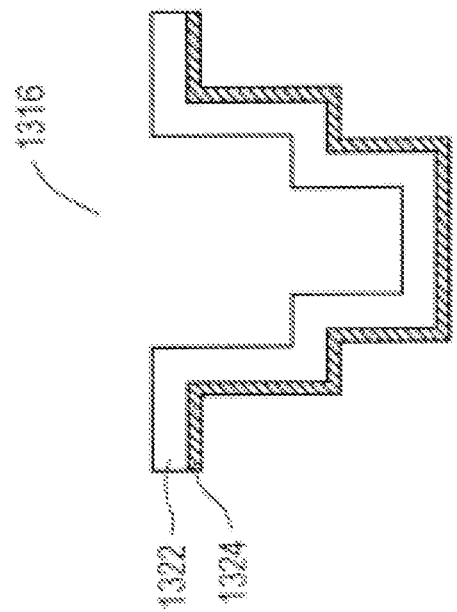
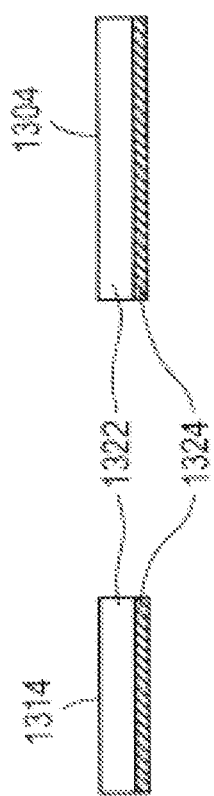

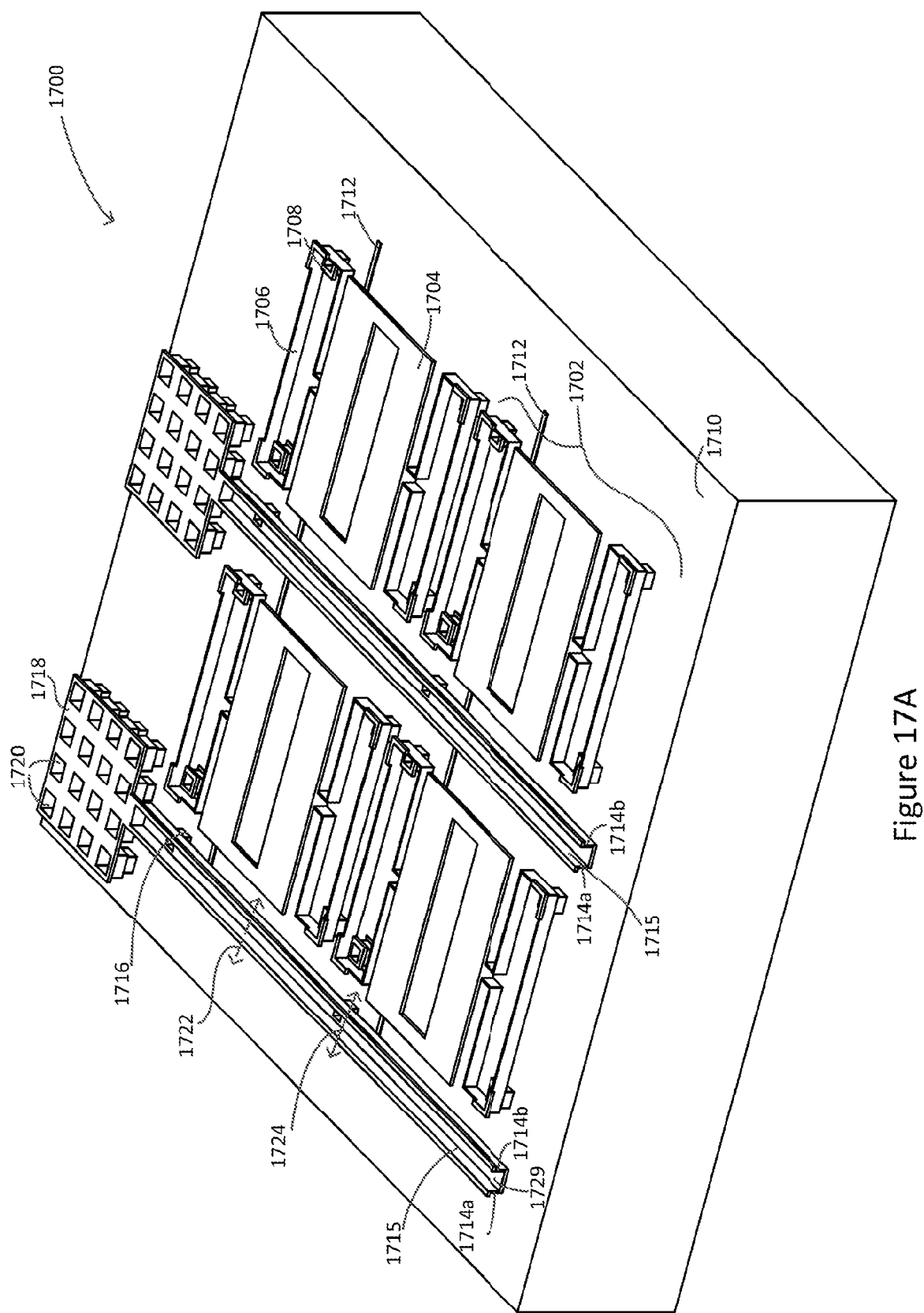

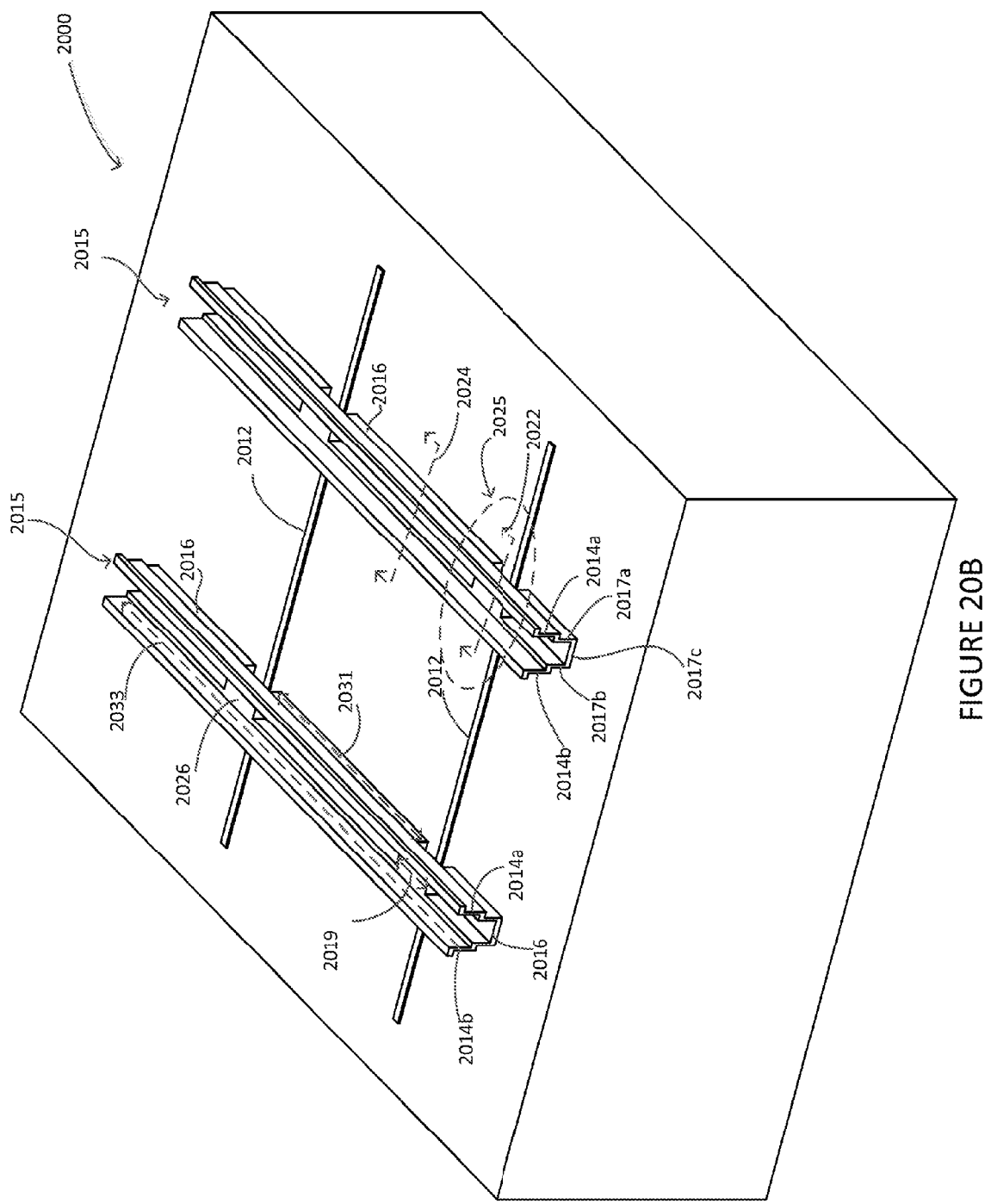

DISPLAY APPARATUS INCORPORATING HIGH-ASPECT RATIO ELECTRICAL INTERCONNECTS

TECHNICAL FIELD

This disclosure relates to displays, and in particular, to electrical interconnects for displays.

DESCRIPTION OF THE RELATED TECHNOLOGY

The properties of electrical interconnects in a display can affect the power and time necessary to address the display. The addressing time and power are dependent on factors including a cross sectional area of the interconnect, conductivities of materials forming the interconnect, and any parasitic capacitance resulting from adjacent interconnects and other metal layers.

SUMMARY

The systems, methods and devices of the disclosure each have several innovative aspects, no single one of which is solely responsible for the desirable attributes disclosed herein.

One innovative aspect of the subject matter described in this disclosure can be implemented in a display apparatus that includes a substrate and an array of display elements formed on the substrate. The display apparatus also includes a high-aspect ratio electrical interconnect connected to at least one display element in the array of display elements. The high-aspect ratio electrical interconnect has an aspect ratio that is greater than at least about 1:1 and less than about 10:1. The electrical interconnect is elevated over the substrate by a plurality of base structures. A length of at least one of the plurality of base structures in a direction towards a neighboring base structure is greater than about 25% and less than about 95% of a length of a gap separating the neighboring base structures. In some implementations, the length of the first base structure is greater than about 90% and less than about 95% of the length of the gap separating the neighboring base structures.

In some implementations, the electrical interconnect forms a loop that defines a closed boundary. In some implementations, a portion of the elevated interconnect is supported by the base structures and another portion of the elevated interconnect is suspended over the substrate. In some implementations, the base structures are electrically conductive.

In some implementations, the display apparatus includes another electrical interconnect that extends crosswise relative to the electrical interconnect, and the other electrical interconnect extends below the electrical interconnect and through a gap separating neighboring base structures. In some implementations, the elevated electrical interconnect includes a pair of interconnect sections connected to one another at a first end portion.

In some implementations, the interconnect sections are connected to one another by the base structures along portions of the electrical interconnect where the base structures support the electrical interconnect. The interconnects are connected to one another by a horizontal bridge section that is suspended over the substrate along portions of the electrical interconnect where the electrical interconnect is suspended over the substrate. In some implementations, each of the pair of interconnect sections has a cross sectional aspect ratio that is greater than 1:1 and less than about 10:1.

In some implementations, each of the display elements includes at least one light modulator. In some such implementations, each of the display elements includes a shutter-based light modulator. In some such implementations, at least one layer of the electrical interconnect is formed from the same material as a corresponding layer of the shutter-based light modulator. In some implementations, the electrical interconnect and the shutter-based light modulator are suspended at substantially the same height over the substrate.

In some implementations, the electrical interconnect is connected to at least one of a row of display elements in the array of display elements and a column of display elements in the array of display elements. In some implementations, the display apparatus includes an array of thin film transistors connected to the array of display elements and the electrical interconnect is connected to the at least one display element through at least one thin film transistor in the array of thin film transistors.

In some implementations, the display apparatus includes a processor that is configured to communicate with the display and configured to process image data. The display apparatus also includes a memory device that is configured to communicate with the processor. In some such implementations, the display apparatus includes a driver circuit configured to send at least one signal to the display apparatus and a controller configured to send at least a portion of the image data to the driver circuit.

In some implementations, the display apparatus includes an image source module configured to send the image data to the processor. The image source module includes at least one of a receiver, transceiver, and transmitter. In some implementations, the display apparatus includes an input device configured to receive input data and to communicate the input data to the processor.

Another innovative aspect of the subject matter described in this disclosure can be implemented in a display apparatus including an array of display elements and a high-aspect ratio electrical interconnect connected to at least one display element in the array of display elements. The high-aspect ratio electrical interconnect forms a loop that defines a closed boundary. The high-aspect ratio electrical interconnect has an aspect ratio that is greater than at least about 1:1 and less than about 10:1. In some implementations, the display apparatus includes a substrate over which the array of display elements is formed. In some implementations, the electrical interconnect is suspended over the substrate. In some such implementations, the display apparatus further includes a plurality of anchors that are spaced apart from one another along the substrate, and wherein the electrical interconnect is suspended over the substrate by the anchors. In some implementations, the anchors are electrically conductive. In some implementations, the display apparatus includes another electrical interconnect that extends crosswise relative to the electrical interconnect, and the other electrical interconnect extends below the electrical interconnect and through a gap separating neighboring anchors.

In some implementations, a length of at least one of the anchors in a direction towards a neighboring anchor is less than about 50% and greater than about 5% of a length of a gap separating the neighboring anchors. In some implementations, a length of at least one of the anchors in a direction towards a neighboring anchor is less than about 10% and greater than about 5% of a length of the gap separating the neighboring anchors. In some implementations, a length of at least one of the anchors in a direction towards a neighboring anchor is greater than about 25% and less than about 95% of a length of the gap separating the neighboring anchors. In some implementations, a length of at least one of the plurality of anchors in a direction towards a neighboring anchor is greater than about 90% and less than 95% of a length of the gap separating the neighboring anchors.

In some implementations, the electrical interconnect includes a pair of interconnect sections connected to one another at a first end portion. In some implementations, each of the pair of interconnect sections has a cross sectional aspect ratio that is greater than 1:1 and less than about 10:1. In some implementations, each of the pair of interconnect sections has a cross sectional aspect ratio that is greater than at least 2:1 and less than about 5:1.

Another innovative aspect of the subject matter described in this disclosure can be implemented in a method of manufacturing a display assembly. A mold material is deposited over a substrate to form a mold. The mold is patterned to form an opening having a length in a direction towards a neighboring opening that is greater than about 25% of a length of a gap separating the neighboring openings. The mold is patterned to form a trench having a sidewall and a bottom. A portion of the trench is formed over the opening. An interconnect material is deposited on exposed surfaces of the mold. The interconnect material deposited on the exposed surfaces of the mold is then removed while retaining at least a portion of the interconnect material deposited on the exposed surfaces defining the opening to form an electrical interconnect supported over an underlying substrate by a base structure formed in a portion of the opening.

In some implementations, the interconnect material deposited on the exposed surfaces of the mold is removed while retaining at least a portion of the interconnect material deposited adjacent to the sidewall to form a looped electrical interconnect. In some implementations, depositing the mold material includes depositing a first mold material and a second mold material. In some implementations, the first mold material is patterned to form an opening corresponding to the base structure for supporting the electrical interconnect.

Details of one or more implementations of the subject matter described in this specification are set forth in the accompanying drawings and the description below. Although the examples provided in this summary are primarily described in terms of EMS-based displays, the concepts provided herein may apply to other types of displays, such as liquid crystal displays (LCD), organic light emitting diode (OLED) displays, electrophoretic displays, and field emission displays, as well as to other non-display EMS devices, such as EMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

FIG. 13A shows an example perspective view of an EMS-based display apparatus incorporating suspended interconnects.

FIG. 13B shows a cross sectional view of a portion of the display apparatus of FIG. 13A.

FIG. 13C shows a cross sectional view of another portion of the display apparatus of FIG. 13A.

FIG. 17A shows an example perspective view of an EMS-based display apparatus incorporating looped column interconnects.

FIG. 20B shows a perspective view of the display apparatus of FIG. 20A.

Like reference numbers and designations in the various drawings indicate like elements.

DETAILED DESCRIPTION

Figure 1A:
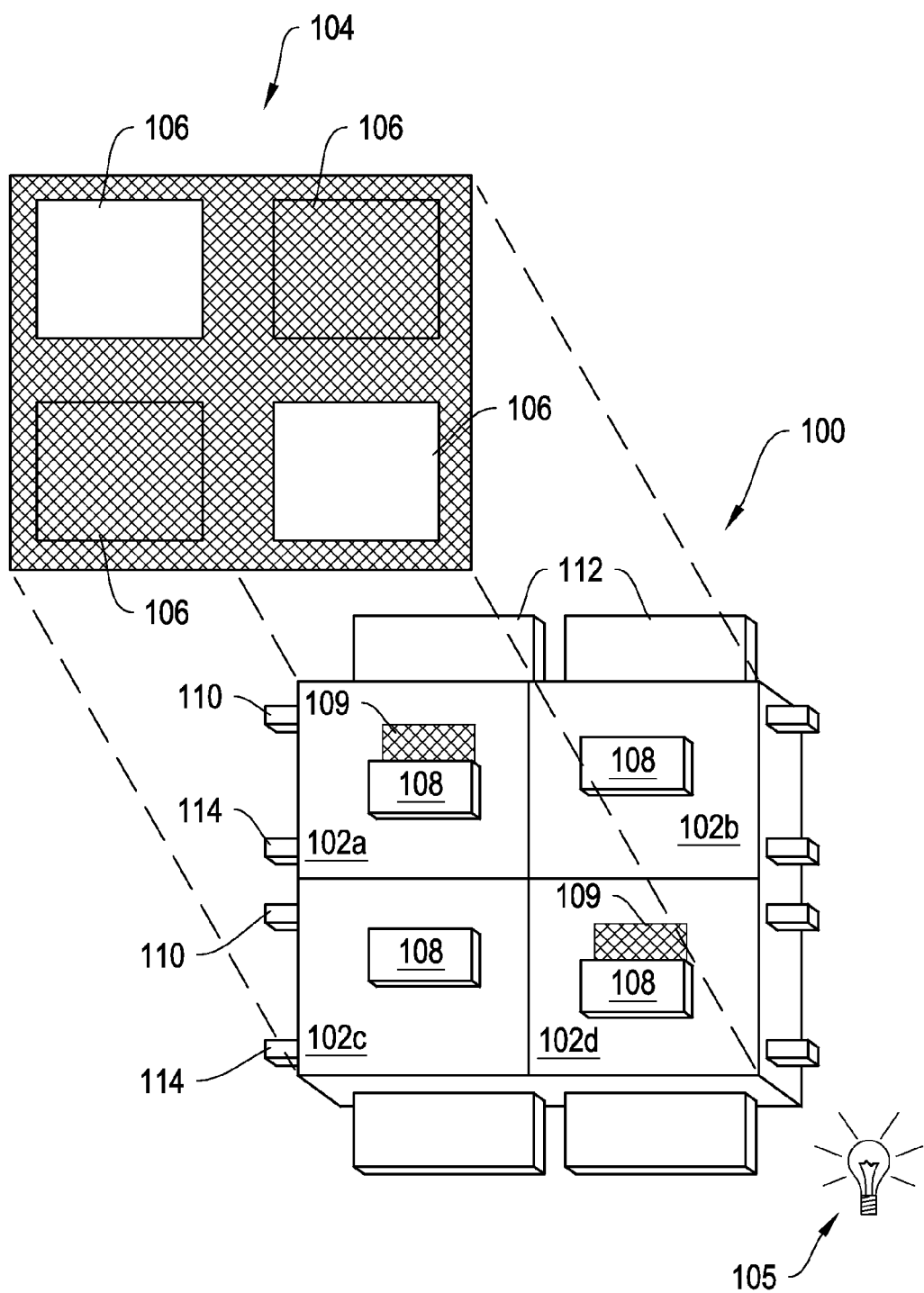
FIG. 1A shows an example schematic diagram of a direct-view microelectromechanical system (MEMS)-based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations shown solely in the Figures, but instead have wide applicability as will be readily apparent to one having ordinary skill in the art.

To allow manufacturing of a display apparatus with a reduced number of masking stages, high-aspect ratio electrical interconnects can be formed with one or more loops. The inclusion of the loops avoids additional masking stages that otherwise would be involved to isolate sections of the loops. In some implementations, a display apparatus includes an array of display elements and a high-aspect ratio electrical interconnect connected to at least one of the display elements in the array. The electrical interconnect forms a loop that defines a closed boundary in a two dimensional space. In some implementations, the electrical interconnect includes a plurality of elongated interconnect sections that are suspended over an underlying substrate via anchors. In some implementations, the electrical interconnect includes a plurality of elevated interconnect sections that are supported over the underlying substrate via base structures that are substantially larger than the anchors.

To provide a display apparatus with a lower data loading power and/or a lower signal propagation delay, at least a portion of an electrical interconnect is formed so as to have an elevated configuration. In some implementations, an elevated configuration of the electrical interconnect is attained by configuring at least a portion of the electrical interconnect with a cross sectional aspect ratio that is greater than 1:1. For instance, each of the interconnect sections can have an aspect ratio that is greater than 1:1. In other implementations, an elevated configuration of at least a portion of the electrical interconnect is attained by suspending the portion of the electrical interconnect over a substrate by neighboring anchors or base structures. The elevated configuration of the electrical interconnect reduces the capacitive coupling with underlying layers that otherwise can adversely impact the data loading power and/or the signal propagation delay.

Particular implementations of the subject matter described in this disclosure can be implemented to realize one or more of the following potential advantages. By elevating high-aspect ratio electrical interconnects over underlying electrically conducting layers, either by suspending them via anchors, or supporting them via base structures, the distance between the electrical interconnects and the underlying electrically conducting layers is increased. Doing so reduces a capacitive coupling that otherwise could adversely impact data loading power and/or signal propagation rate along the interconnects. As a result, the interconnects can provide a faster signal propagation rate and, therefore, a faster switching rate for a display. By forming high-aspect ratio electrical interconnects, a footprint of electrical interconnects is reduced. A display incorporating such reduced footprint interconnects has more space on a substrate to dedicate to image formation, thereby allowing an increased aperture ratio and a brighter display. Electrical interconnects having such properties can be advantageously incorporated as data interconnects in electromechanical system (EMS) displays, such as MEMS-based displays, as well as other types of displays, such as LCD and OLED displays. Further, fabricating elevated electrical interconnects as loops reduces the cost of the manufacturing process relative to the cost of fabricating the elevated electrical interconnects without loops. This is because an elevated interconnect can be fabricated without additional masking stages if it is configured in the shape of a loop.

In some implementations, the anchors or base structures supporting the looped interconnects may be electrically conductive. As a result, the looped interconnects may be configured to receive electrical signals via the anchors or base structures, thereby allowing the looped interconnects to receive electrical signals from underlying electrical components without having to form separate electrical components solely for providing electrical signals to the looped interconnects. In some such implementations, row interconnects may extend through gaps that separate the anchors or base structures that suspend the electrical interconnect over the underlying row interconnects. This reduces the capacitive coupling that otherwise could adversely impact a signal propagation rate of the suspended interconnects and the underlying row interconnects. In some implementations, the anchors may be configured as base structures that have lengths that are greater than 25% of the length of gaps separating the base structures from neighboring base structures. The increased size of the base structures provides increased structural support to the suspended interconnects. In some such implementations where the base structures are electrically conductive, the increased size of the base structures also reduces the electrical resistance of the electrical interconnects, reducing propagation delay.

FIG. 1A shows a schematic diagram of a direct-view microelectromechanical system (MEMS)-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (e.g., interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
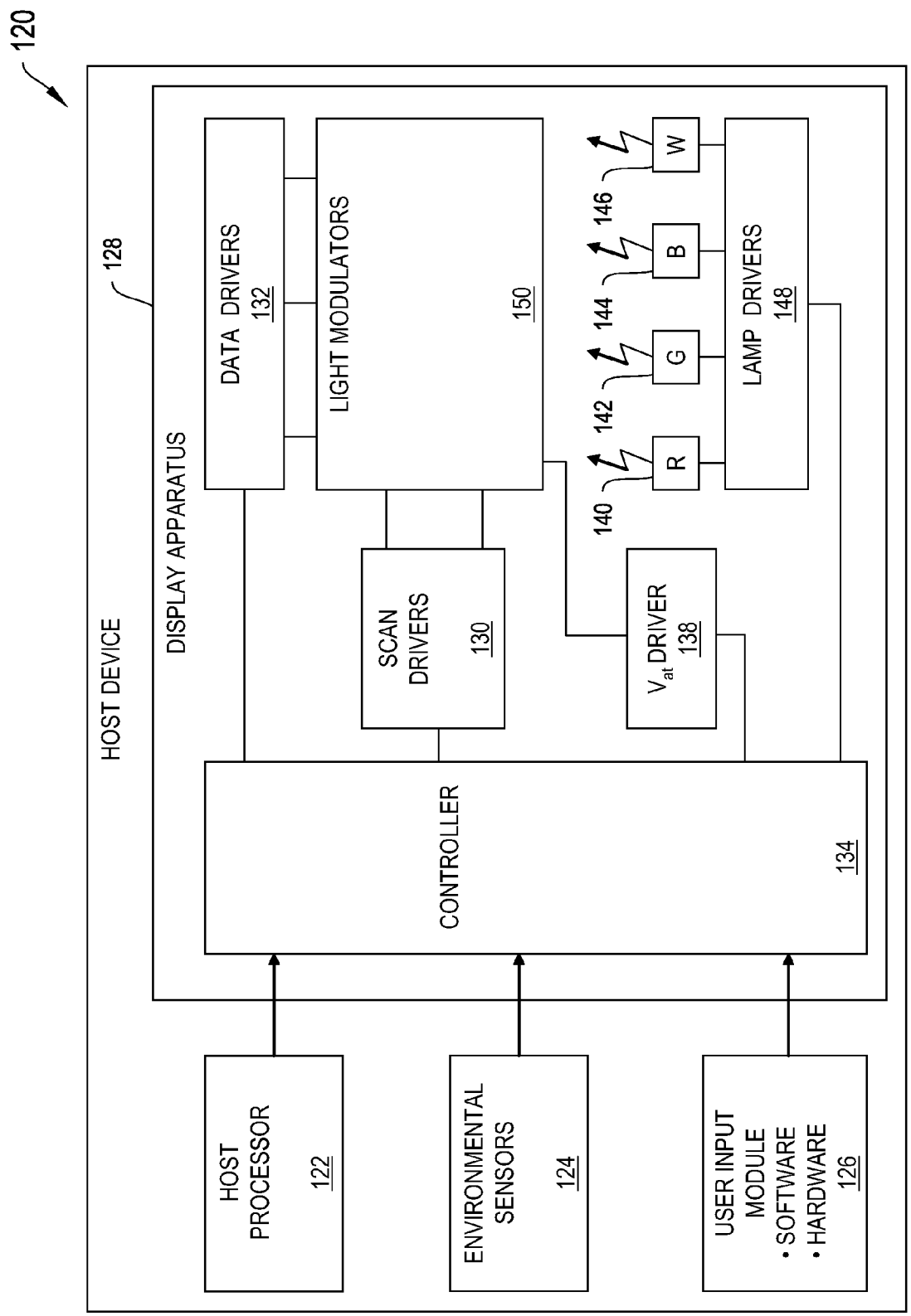
FIG. 1B shows an example block diagram of a host device.

FIG. 1B shows an example of a block diagram 120 of a host device (i.e., cell phone, smart phone, PDA, MP3 player, tablet, e-reader, etc.). The host device 120 includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, and lamp drivers 148. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the light modulators, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all light modulators within the array of light modulators, for instance by supplying voltage to a series of common interconnects 114. In some other implementations, the common drivers 138, following commands from the controller 134, issue voltage pulses or signals to the array of light modulators, for instance global actuation pulses which are capable of driving and/or initiating simultaneous actuation of all light modulators in multiple rows and columns of the array.

All of the drivers (e.g., scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array of pixels, the output of voltages from the data drivers 132, and the output of voltages that provide for light modulator actuation.

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array is synchronized with the illumination of the lamps 140, 142, 144 and 146 such that alternate image frames are illuminated with an alternating series of colors, such as red, green and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the modulator array by a sequential addressing of individual rows, also referred to as scan lines. For each row or scan line in the sequence, the scan driver 130 applies a write-enable voltage to the write enable interconnect 110 for that row of the array, and subsequently the data driver 132 supplies data voltages, corresponding to desired shutter states, for each column in the selected row. This process repeats until data has been loaded for all rows in the array. In some implementations, the sequence of selected rows for data loading is linear, proceeding from top to bottom in the array. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array is separated in time from the process of actuating the shutters 108. In these implementations, the modulator array may include data memory elements for each pixel in the array, and the control matrix may include a global actuation interconnect for carrying trigger signals, from common driver 138, to initiate simultaneous actuation of shutters 108 according to data stored in the memory elements.

In alternative implementations, the array of pixels and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The host processor 122 generally controls the operations of the host. For example, the host processor 122 may be a general or special purpose processor for controlling a portable electronic device. With respect to the display apparatus 128, included within the host device 120, the host processor 122 outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module 126 is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller 134 to provide data to the various drivers 130, 132, 138 and 148 which correspond to optimal imaging characteristics.

An environmental sensor module 124 also can be included as part of the host device. The environmental sensor module 124 receives data about the ambient environment, such as temperature and/or ambient lighting conditions. The sensor module 124 can be programmed to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2:
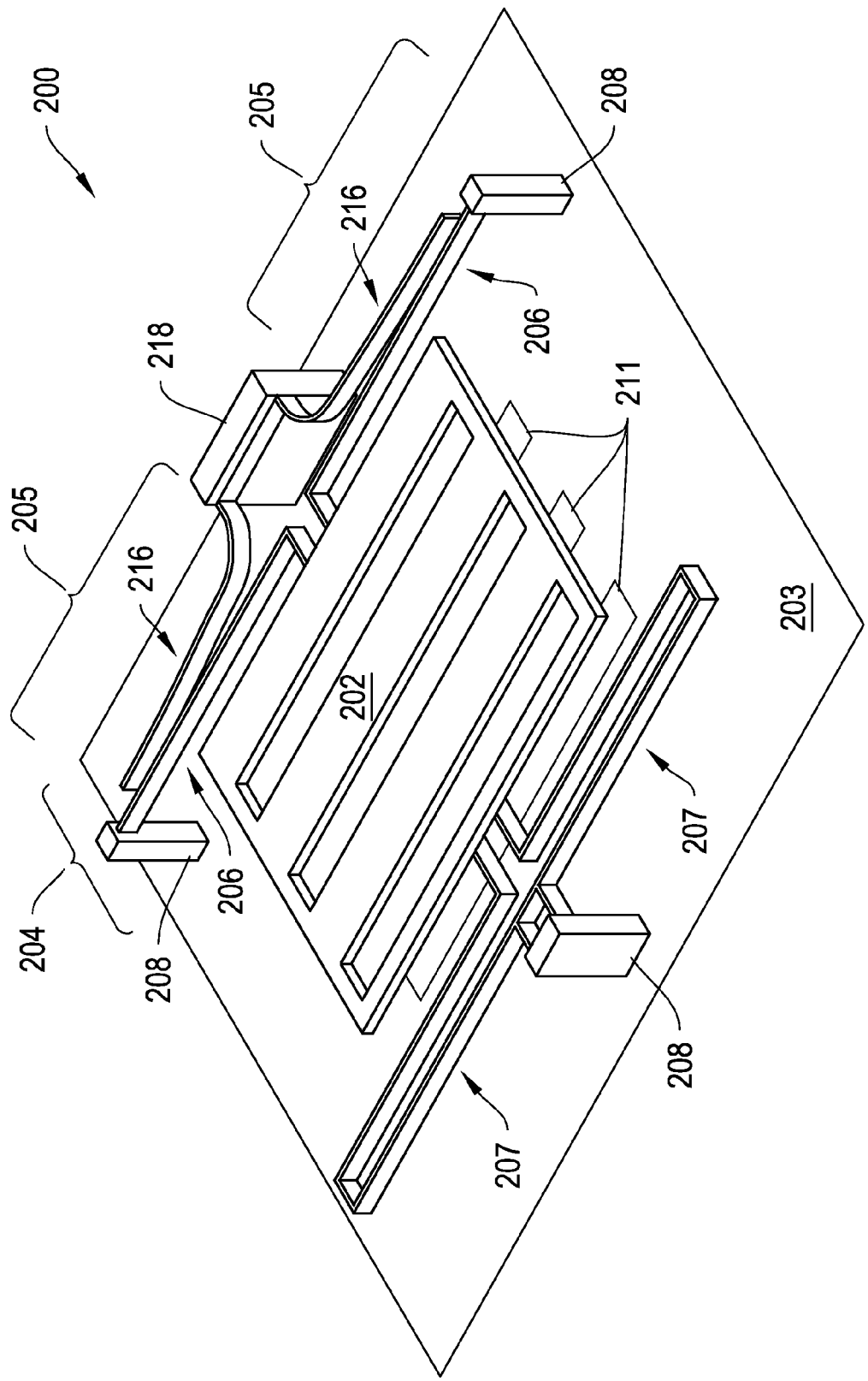
FIG. 2 shows an example perspective view of an illustrative shutter-based light modulator.

FIG. 2 shows a perspective view of an illustrative shutter-based light modulator 200. The shutter-based light modulator 200 is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface 203 includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate. If the substrate is transparent, such as glass or plastic, then the aperture holes 211 are formed in a layer of light-blocking material deposited on the substrate. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely toward the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as the light modulator 200, incorporates a passive restoring force, such as a spring, for returning a shutter to its rest position after voltages have been removed. Other shutter assemblies can incorporate a dual set of "open" and "closed" actuators and separate sets of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases, it is appropriate to include switching and/or data storage elements within each pixel of the array (the so-called active matrix) to improve the speed, the luminance level and/or the power dissipation performance of the display.

Figure 3A:
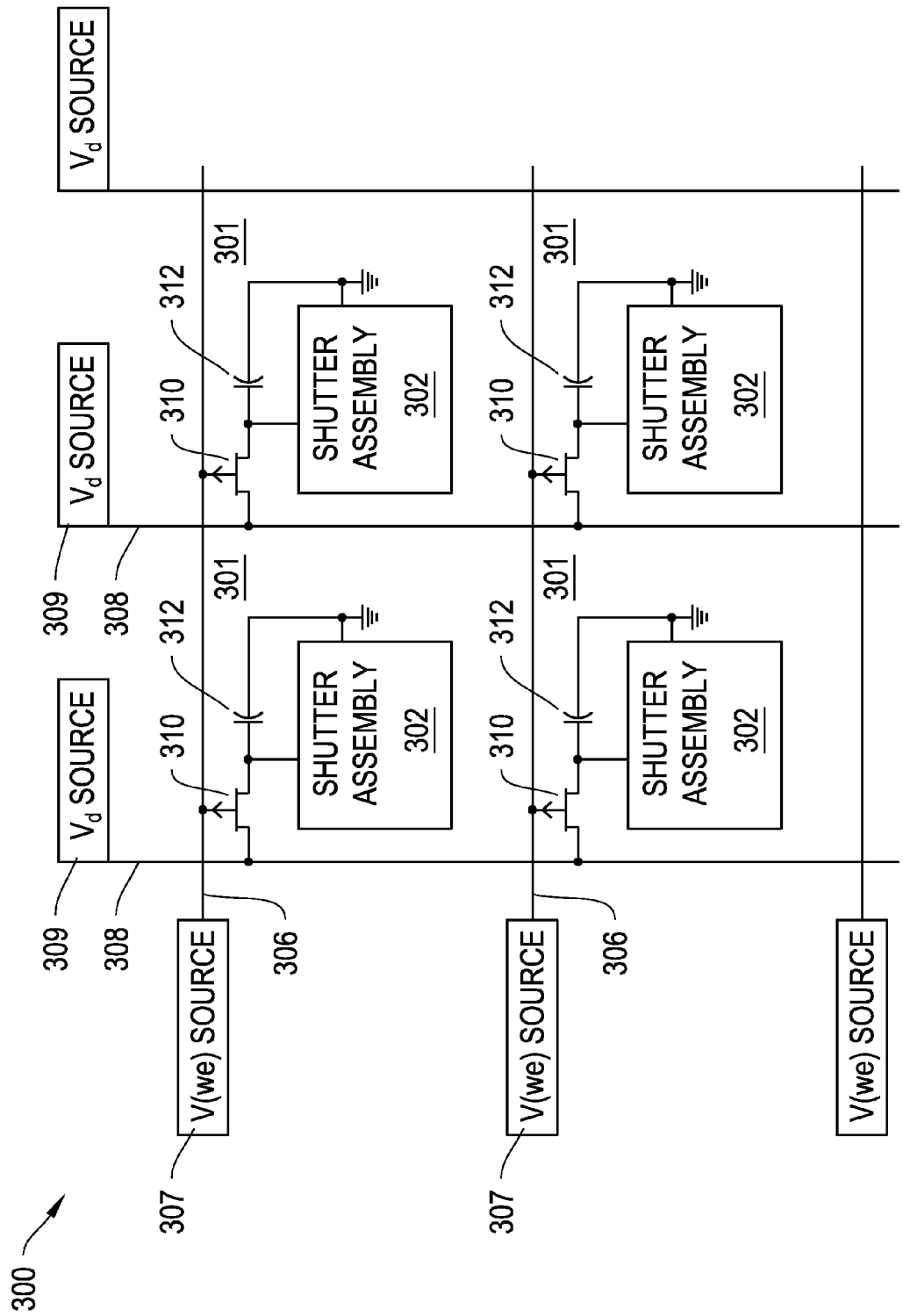
FIG. 3A shows an example schematic diagram of a control matrix.
Figure 3B:
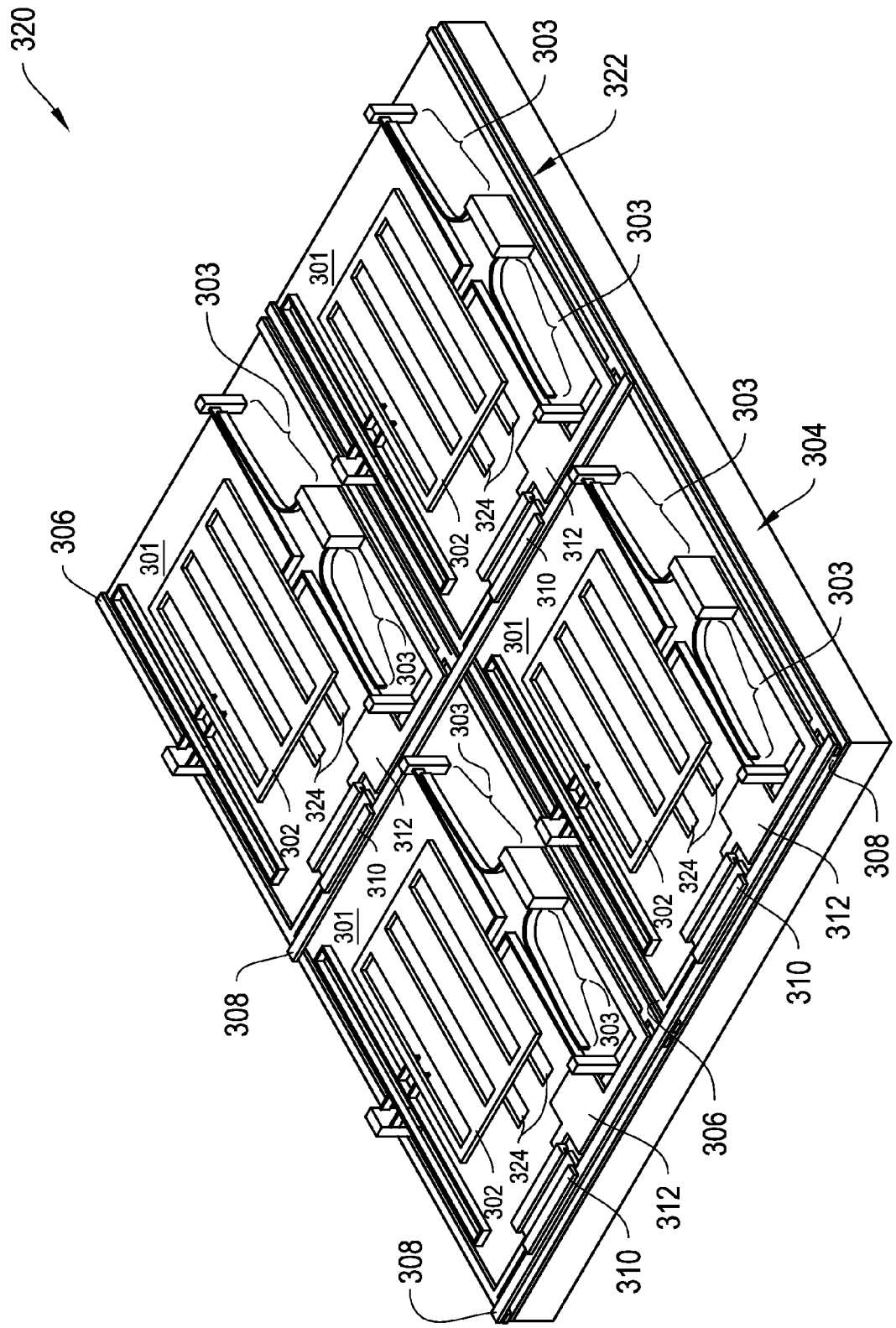
FIG. 3B shows an example perspective view of an array of shutter-based light modulators connected to the control matrix of FIG. 3A.

FIG. 3A shows an example schematic diagram of a control matrix 300. The control matrix 300 is suitable for controlling the light modulators incorporated into the MEMS-based display apparatus 100 of FIG. 1A. FIG. 3B shows a perspective view of an array 320 of shutter-based light modulators connected to the control matrix 300 of FIG. 3A. The control matrix 300 may address an array of pixels 320 (the "array 320"). Each pixel 301 can include an elastic shutter assembly 302, such as the shutter assembly 200 of FIG. 2, controlled by an actuator 303. Each pixel also can include an aperture layer 322 that includes apertures 324.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source 309 ("$V_d$ source") to the pixels 301 in a corresponding column of pixels. In the control matrix 300, the $V_d$ source 309 provides the majority of the energy to be used for actuation of the shutter assemblies 302. Thus, the data voltage source, $V_d$ source 309, also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly actuates, opening the shutter in that shutter assembly 302. The voltage applied to the data interconnect 308 remains stored in the capacitor 312 of the pixel 301 even after the control matrix 300 ceases to apply $V_{we}$ to a row. Therefore, the voltage $V_{we}$ does not have to wait and hold on a row for times long enough for the shutter assembly 302 to actuate; such actuation can proceed after the write-enabling voltage has been removed from the row. The capacitors 312 also function as memory elements within the array 320, storing actuation instructions for the illumination of an image frame.

The pixels 301 as well as the control matrix 300 of the array 320 are formed on a substrate 304. The array 320 includes an aperture layer 322, disposed on the substrate 304, which includes a set of apertures 324 for respective pixels 301 in the array 320. The apertures 324 are aligned with the shutter assemblies 302 in each pixel. In some implementations, the substrate 304 is made of a transparent material, such as glass or plastic. In some other implementations, the substrate 304 is made of an opaque material, but in which holes are etched to form the apertures 324.

The shutter assembly 302 together with the actuator 303 can be made bi-stable. That is, the shutters can exist in at least two equilibrium positions (e.g., open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 also can be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as the spring 207 in the shutter-based light modulator 200 depicted in FIG. 2A, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

Figures 4A, 4B:
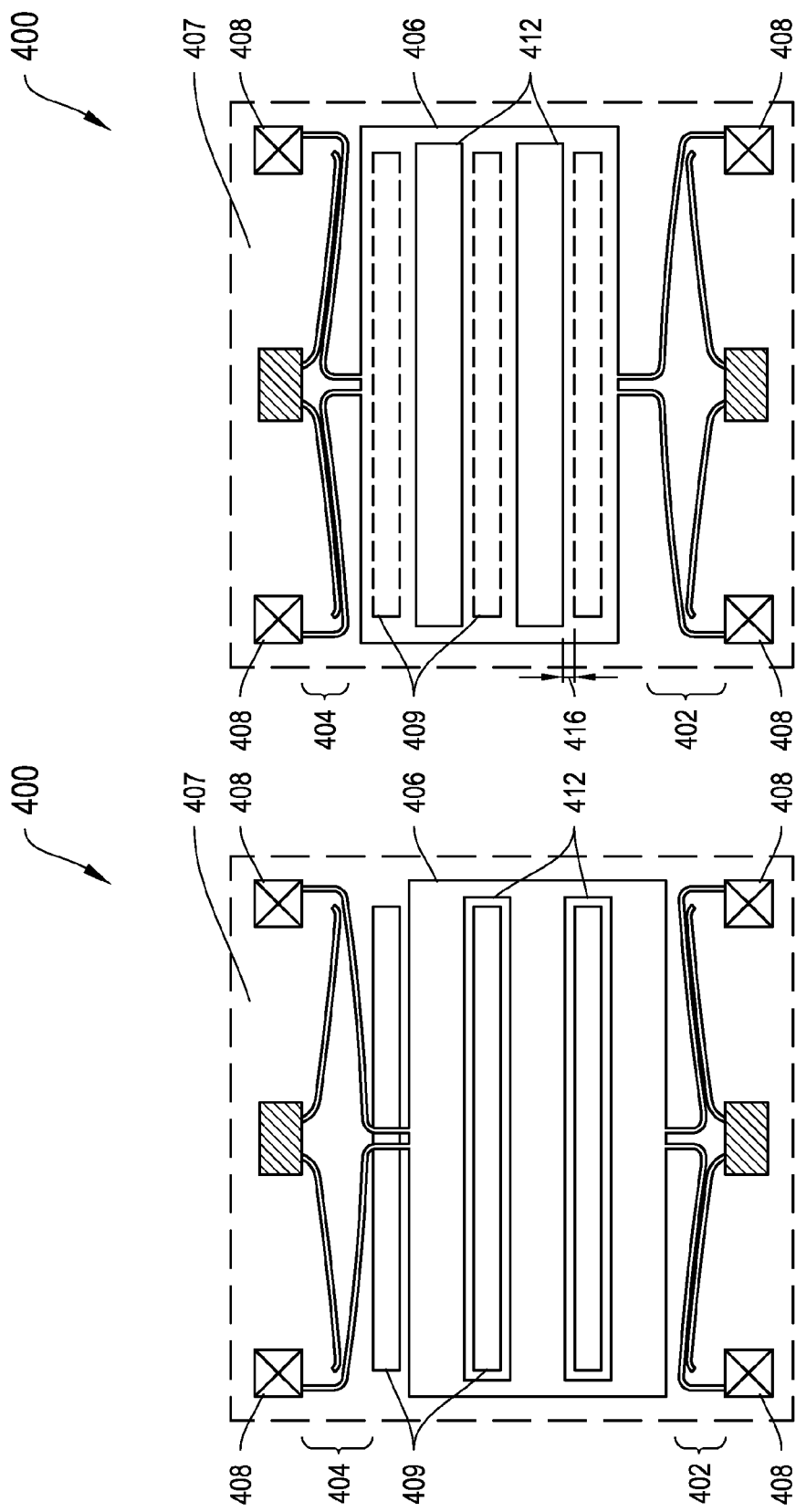
FIG. 4A and FIG. 4B show examples views of a dual actuator shutter assembly.

FIGS. 4A and 4B show example views of a dual actuator shutter assembly 400. The dual actuator shutter assembly 400, as depicted in FIG. 4A, is in an open state. FIG. 4B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with the shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 4B, the shutter assembly 400 has been moved to the closed state and, as such, the shutter-open actuator 402 is in its relaxed position, the shutter-close actuator 404 has been actuated, and the light blocking portions of the shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in the aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 5:
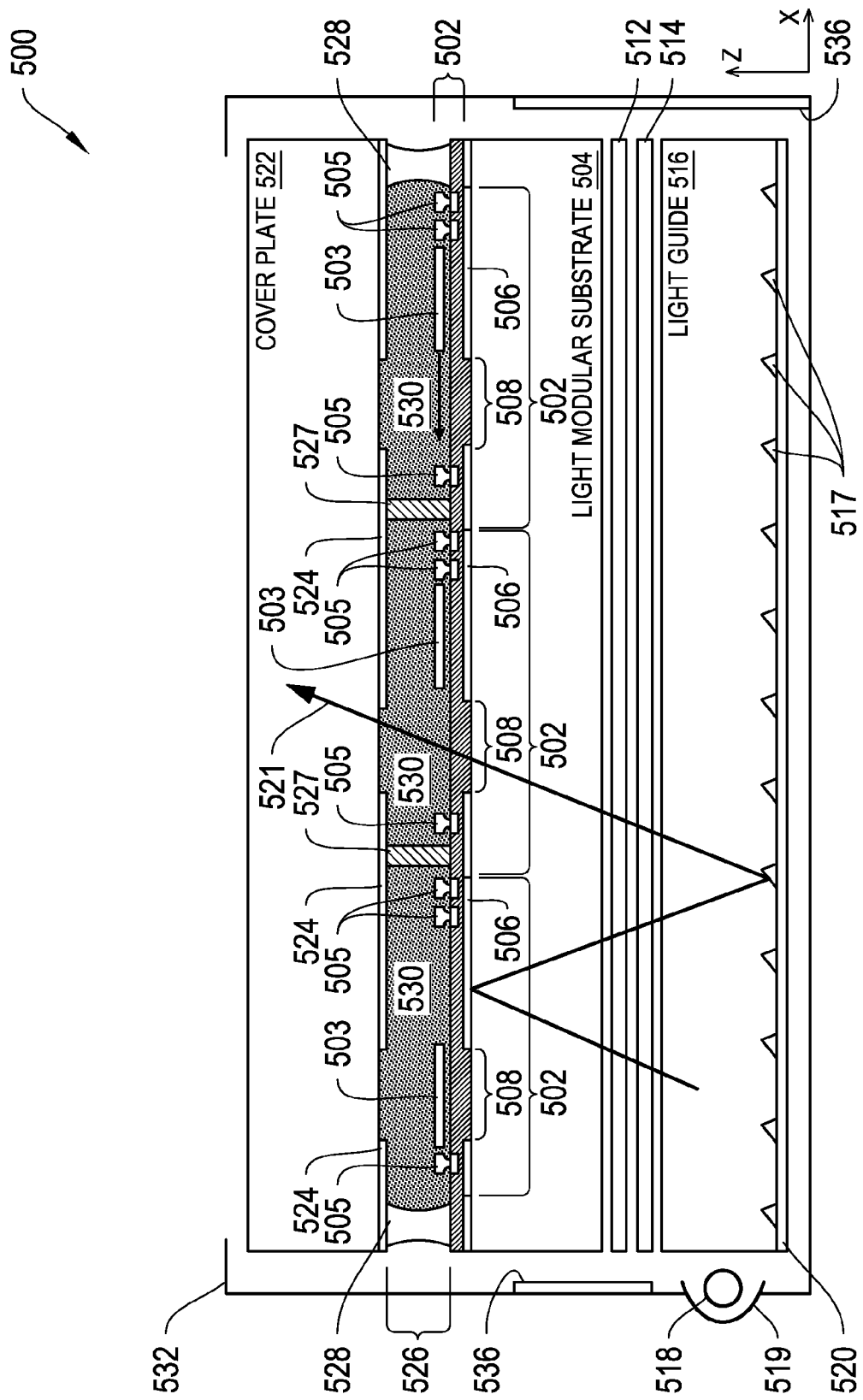
FIG. 5 shows an example cross sectional view of a display apparatus incorporating shutter-based light modulators.

FIG. 5 shows an example cross sectional view of a display apparatus 500 incorporating shutter-based light modulators (shutter assemblies) 502. Each shutter assembly 502 incorporates a shutter 503 and an anchor 505. Not shown are the compliant beam actuators which, when connected between the anchors 505 and the shutters 503, help to suspend the shutters 503 a short distance above the surface. The shutter assemblies 502 are disposed on a transparent substrate 504, such as made of plastic or glass. A rear-facing reflective aperture layer 506, disposed on the substrate 504, defines a plurality of surface apertures 508 located beneath the closed positions of the shutters 503 of the shutter assemblies 502. The reflective aperture layer 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition (CVD). In some implementations, the reflective aperture layer 506 can be formed from a mirror, such as a dielectric mirror. A dielectric mirror can be fabricated as a stack of dielectric thin films which alternate between materials of high and low refractive index. The vertical gap which separates the shutters 503 from the reflective aperture layer 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 depicted in FIG. 4B.

The display apparatus 500 includes an optional diffuser 512 and/or an optional brightness enhancing film 514 which separate the substrate 504 from a planar light guide 516. The light guide 516 includes a transparent, i.e., glass or plastic material. The light guide 516 is illuminated by one or more light sources 518, forming a backlight 515. The light sources 518 can be, for example, and without limitation, incandescent lamps, fluorescent lamps, lasers or light emitting diodes (LEDs) (generically referred to as "lamps"). A reflector 519 helps direct light from light source 518 towards the light guide 516. A front-facing reflective film 520 is disposed behind the backlight 515, reflecting light towards the shutter assemblies 502. Light rays, such as ray 521 from the backlight 515 that do not pass through one of the shutter assemblies 502, will be returned to the backlight 515 and reflected again from the film 520. In this fashion light that fails to leave the display apparatus 500 to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the light source 518 towards the apertures 508 and hence toward the front of the display apparatus 500. The light redirectors 517 can be molded into the plastic body of the light guide 516 with shapes that can be alternately triangular, trapezoidal, or curved in cross section. The density of the prisms 517 generally increases with distance from the light source 518.

In some implementations, the aperture layer 506 can be made of a light absorbing material, and in alternate implementations the surfaces of shutter 503 can be coated with either a light absorbing or a light reflecting material. In some other implementations, the aperture layer 506 can be deposited directly on the surface of the light guide 516. In some implementations, the aperture layer 506 need not be disposed on the same substrate as the shutters 503 and anchors 505 (such as in the MEMS-down configuration described below).

In some implementations, the light source 518 can include lamps of different colors, for instance, the colors red, green and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps, or red, green, blue and yellow lamps. In some other implementations, the light source 518 may include cyan, magenta, yellow and white lamps, red, green, blue and white lamps. In some other implementations, additional lamps may be included in the light source 518. For example, if using five colors, the light source 518 may include red, green, blue, cyan and yellow lamps. In some other implementations, the light source 518 may include white, orange, blue, purple and green lamps or white, blue, yellow, red and cyan lamps. If using six colors, the light source 518 may include red, green, blue, cyan, magenta and yellow lamps or white, cyan, magenta, yellow, orange and green lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a fluid 530. The fluid 530 is engineered with viscosities preferably below about 10 centipoise and with relative dielectric constant preferably above about 2.0, and dielectric breakdown strengths above about $10^4$ V/cm. The fluid 530 also can serve as a lubricant. In some implementations, the fluid 530 is a hydrophobic liquid with a high surface wetting capability. In alternate implementations, the fluid 530 has a refractive index that is either greater than or less than that of the substrate 504.

Displays that incorporate mechanical light modulators can include hundreds, thousands, or in some cases, millions of moving elements. In some devices, every movement of an element provides an opportunity for static friction to disable one or more of the elements. This movement is facilitated by immersing all the parts in a fluid (also referred to as fluid 530) and sealing the fluid (e.g., with an adhesive) within a fluid space or gap in a MEMS display cell. The fluid 530 is usually one with a low coefficient of friction, low viscosity, and minimal degradation effects over the long term. When the MEMS-based display assembly includes a liquid for the fluid 530, the liquid at least partially surrounds some of the moving parts of the MEMS-based light modulator. In some implementations, in order to reduce the actuation voltages, the liquid has a viscosity below 70 centipoise. In some other implementations, the liquid has a viscosity below 10 centipoise. Liquids with viscosities below 70 centipoise can include materials with low molecular weights: below 4000 grams/mole, or in some cases below 400 grams/mole. Fluids 530 that also may be suitable for such implementations include, without limitation, de-ionized water, methanol, ethanol and other alcohols, paraffins, olefins, ethers, silicone oils, fluorinated silicone oils, or other natural or synthetic solvents or lubricants. Useful fluids can be polydimethylsiloxanes (PDMS), such as hexamethyldisiloxane and octamethyltrisiloxane, or alkyl methyl siloxanes such as hexylpentamethyldisiloxane. Useful fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. Other fluids considered for these display assemblies include butyl acetate and dimethylformamide. Still other useful fluids for these displays include hydro fluoro ethers, perfluoropolyethers, hydro fluoro poly ethers, pentanol, and butanol. Example suitable hydro fluoro ethers include ethyl nonafluorobutyl ether and 2-trifluoromethyl-3-ethoxydodecafluorohexane.

A sheet metal or molded plastic assembly bracket 532 holds the cover plate 522, the substrate 504, the backlight 515 and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of the light guide 516 back into the light guide 516. Not depicted in FIG. 5 are electrical interconnects which provide control signals as well as power to the shutter assemblies 502 and the light source 518.

The display apparatus 500 is referred to as the MEMS-up configuration, wherein the MEMS-based light modulators are formed on a front surface of the substrate 504, i.e., the surface that faces toward the viewer. The shutter assemblies 502 are built directly on top of the reflective aperture layer 506. In an alternate implementation, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in the display apparatus 500 and is oriented such that the MEMS-based light modulators are positioned on the rear surface of the top substrate, i.e., the surface that faces away from the viewer and toward the light guide 516. The MEMS-based light modulators are thereby positioned directly opposite to and across a gap from the reflective aperture layer 506. The gap can be maintained by a series of spacer posts connecting the aperture plate and the substrate on which the MEMS modulators are formed. In some implementations, the spacers are disposed within or between each pixel in the array. The gap or distance that separates the MEMS light modulators from their corresponding apertures is preferably less than 10 microns, or a distance that is less than the overlap between shutters and apertures, such as overlap 416.

Figure 6A:
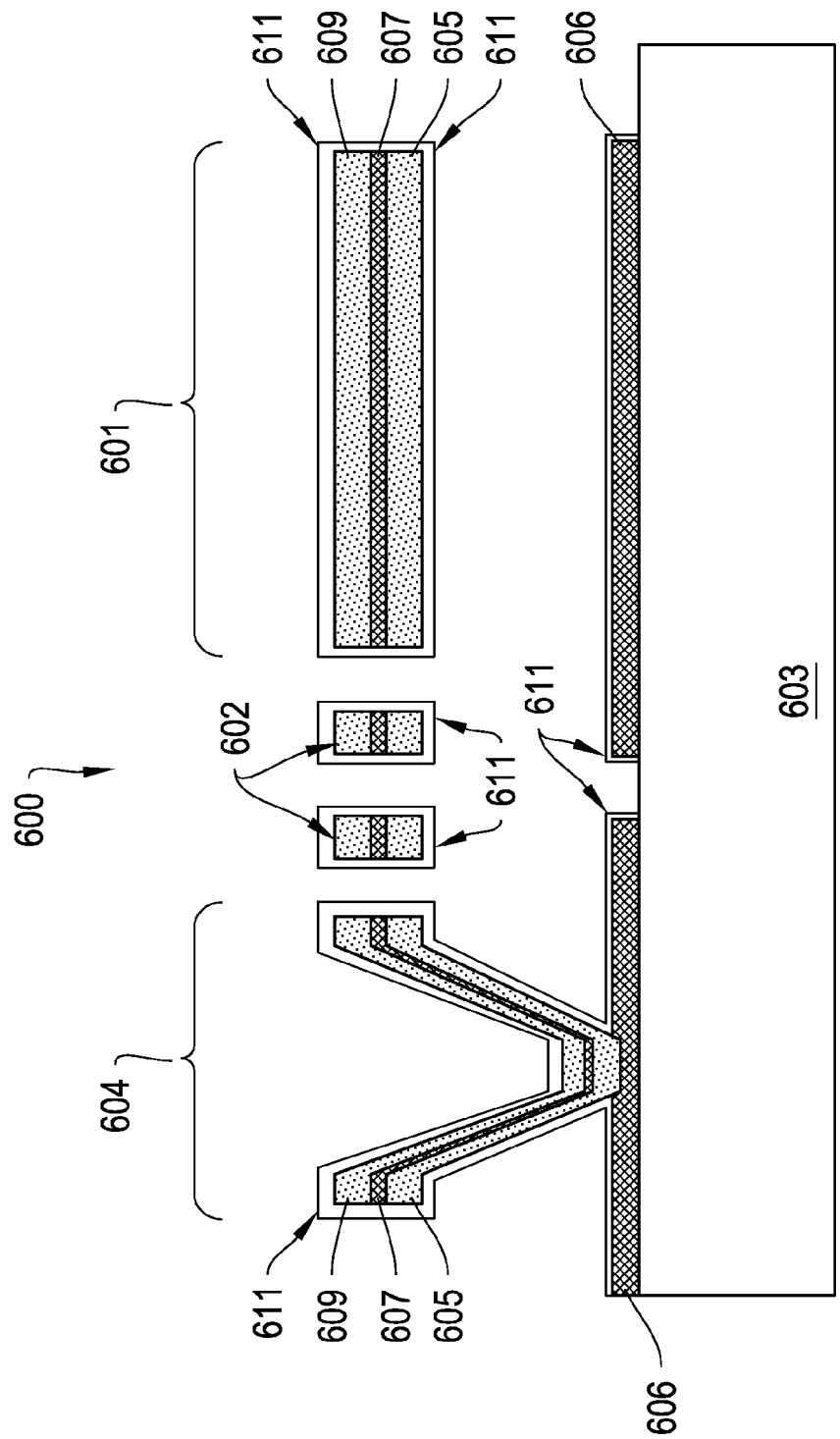
FIGS. 6A-6E show cross sectional views of stages of construction of an example composite shutter assembly.

FIGS. 6A-6E show cross sectional views of stages of construction of an example composite shutter assembly. FIG. 6A shows an example cross sectional diagram of a completed composite shutter assembly 600. The shutter assembly 600 includes a shutter 601, two compliant beams 602, and an anchor structure 604 built-up on a substrate 603 and an aperture layer 606. The elements of the composite shutter assembly 600 include a first mechanical layer 605, a conductor layer 607, a second mechanical layer 609, and an encapsulating dielectric 611. At least one of the mechanical layers 605 or 609 can be deposited to thicknesses in excess of 0.15 microns, as one or both of the mechanical layers 605 or 609 serves as the principal load bearing and mechanical actuation member for the shutter assembly 600, though in some implementations, the mechanical layers 605 and 609 may be thinner. Candidate materials for the mechanical layers 605 and 609 include, without limitation, metals such as aluminum (Al), copper (Cu), nickel (Ni), chromium (Cr), molybdenum (Mo), titanium (Ti), tantalum (Ta), niobium (Nb), neodymium (Nd), or alloys thereof; dielectric materials such as aluminum oxide ($Al_2O_3$), silicon oxide ($SiO_2$), tantalum pentoxide ($Ta_2O_5$), or silicon nitride ($Si_3N_4$); or semiconducting materials such as diamond-like carbon, silicon (Si), germanium (Ge), gallium arsenide (GaAs), cadmium telluride (CdTe) or alloys thereof. At least one of the layers, such as the conductor layer 607, should be electrically conducting so as to carry charge on to and off of the actuation elements. Candidate materials include, without limitation, Al, Cu, Ni, Cr, Mo, Ti, Ta, Nb, Nd, or alloys thereof or semiconducting materials such as diamond-like carbon, Si, Ge, GaAs, CdTe or alloys thereof. In some implementations employing semiconductor layers, the semiconductors are doped with impurities such as phosphorus (P), arsenic (As), boron (B), or Al. FIG. 6A depicts a sandwich configuration for the composite in which the mechanical layers 605 and 609, having similar thicknesses and mechanical properties, are deposited on either side of the conductor layer 607. In some implementations, the sandwich structure helps to ensure that stresses remaining after deposition and/or stresses that are imposed by temperature variations will not act to cause bending, warping or other deformation of the shutter assembly 600.

In some implementations, the order of the layers in the composite shutter assembly 600 can be inverted, such that the outside of the shutter assembly 600 is formed from a conductor layer while the inside of the shutter assembly 600 is formed from a mechanical layer.

The shutter assembly 600 can include an encapsulating dielectric 611. In some implementations, dielectric coatings can be applied in conformal fashion, such that all exposed bottom, top, and side surfaces of the shutter 601, the anchor 604, and the beams 602 are uniformly coated. Such thin films can be grown by thermal oxidation and/or by conformal CVD of an insulator such as $Al_2O_3$, chromium (III) oxide ($Cr_2O_3$), titanium oxide ($TiO_2$), hafnium oxide ($HfO_2$), vanadium oxide ($V_2O_5$), niobium oxide ($Nb_2O_5$), $Ta_2O_5$, $SiO_2$, or $Si_3N_4$, or by depositing similar materials via atomic layer deposition. The dielectric coating layer can be applied with thicknesses in the range of 10 nm to 1 micron. In some implementations, sputtering and evaporation can be used to deposit the dielectric coating onto sidewalls.

FIGS. 6B-6E show example cross sectional views of the results of certain intermediate manufacturing stages of an example process used to form the shutter assembly 600 depicted in FIG. 6A. In some implementations, the shutter assembly 600 is built on top of a pre-existing control matrix, such as an active matrix array of thin film transistors, such as the control matrices depicted in FIGS. 3A and 3B.

Figure 6B:
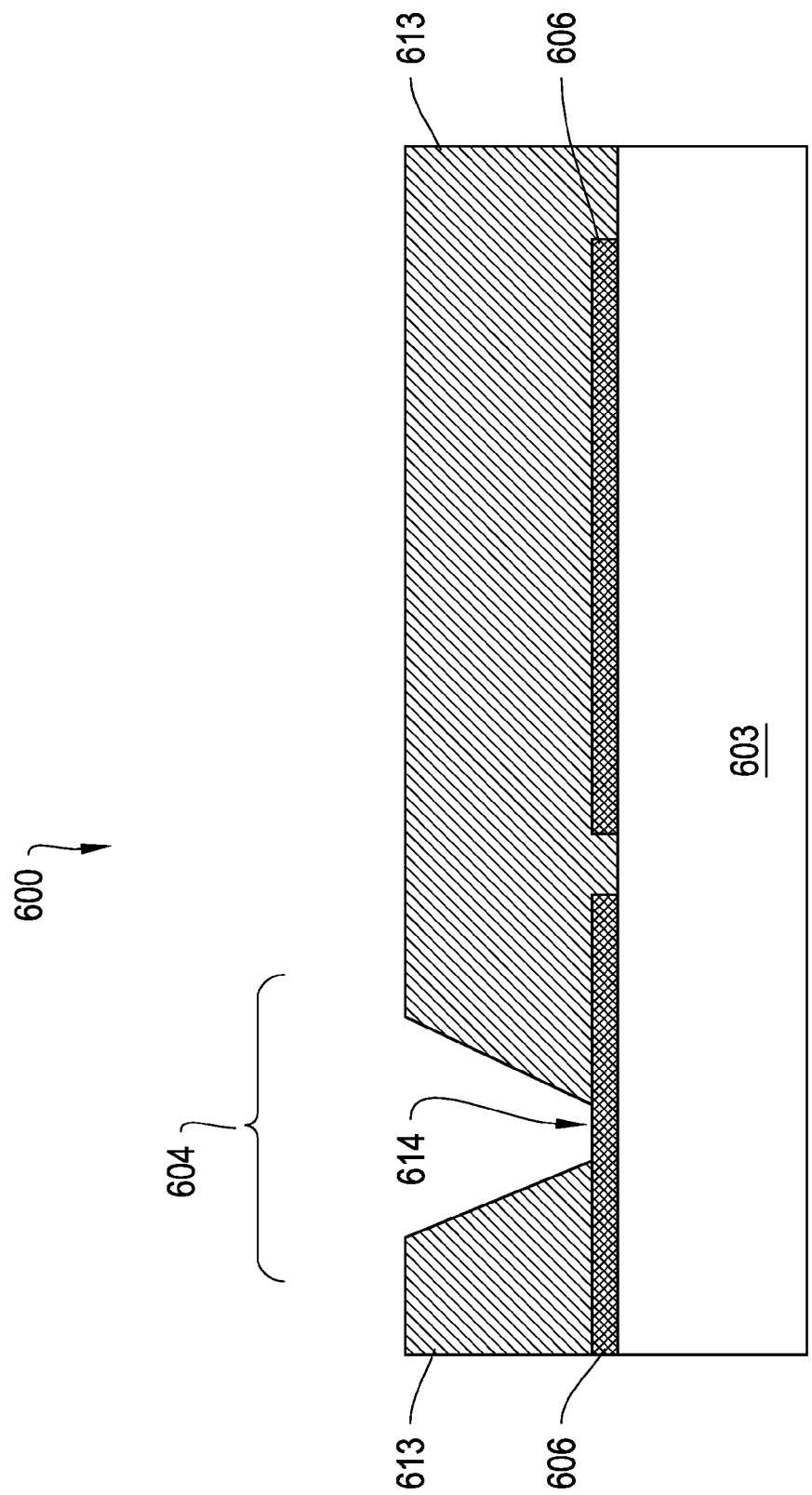

FIG. 6B shows a cross sectional view of the results of a first stage in an example process of forming the shutter assembly 600. As depicted in FIG. 6B, a sacrificial layer 613 is deposited and patterned. In some implementations, polyimide is used as a sacrificial layer material. Other candidate sacrificial layer materials include, without limitation, polymer materials such as polyamide, fluoropolymer, benzocyclobutene, polyphenylquinoxylene, parylene, or polynorbornene. These materials are chosen for their ability to planarize rough surfaces, maintain mechanical integrity at processing temperatures in excess of 250° C., and their ease of etch and/or thermal decomposition during removal. In other implementations, the sacrificial layer 613 is formed from a photoresist, such as polyvinyl acetate, polyvinyl ethylene, and phenolic or novolac resins. An alternate sacrificial layer material used in some implementations is $SiO_2$, which can be removed preferentially as long as other electronic or structural layers are resistant to the hydrofluoric acid solutions used for its removal. One such suitable resistant material is $Si_3N_4$. Another alternate sacrificial layer material is Si, which can be removed preferentially as long as electronic or structural layers are resistant to the fluorine plasmas or xenon difluoride ($XeF_2$) used for its removal, such as most metals and $Si_3N_4$. Yet another alternate sacrificial layer material is Al, which can be removed preferentially as long as other electronic or structural layers are resistant to strong base solutions, such as concentrated sodium hydroxide (NaOH) solutions. Suitable materials include, for example, Cr, Ni, Mo, Ta and Si. Still another alternate sacrificial layer material is Cu, which can be removed preferentially as long as other electronic or structural layers are resistant to nitric or sulfuric acid solutions. Such materials include, for example, Cr, Ni, and Si.

Next the sacrificial layer 613 is patterned to expose holes or vias at the anchor regions 604. In implementations employing polyimide or other non-photoactive materials as the sacrificial layer material, the sacrificial layer material can be formulated to include photoactive agents, allowing regions exposed through a UV photomask to be preferentially removed in a developer solution. Sacrificial layers formed from other materials can be patterned by coating the sacrificial layer 613 in an additional layer of photoresist, photopatterning the photoresist, and finally using the photoresist as an etching mask. The sacrificial layer 613 alternatively can be patterned by coating the sacrificial layer 613 with a hard mask, which can be a thin layer of $SiO_2$ or a metal such as Cr. A photopattern is then transferred to the hard mask by way of photoresist and wet chemical etching. The pattern developed in the hard mask can be resistant to dry chemical, anisotropic, or plasma etching—techniques which can be used to impart deep and narrow anchor holes into the sacrificial layer 613.

After the anchor regions 604 have been opened in the sacrificial layer 613, the exposed and underlying conducting surface 614 can be etched, either chemically or via the sputtering effects of a plasma, to remove any surface oxide layers. Such a contact etching stage can improve the ohmic contact between the underlying conducting surface 614 and the shutter material. After patterning of the sacrificial layer 613, any photoresist layers or hard masks can be removed through use of either solvent cleaning or acid etching.

Figure 6C:
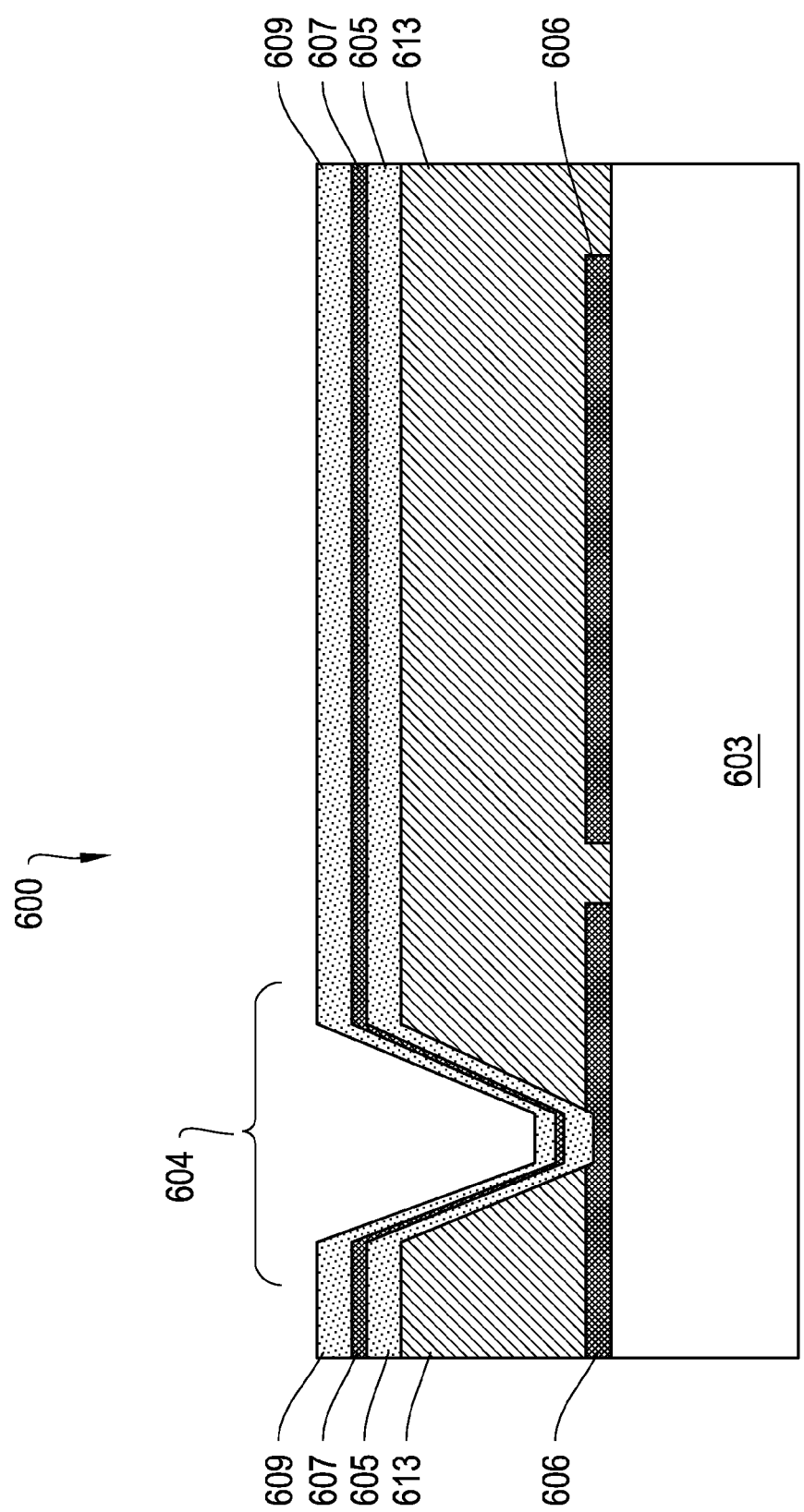

Next, in the process for building the shutter assembly 600, as depicted in FIG. 6C, the shutter materials are deposited. The shutter assembly 600 is composed of multiple thin films: the first mechanical layer 605, the conductor layer 607 and the second mechanical layer 609. In some implementations, the first mechanical layer 605 is an amorphous silicon (a-Si) layer, the conductor layer 607 is Al and the second mechanical layer 609 is a-Si. The first mechanical layer 605, the conductor layer 607, and the second mechanical layer 609 are deposited at a temperature which is below that at which physical degradation occurs for the sacrificial layer 613. For instance, polyimide decomposes at temperatures above about 400° C. Therefore, in some implementations, the first mechanical layer 605, the conductor layer 607 and the second mechanical layer 609 are deposited at temperatures below about 400° C., allowing usage of polyimide as a sacrificial layer material. In some implementations, hydrogenated amorphous silicon (a-Si:H) is a useful mechanical material for the first and second mechanical layers 605 and 609 since it can be grown to thicknesses in the range of about 0.15 to about 3 microns, in a relatively stress-free state, by way of plasma-enhanced chemical vapor deposition (PECVD) from silane gas at temperatures in the range of about 250 to about 350° C. In some of such implementations, phosphine gas ($PH_3$) is used as a dopant so that the a-Si can be grown with resistivities below about 1 ohm-cm. In alternate implementations, a similar PECVD technique can be used for the deposition of $Si_3N_4$, silicon-rich $Si_3N_4$, or $SiO_2$ materials as the first mechanical layer 605 or for the deposition of diamond-like carbon, Ge, SiGe, CdTe, or other semiconducting materials for the first mechanical layer 605. An advantage of the PECVD deposition technique is that the deposition can be quite conformal, that is, it can coat a variety of inclined surfaces or the inside surfaces of narrow via holes. Even if the anchor or via holes which are cut into the sacrificial layer material present nearly vertical sidewalls, the PECVD technique can provide a substantially continuous coating between the bottom and top horizontal surfaces of the anchor.

In addition to the PECVD technique, alternate suitable techniques available for the growth of the first and second mechanical layers 605 and 609 include RF or DC sputtering, metal-organic CVD, evaporation, electroplating or electroless plating.

For the conductor layer 607, in some implementations, a metal thin film, such as Al, is utilized. In some other implementations, alternative metals, such as Cu, Ni, Mo, or Ta can be chosen. The inclusion of such a conducting material serves two purposes. It reduces the overall sheet resistance of the shutter 601, and it helps to block the passage of visible light through the shutter 601, since a-Si, if less than about 2 microns thick, as may be used in some implementations of the shutter 601, can transmit visible light to some degree. The conducting material can be deposited either by sputtering or, in a more conformal fashion, by CVD techniques, electroplating, or electroless plating.

Figure 6D:
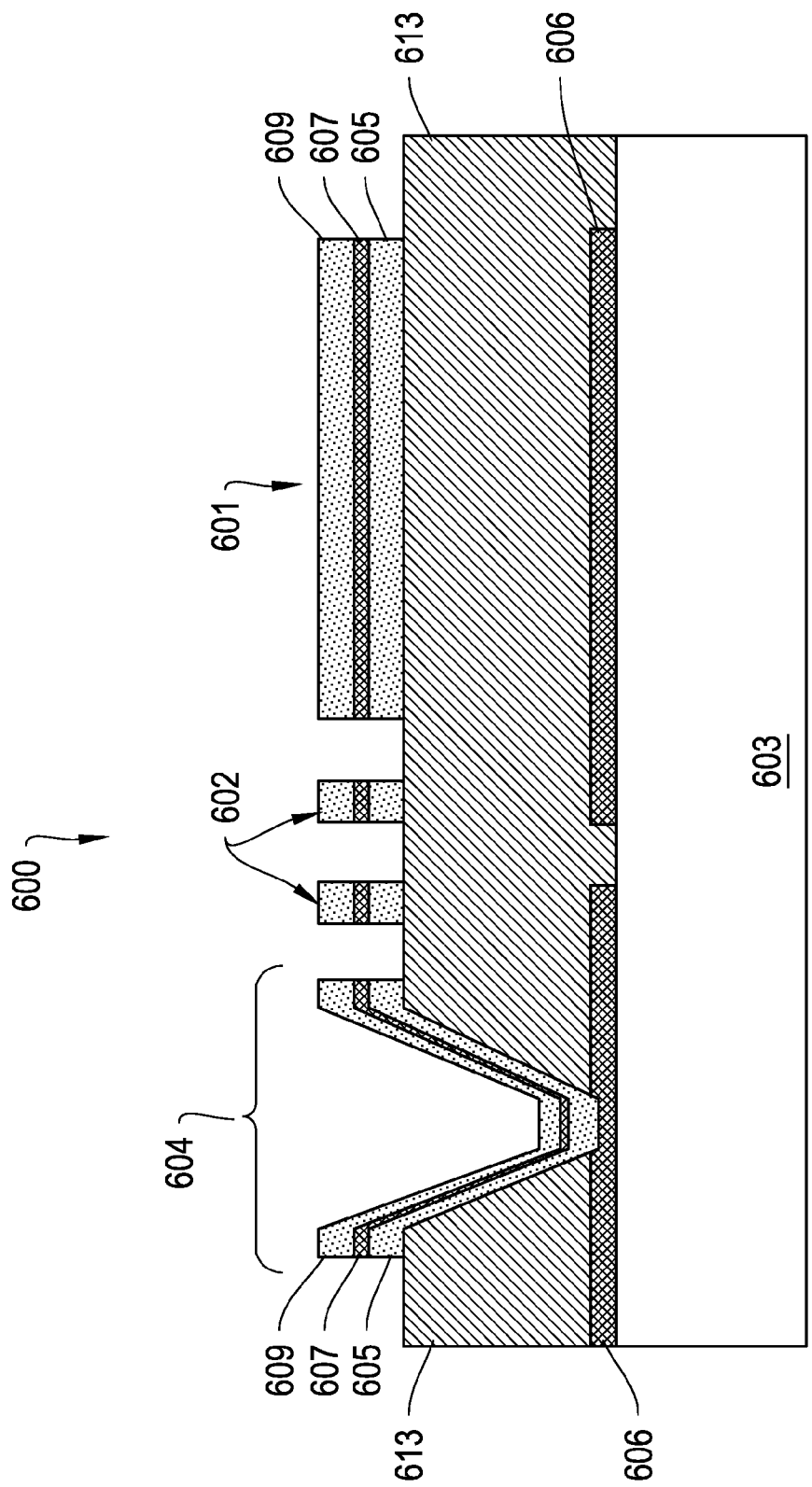

FIG. 6D shows the results of the next set of processing stages used in the formation of the shutter assembly 600. The first mechanical layer 605, the conductor layer 607, and the second mechanical layer 609 are photomasked and etched while the sacrificial layer 613 is still on the substrate 603. First, a photoresist material is applied, then exposed through a photomask, and then developed to form an etch mask. Amorphous silicon, $Si_3N_4$, and $SiO_2$ can then be etched in fluorine-based plasma chemistries. $SiO_2$ mechanical layers also can be etched using HF wet chemicals; and any metals in the conductor layer 607 can be etched with either wet chemicals or chlorine-based plasma chemistries.

The pattern shapes applied through the photomask can influence the mechanical properties, such as stiffness, compliance, and the voltage response in the actuator and shutter 601 of the shutter assembly 600. The shutter assembly 600 includes the compliant beams 602, shown in cross section. Each compliant beam 602 is shaped such that the width is less than the total height or thickness of the shutter material. In some implementations, the beam dimensional ratio is maintained at about 1.4:1 or greater, with the compliant beams 602 being taller or thicker than they are wide.

Figure 6E:
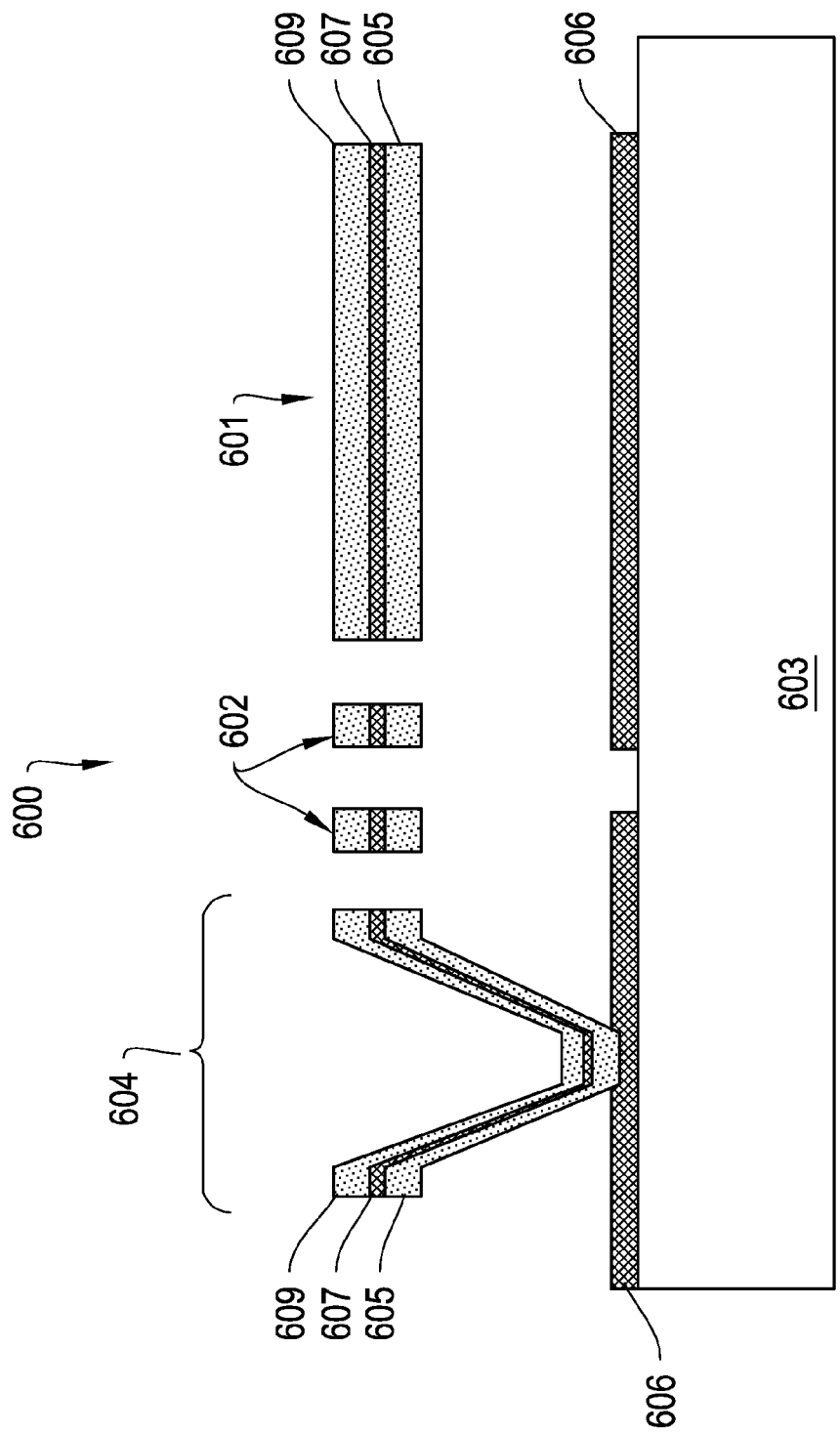

The results of subsequent stages of the example manufacturing process for building the shutter assembly 600 are depicted in FIG. 6E. The sacrificial layer 613 is removed, which frees-up all moving parts from the substrate 603, except at the anchor points. In some implementations, polyimide sacrificial materials are removed in an oxygen plasma. Other polymer materials used for the sacrificial layer 613 also can be removed in an oxygen plasma, or in some cases by thermal pyrolysis. Some sacrificial layer materials (such as $SiO_2$) can be removed by wet chemical etching or by vapor phase etching.

In a final process, the results of which are depicted in FIG. 6A, the encapsulating dielectric 611 is deposited on all exposed surfaces of the shutter assembly 600. In some implementations, the encapsulating dielectric 611 can be applied in a conformal fashion, such that all bottom, top, and side surfaces of the shutter 601 and the beams 602 are uniformly coated using CVD. In some other implementations, only the top and side surfaces of the shutter 601 are coated. In some implementations, $Al_2O_3$ is used for the encapsulating dielectric 611 and is deposited by atomic layer deposition to thicknesses in the range of about 10 to about 100 nanometers.

Finally, anti-stiction coatings can be applied to the surfaces of the shutter 601 and the beams 602. These coatings prevent the unwanted stickiness or adhesion between two independent beams of an actuator. Suitable coatings include carbon films (both graphite and diamond-like) as well as fluoropolymers, and/or low vapor pressure lubricants, as well as chlorosilanes, hydrocarbon chlorosilanes, fluorocarbon chlorosilanes, such as methoxy-terminated silanes, perfluoronated, amino-silanes, siloxanes and carboxylic acid based monomers and species. These coatings can be applied by either exposure to a molecular vapor or by decomposition of precursor compounds by way of CVD. Anti-stiction coatings also can be created by the chemical alteration of shutter surfaces, such as by fluoridation, silanization, siloxidation, or hydrogenation of insulating surfaces.

One class of suitable actuators for use in EMS-based shutter displays include compliant actuator beams for controlling shutter motion that is transverse to or in-the-plane of the display substrate. The voltage employed for the actuation of such shutter assemblies decreases as the actuator beams become more compliant. The control of actuated motion also improves if the beams are shaped such that in-plane motion is preferred or promoted with respect to out-of-plane motion. Thus, in some implementations, the compliant actuator beams have a rectangular cross section, such that the beams are taller or thicker than they are wide.

The stiffness of a long rectangular beam with respect to bending within a particular plane scales with the thinnest dimension of that beam in that plane to the third power. It is therefore advantageous to reduce the width of the compliant beams to reduce the actuation voltages for in-plane motion. When using conventional photolithography equipment to define and fabricate the shutter and actuator structures, however, the minimum width of the beams can be limited to the resolution of the optics. And although photolithography equipment has been developed for defining patterns in photoresist with narrow features, such equipment is expensive, and the areas over which patterning can be accomplished in a single exposure are limited. For economical photolithography over large panels of glass or other transparent substrates, the patterning resolution or minimum feature size is typically limited to several microns.

FIGS. 7A-7D show isometric views of stages of construction of an example shutter assembly 700 with narrow sidewall beams. This alternate process yields compliant actuator beams 718 and 720 and a compliant spring beam 716 (collectively referred to as "sidewall beams 716, 718 and 720"), which have a width well below the conventional lithography limits on large glass panels. In the process depicted in FIGS. 7A-7D, the compliant beams of shutter assembly 700 are formed as sidewall features on a mold made from a sacrificial material. The process is referred to as a sidewall beams process.

Figure 7A:
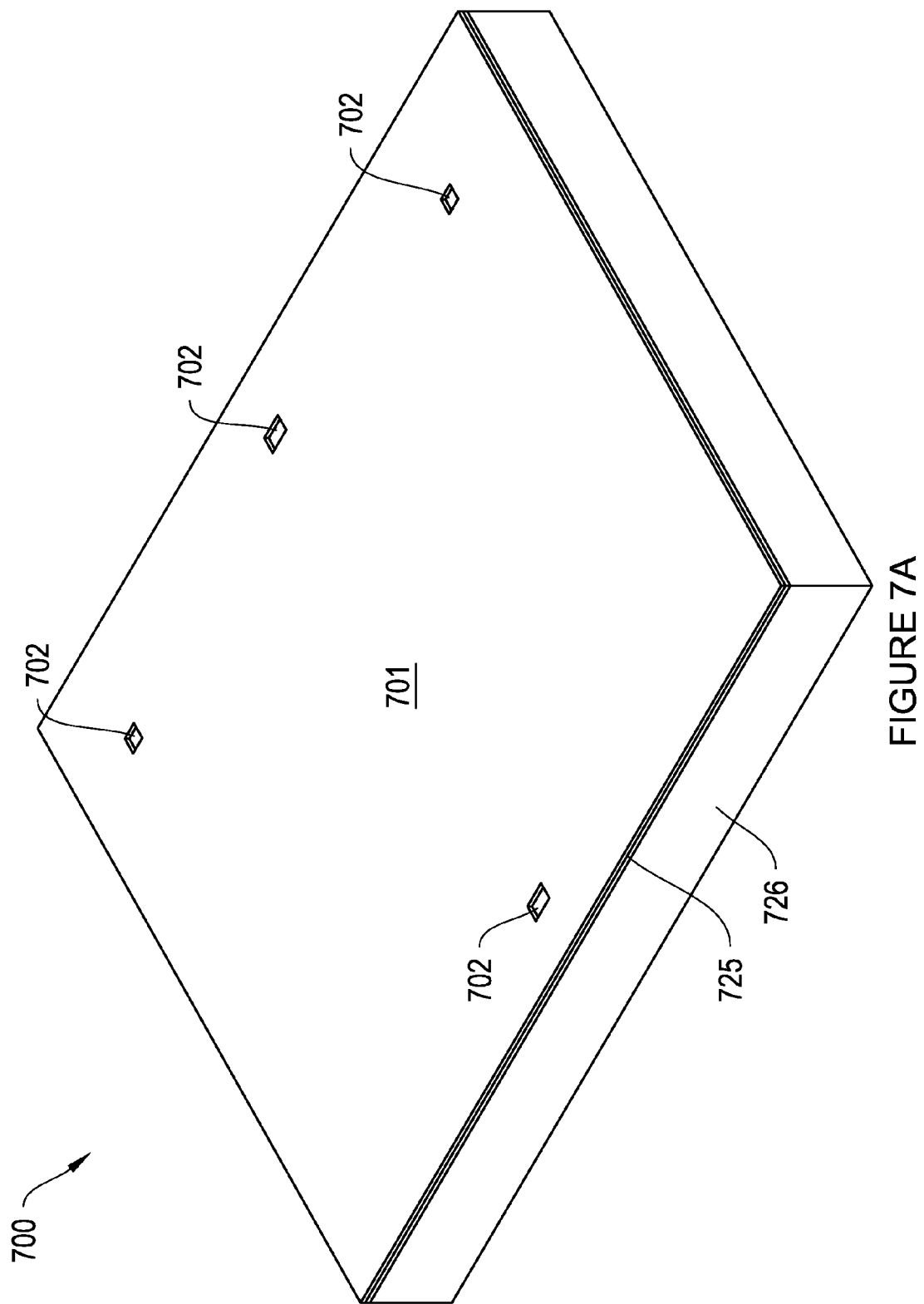
FIGS. 7A-7D show isometric views of stages of construction of an example shutter assembly with narrow sidewall beams.

The process of forming the shutter assembly 700 with the sidewall beams 716, 718 and 720 begins, as depicted in FIG. 7A, with the deposition and patterning of a first sacrificial material 701. The pattern defined in the first sacrificial material 701 creates openings or vias 702 within which anchors for the shutter assembly 700 eventually will be formed. The deposition and patterning of the first sacrificial material 701 is similar in concept, and uses similar materials and techniques, as those described for the deposition and patterning described in relation to FIGS. 6A-6E.

Figure 7B:
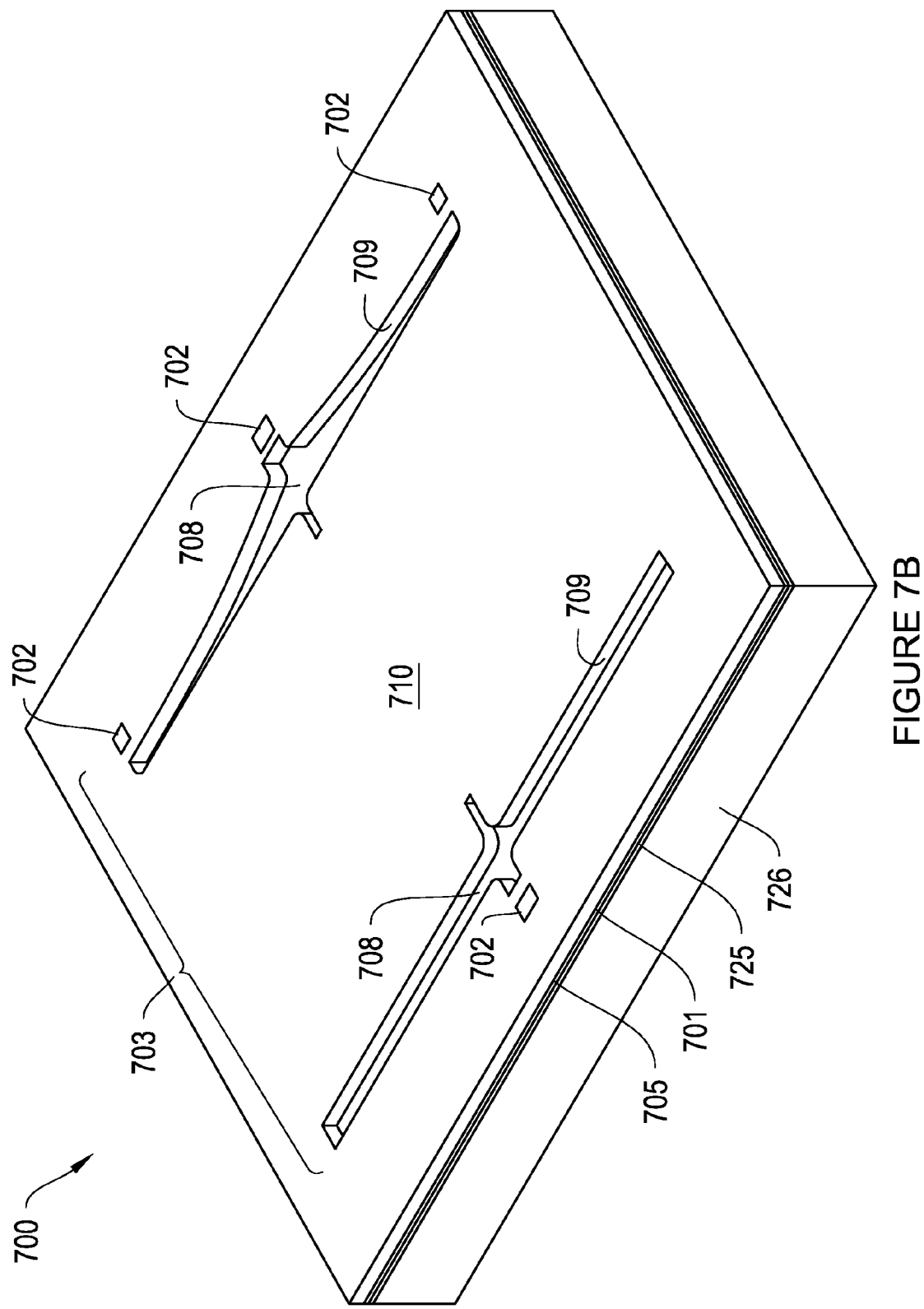

The process of forming the sidewall beams 716, 718 and 720 continues with the deposition and patterning of a second sacrificial material 705. FIG. 7B shows the shape of a mold 703 that is created after patterning of the second sacrificial material 705. The mold 703 also includes the first sacrificial material 701 with its previously defined vias 702. The mold 703 in FIG. 7B includes two distinct horizontal levels. The bottom horizontal level 708 of the mold 703 is established by the top surface of the first sacrificial layer 701 and is accessible in those areas where the second sacrificial material 705 has been etched away. The top horizontal level 710 of the mold 703 is established by the top surface of the second sacrificial material 705. The mold 703 depicted in FIG. 7B also includes substantially vertical sidewalls 709. Materials for use as the first and second sacrificial materials 701 and 705 are described above with respect to the sacrificial layer 613 of FIGS. 6A-6E.

Figure 7C:
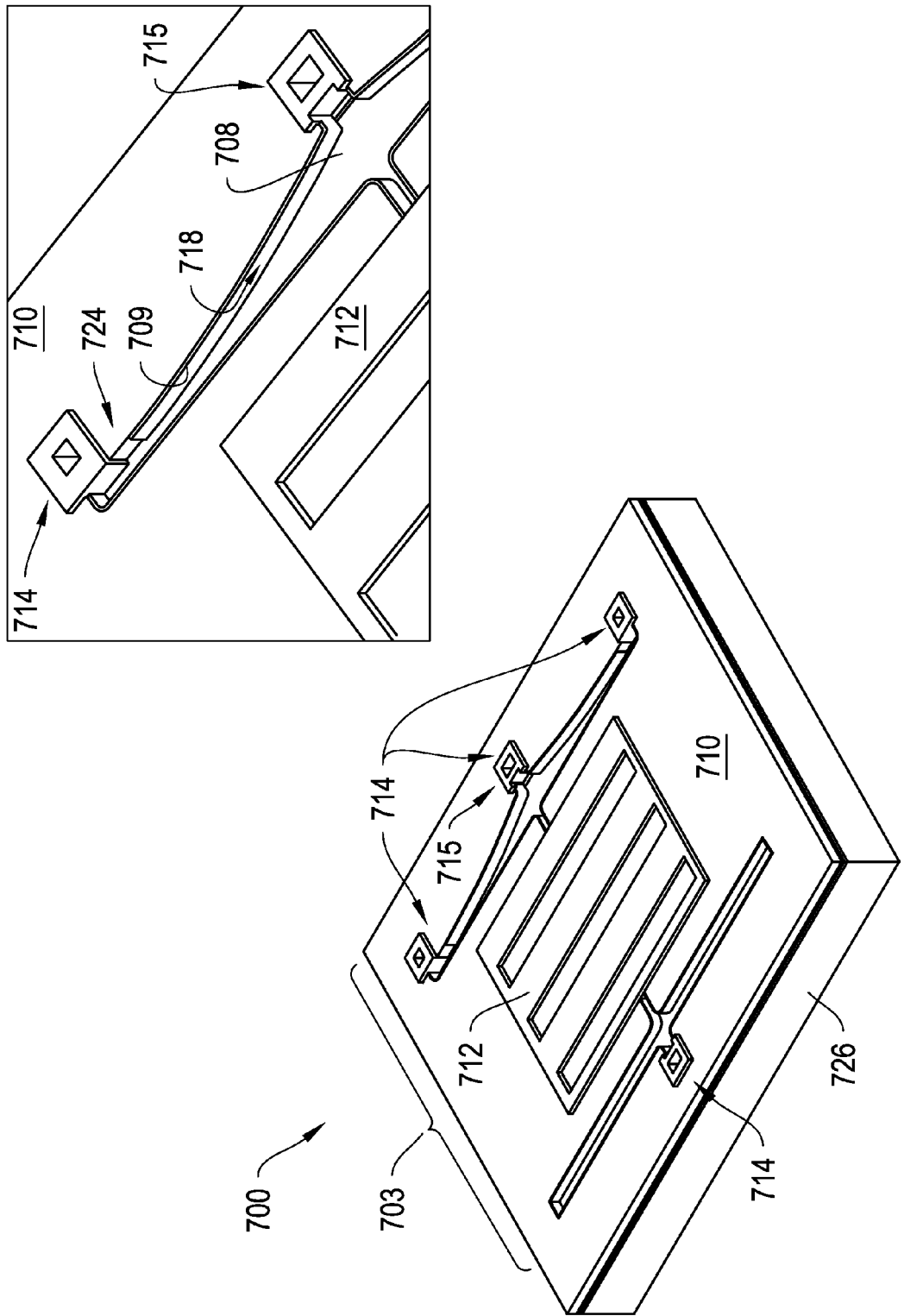

The process of forming the sidewall beams 716, 718 and 720 continues with the deposition and patterning of shutter material onto all of the exposed surfaces of the sacrificial mold 703, as depicted in FIG. 7C. Suitable materials for use in forming the shutter 712 are described above with respect to the first mechanical layer 605, the conductor layer 607, and the second mechanical layer 609 of FIGS. 6A-6E. The shutter material is deposited to a thickness of less than about 2 microns. In some implementations, the shutter material is deposited to have a thickness of less than about 1.5 microns. In some other implementations, the shutter material is deposited to have a thickness of less than about 1.0 microns, and as thin as about 0.10 microns. After deposition, the shutter material (which may be a composite of several materials as described above) is patterned, as depicted in FIG. 7C. First, a photoresist is deposited on the shutter material. The photoresist is then patterned. The pattern developed into the photoresist is designed such that the shutter material, after a subsequent etch stage, remains in the region of the shutter 712 as well as at the anchors 714.

The manufacturing process continues with applying an anisotropic etch, resulting in the structure depicted in FIG. 7C. The anisotropic etch of the shutter material is carried out in a plasma atmosphere with a voltage bias applied to the substrate 726 or to an electrode in proximity to the substrate 726. The biased substrate 726 (with electric field perpendicular to the surface of the substrate 726) leads to acceleration of ions toward the substrate 726 at an angle nearly perpendicular to the substrate 726. Such accelerated ions, coupled with the etching chemicals, lead to etch rates that are much faster in a direction that is normal to the plane of the substrate 726 as compared to directions parallel to the substrate 726. Undercut-etching of shutter material in the regions protected by a photoresist is thereby substantially eliminated. Along the sidewall surfaces 709 of the mold 703, which are substantially parallel to the track of the accelerated ions, the shutter material also is substantially protected from the anisotropic etch. Such protected sidewall shutter material form the sidewall beams 716, 718, and 720 for supporting the shutter 712. Along other (non-photoresist-protected) horizontal surfaces of the mold 703, such as the top horizontal surface 710 or the bottom horizontal surface 708, the shutter material has been substantially completely removed by the etch.

The anisotropic etch used to form the sidewall beams 716, 718 and 720 can be achieved in either an RF or DC plasma etching device as long as provision for electrical bias of the substrate 726 or of an electrode in close proximity of the substrate 726 is supplied. For the case of RF plasma etching, an equivalent self-bias can be obtained by disconnecting the substrate holder from the grounding plates of the excitation circuit, thereby allowing the substrate potential to float in the plasma. In some implementations, it is possible to provide an etching gas such as trifluoromethane ($CHF_3$), perfluorobutene ($C_4F_8$), or chloroform ($CHCl_3$) in which both carbon and hydrogen and/or carbon and fluorine are constituents in the etch gas. When coupled with a directional plasma, achieved again through voltage biasing of the substrate 726, the liberated carbon (C), hydrogen (H), and/or fluorine (F) atoms can migrate to the sidewalls 709 where they build up a passive or protective quasi-polymer coating. This quasi-polymer coating further protects the sidewall beams 716, 718 and 720 from etching or chemical attack.

Figure 7D:
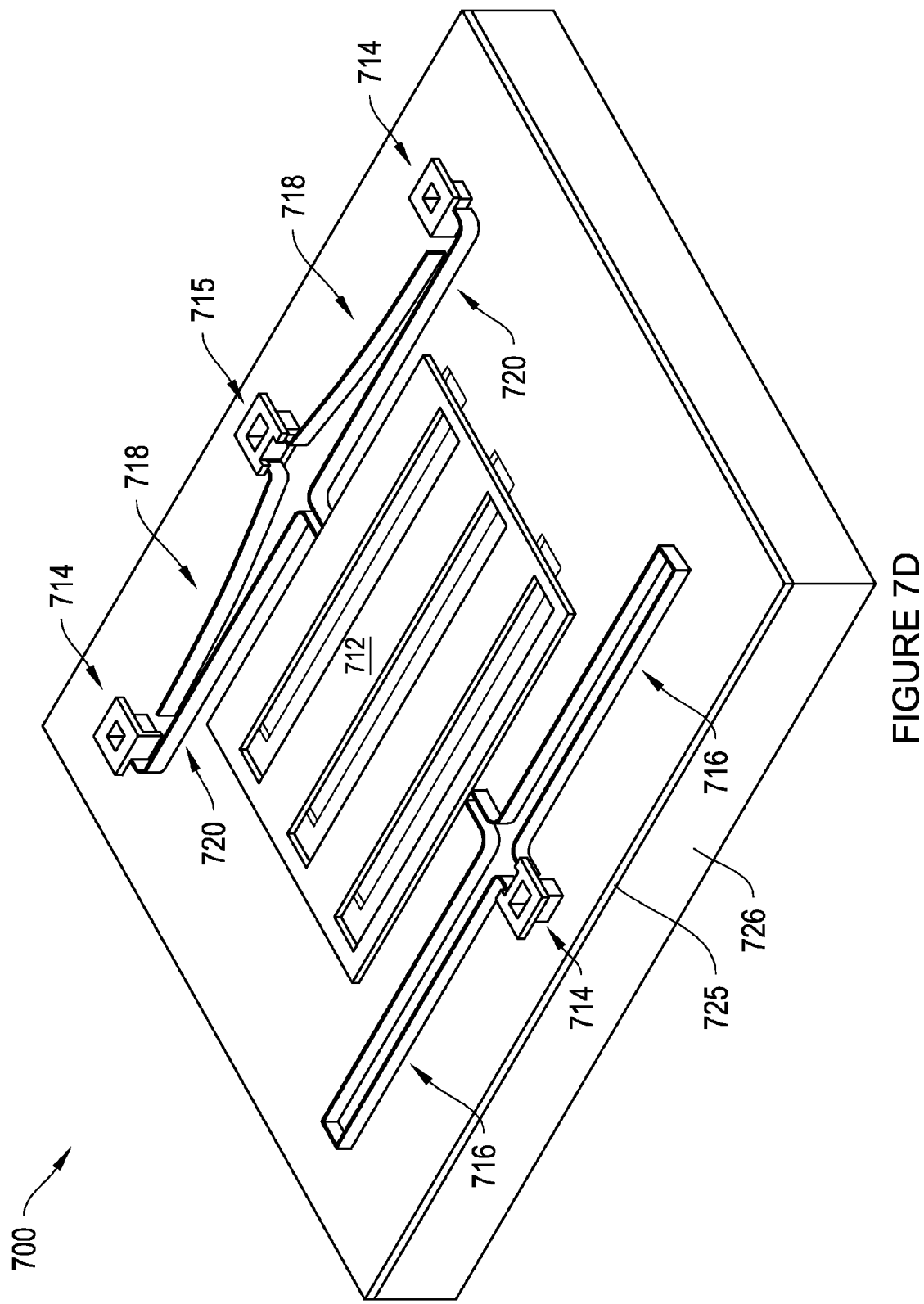

The process of forming the sidewall beams 716, 718 and 720 is completed with the removal of the remainder of the second sacrificial material 705 and the first sacrificial material 701. The result is shown in FIG. 7D. The process of removing sacrificial material is similar to that described with respect to FIG. 6E. The material deposited on the sidewalls 709 of the mold 703 remain as the sidewall beams 716, 718 and 720. The sidewall beam 716 serves as a spring mechanically connecting the anchors 714 to the shutter 712, and also provides a passive restoring force and to counter the forces applied by the actuator formed from the compliant beams 718 and 720. The anchors 714 connect to an aperture layer 725. The sidewall beams 716, 718 and 720 are tall and narrow. The width of the sidewall beams 716, 718 and 720, as formed from the surface of the mold 703, is similar to the thickness of the shutter material as deposited. In some implementations, the width of sidewall beam 716 will be the same as the thickness of shutter 712. In some other implementations, the beam width will be about ½ the thickness of the shutter 712. The height of the sidewall beams 716, 718 and 720 is determined by the thickness of the second sacrificial material 705, or in other words, by the depth of the mold 703, as created during the patterning operation described in relation to FIG. 7B. As long as the thickness of the deposited shutter material is chosen to be less than about 2 microns, the process depicted in FIGS. 7A-7D is well suited for the production of narrow beams. In fact, for many applications the thickness range of 0.1 to 2.0 micron is quite suitable. Conventional photolithography would limit the patterned features shown in FIGS. 7A, 7B and 7C to much larger dimensions, for instance allowing minimum resolved features no smaller than 2 microns or 5 microns.

FIG. 7D depicts an isometric view of the shutter assembly 700, formed after the release operation in the above-described process, yielding compliant beams with cross sections of high aspect ratios. As long as the thickness of the second sacrificial material 705 is, for example, greater than about 4 times larger than the thickness of the shutter material, the resulting ratio of beam height to beam width will be produced to a similar ratio, i.e., greater than about 4:1.

An optional stage, not illustrated above but included as part of the process leading to FIG. 7C, involves isotropic etching of the sidewall beam material to separate or decouple the compliant load beams 720 from the compliant drive beams 718. For instance, the shutter material at point 724 has been removed from the sidewall through use of an isotropic etch. An isotropic etch is one whose etch rate is substantially the same in all directions, so that sidewall material in regions such as point 724 is no longer protected. The isotropic etch can be accomplished in the typical plasma etch equipment as long as a bias voltage is not applied to the substrate 726. An isotropic etch also can be achieved using wet chemical or vapor phase etching techniques. Prior to this optional fourth masking and etch stage, the sidewall beam material exists essentially continuously around the perimeter of the recessed features in the mold 703. The fourth mask and etch stage is used to separate and divide the sidewall material, forming the distinct beams 718 and 720. The separation of the beams 718 and 720 at point 724 is achieved through a fourth process of photoresist dispense, and exposure through a mask. The photoresist pattern in this case is designed to protect the sidewall beam material against isotropic etching at all points except at the separation point 724.

As a final stage in the sidewall process, an encapsulating dielectric is deposited around the outside surfaces of the sidewall beams 716, 718 and 720.

In order to protect the shutter material deposited on the sidewalls 709 of the mold 703 and to produce the sidewall beams 716, 718 and 720 of substantially uniform cross section, some particular process guidelines can be followed. For instance, in FIG. 7B, the sidewalls 709 can be made as vertical as possible. Slopes at the sidewalls 709 and/or exposed surfaces become susceptible to the anisotropic etch. In some implementations, vertical sidewalls 709 can be produced by the patterning operation at FIG. 7B, such as the patterning of the second sacrificial material 705 in an anisotropic fashion. The use of an additional photoresist coating or a hard mask in conjunction with patterning of the second sacrificial layer 705 allows the use of aggressive plasmas and/or high substrate bias in the anisotropic etch of the second sacrificial material 705 while mitigating against excessive wear of the photoresist. Vertical sidewalls 709 also can be produced in photoimageable sacrificial materials as long as care is taken to control the depth of focus during the UV exposure and excessive shrinkage is avoided during final cure of the resist.

Another process guideline that helps during sidewall beam processing relates to the conformality of the shutter material deposition. The surfaces of the mold 703 can be covered with similar thicknesses of the shutter material, regardless of the orientation of those surfaces, either vertical or horizontal. Such conformality can be achieved when depositing with CVD. In particular, the following conformal techniques can be employed: PECVD, low pressure chemical vapor deposition (LPCVD), and atomic or self-limited layer deposition (ALD). In the above CVD techniques the growth rate of the thin film can be limited by reaction rates on a surface as opposed to exposing the surface to a directional flux of source atoms. In some implementations, the thickness of material grown on vertical surfaces is at least 50% of the thickness of material grown on horizontal surfaces. Alternatively, shutter materials can be conformally deposited from solution by electroless plating or electroplating, after a metal seed layer is provided that coats the surfaces before plating.

To reduce a capacitive coupling with underlying electrically conductive layers, electrical interconnects can be formed so as to have a vertical orientation. The vertical orientation of the electrical interconnects provides greater spacing of some of the interconnect material used to form the vertically oriented electrical interconnects relative to the underlying electrically conductive layers. As a result, the electrical interconnects can provide lower data loading power and/or a faster signal propagation rate and, therefore, a faster switching rate for a display. In some implementations, a vertical orientation of electrical interconnects is attained by configuring the interconnects with a cross sectional aspect ratio that is at least or greater than 1:1 and less than about 10:1. Interconnects having a cross sectional aspect ratio that is at least or greater than 1:1 and less than about 10:1 are referred to as high-aspect ratio interconnects. That is, the interconnects are at least as tall, if not significantly taller, than they are wide. A cross sectional width of such higher-aspect ratio interconnects can be below, and in some implementations well below, a patterning resolution or minimum feature size attainable by the photolithography process used to manufacture the display, thereby attaining a reduced footprint. In other implementations, a vertical orientation of electrical interconnects is attained by suspending the interconnects over a substrate by anchors. The suspended interconnects can be higher-aspect ratio interconnects or lower-aspect ratio interconnects. The elevation of the interconnects by the anchors further reduces a footprint of the interconnects on a substrate surface to areas taken up by the anchors.

Higher-aspect ratio interconnects can be formed using a sidewall manufacturing process in which an interconnect material is conformally deposited on exposed sidewalls of a mold, followed by anisotropic etching to yield the interconnects as sidewall features. Suspended interconnects can be formed using a manufacturing process in which an anchor material is disposed over a substrate, followed by deposition of an interconnect material over the anchor material to yield interconnects that are suspended over the substrate by anchors. In some implementations of the manufacturing process, the interconnects and the anchors are formed as sidewall features, yielding suspended, higher-aspect ratio interconnects. In other implementations of the manufacturing process, suspended, lower-aspect ratio interconnects are formed by a photolithographic patterning process, instead of a sidewall process.

Figure 8:
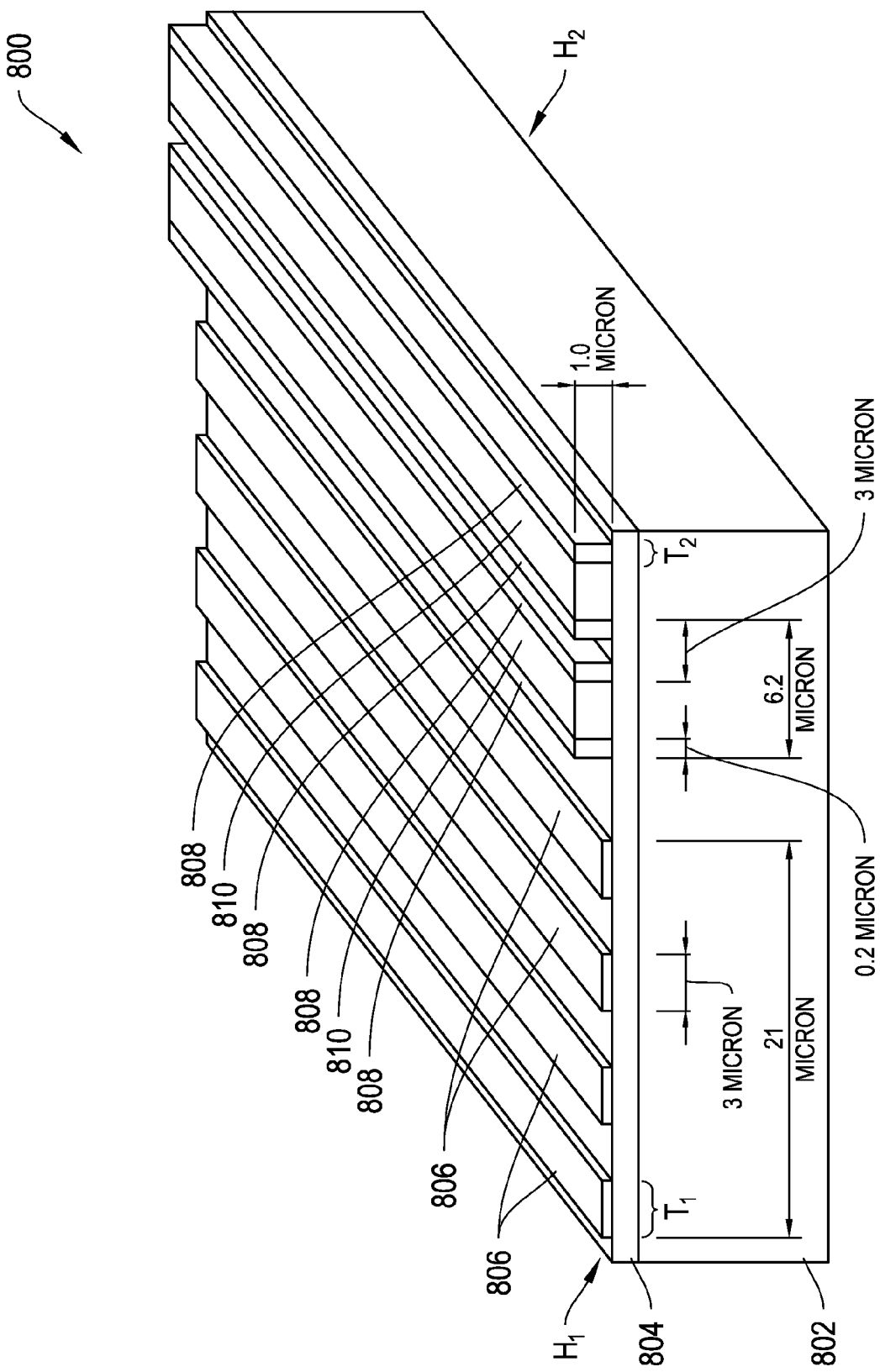
FIG. 8 shows an example perspective view of a display assembly to demonstrate differences between traditional lower-aspect ratio interconnects and higher-aspect ratio interconnects described herein.

FIG. 8 shows an example perspective view of a display assembly 800 to demonstrate differences between traditional lower-aspect ratio interconnects and higher-aspect ratio interconnects described herein. The assembly 800 includes a substrate 802 upon which an aperture layer 804 is formed. As depicted in FIG. 8, the substrate 802 is a transparent substrate formed of, for example, a glass or a plastic, although opaque materials also are suitable candidate materials for the substrate 802 in some implementations. In addition to the aperture layer 804, one or more electrically conducting layers are deposited over the substrate 802 and patterned to form a network of electrical interconnects. As depicted in FIG. 8, at least one layer of electrical interconnects is formed over the aperture layer 804 and any underlying layers of electrical interconnects. The left-hand side of the substrate 802 includes four traditional interconnects 806, each having a cross sectional aspect ratio that is less than 1:1. In other words, a cross sectional height of each traditional interconnect 806 (labeled as "$H_1$" in FIG. 8) along a direction substantially orthogonal to an upper surface of the substrate 802 is less than a cross sectional thickness or width of each traditional interconnect 806 (labeled as "$T_1$" in FIG. 8) along a direction substantially parallel to the upper surface of the substrate 802, such that $H_1/T_1:1$ is less than 1:1. The right-hand side of the substrate 802 includes two pairs (for a total of four) of higher-aspect ratio interconnects 808, each having a cross sectional aspect ratio that is at least or greater than 1:1. In other words, a cross sectional height of each higher-aspect ratio interconnect 808 (labeled as "$H_2$" in FIG. 8) along a direction substantially orthogonal to the upper surface of the substrate 802 is at least as large, if not larger, than a cross sectional thickness or width of each higher-aspect ratio interconnect 808 (labeled as "$T_2$" in FIG. 8) along a direction substantially parallel to the upper surface of the substrate 802, such that $H_2/T_2:1$ is at least or greater than 1:1.

In some implementations, thin film patterning techniques used for patterning circuits on glass panels, plastic panels, or other transparent substrates can have a resolution on the order of several microns. In contrast, thin film deposition thicknesses used for such applications can be controlled with a resolution on the order of tenths of microns. For the example depicted in FIG. 8, both the traditional interconnects 806 and the higher-aspect ratio interconnects 808 are formed over the substrate 802 using a photolithography equipment having a patterning resolution of about 3 microns. That is, the smallest feature size formed by photolithographic patterning, whether it be the presence of a material or an absence of the material, is at least about 3 microns across. Thus, as depicted in FIG. 8, forming the four traditional interconnects 806 takes up about 21 microns of space, with about 3 microns for each interconnect 806, and about 3 microns for each gap between the interconnects 806.

In contrast to the four traditional interconnects 806 taking up about 21 microns of space, the four higher-aspect ratio interconnects 808 take up about 9.4 microns of space. For the example depicted in FIG. 8, an interconnect material forming each of the interconnects 808 is deposited to a thickness of about 0.2 microns on a mold 810 that is formed using the 3 micron resolution patterning process. The raised portions or mesas of the mold 810 each are about 3 microns across, as is a gap between the raised portions. The interconnects 808, which are patterned using a sidewall manufacturing process instead of a traditional photolithographic patterning process, extend about 0.2 microns in either direction away from the raised portions of the mold 810, adding an extra 0.4 microns in width. In such an implementation, the incorporation of the higher-aspect ratio interconnects 808 saves about 12 microns across the four interconnects 808, allowing an additional 3 microns of space per interconnect 808. Stated in another way, the higher-aspect ratio interconnects 808 depicted on the right-hand side of FIG. 8 are formed with about twice the density of the traditional interconnects 806, or take up about half of the space taken up by the traditional interconnects 806. A display apparatus incorporating such reduced footprint interconnects 808 would have more space on the substrate 802 to dedicate to image formation, such as by allowing the display apparatus to employ a greater aperture ratio. It should be noted that the specific dimensions depicted in FIG. 8 are provided as examples. The higher-aspect ratio interconnects 808 can be implemented with other dimensions to provide other interconnect densities and footprints, saving more or less space than set forth above.

In addition, by orienting the interconnects 808 vertically according to their higher aspect ratios, more of the interconnect material is spaced further away from the aperture layer 804 and any underlying layers of electrical interconnects in comparison to the traditional interconnects 806, thereby reducing a capacitive coupling that otherwise can adversely impact a signal propagation rate. Even though a cross sectional area of the higher-aspect ratio interconnects 808 is depicted to be smaller than that of the traditional lower-aspect ratio interconnects 806, the vertical orientation of the higher-aspect ratio interconnects 808 reduces the capacitive coupling on the interconnects 808 imparted by underlying electrically conductive layers sufficiently to mitigate against or offset any detrimental impact the decreased area might have on the signal propagation rate. As a result, the higher-aspect ratio interconnects 808 provide a greater signal propagation rate and, therefore, a faster switching rate for a display apparatus incorporating such interconnects 808. Moreover, a desired signal propagation rate can be attained with the higher-aspect ratio interconnects 808, while reducing the amount of the interconnect material for reduced manufacturing costs.

Although specific cross sectional dimensions and ratios are depicted in the example of FIG. 8, a higher-aspect ratio interconnect, more generally, can include at least one portion having a cross sectional aspect ratio that is at least or greater than 1:1, such as at least or greater than about 1.3:1, at least or greater than about 1.5:1, at least or greater than about 1.8:1, at least or greater than about 2:1, at least or greater than about 2.3:1, at least or greater than about 2.5:1, at least or greater than about 2.8:1, at least or greater than about 3:1, at least or greater than about 3.3:1, at least or greater than about 3.5:1, at least or greater than about 3.8:1, at least or greater than about 4:1, at least or greater than about 4.3:1, at least or greater than about 4.5:1, at least or greater than about 4.8:1 or at least or greater than about 5:1, and up to about 6:1, up to about 7:1, up to about 8:1, up to about 9:1, up to about 10:1 or more. In some implementations, at least a certain fraction or percentage of an electrical interconnect can have a cross sectional aspect ratio as set forth above, such as at least about 20%, at least about 30%, at least about 40%, or at least a majority of the electrical interconnect across its length. A cross sectional aspect ratio of an electrical interconnect can be uniform or non-uniform across its length, and, in some implementations, the electrical interconnect includes a first portion having a cross sectional aspect ratio that is greater than 1:1 and a second portion having a cross sectional aspect ratio that is 1:1 or below. A cross sectional thickness or width of a higher-aspect ratio interconnect can be below, and in some implementations well below, a patterning resolution or minimum feature size attainable by the photolithography process used to manufacture the remainder of the display assembly 800, such as no greater than or less than about 2 microns, no greater than or less than about 1.8 microns, no greater than or less than about 1.5 microns, no greater than or less than about 1.3 microns, no greater than or less than about 1 microns, no greater than or less than about 0.8 microns, no greater than or less than about 0.5 microns or no greater than or less than about 0.3 microns, and down to about 0.2 microns, down to about 0.1 microns or less.

Figure 9:
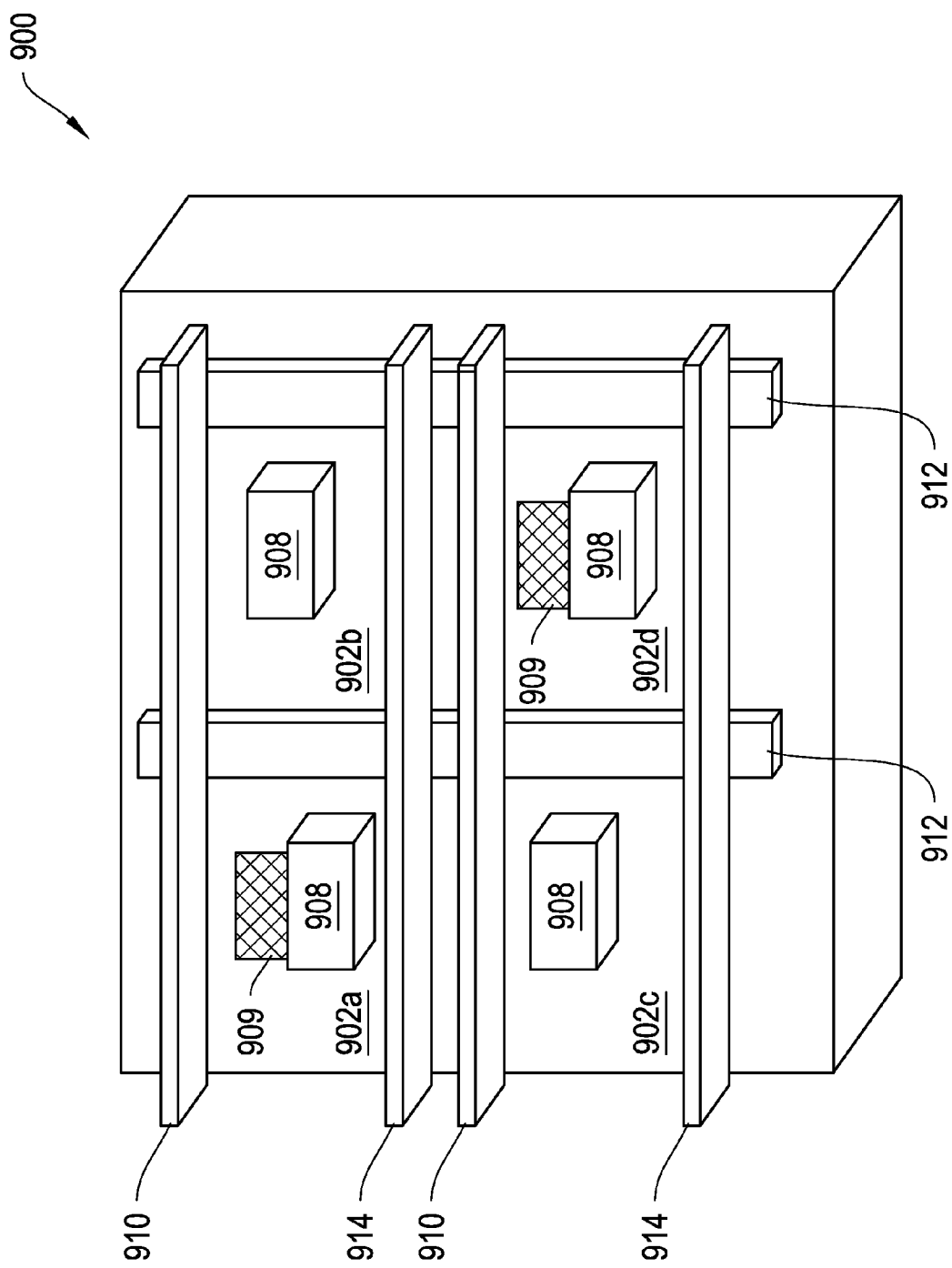
FIG. 9 shows an example schematic diagram of a direct-view EMS-based display apparatus incorporating higher-aspect ratio interconnects.

FIG. 9 shows an example schematic diagram of a direct-view EMS-based display apparatus 900 incorporating higher-aspect ratio interconnects. The display apparatus 900 includes an array of EMS light modulators 902a-902d (generally "light modulators 902") arranged in rows and columns. The array of EMS light modulators 902a-902d can correspond to an array of pixels in some implementations. In the example depicted in FIG. 9, each light modulator 902 is a shutter-based light modulator, including a shutter 908 and an aperture 909. Certain aspects of the display apparatus 900 are similarly implemented as previously described with reference to the display apparatus 100 depicted in FIG. 1A, and those aspects are not repeated below.

As depicted in FIG. 9, the display apparatus 900 also includes a network of electrical interconnects (e.g., interconnects 910, 912 and 914), including at least one write-enable interconnect 910 (also referred to as a "scan-line interconnect") connected to and shared by each row of pixels, one data interconnect 912 connected to and shared by each column of pixels, and one common interconnect 914 providing a common voltage to all pixels, or at least to pixels from both multiple columns and multiples rows in the display apparatus 900. In the example of FIG. 9, each of the interconnects 910 and 914 is implemented as a higher-aspect ratio interconnect, while the data interconnects 912 are implemented as lower-aspect ratio interconnects. In some other implementations, the data interconnects 912 can be implemented as higher-aspect ratio interconnects, and can be connected to thin film transistors such as those depicted in FIGS. 3A and 3B. In such implementations, the interconnects 910 and 914 can be implemented as higher-aspect ratio interconnects or lower-aspect ratio interconnects.

Figure 10:
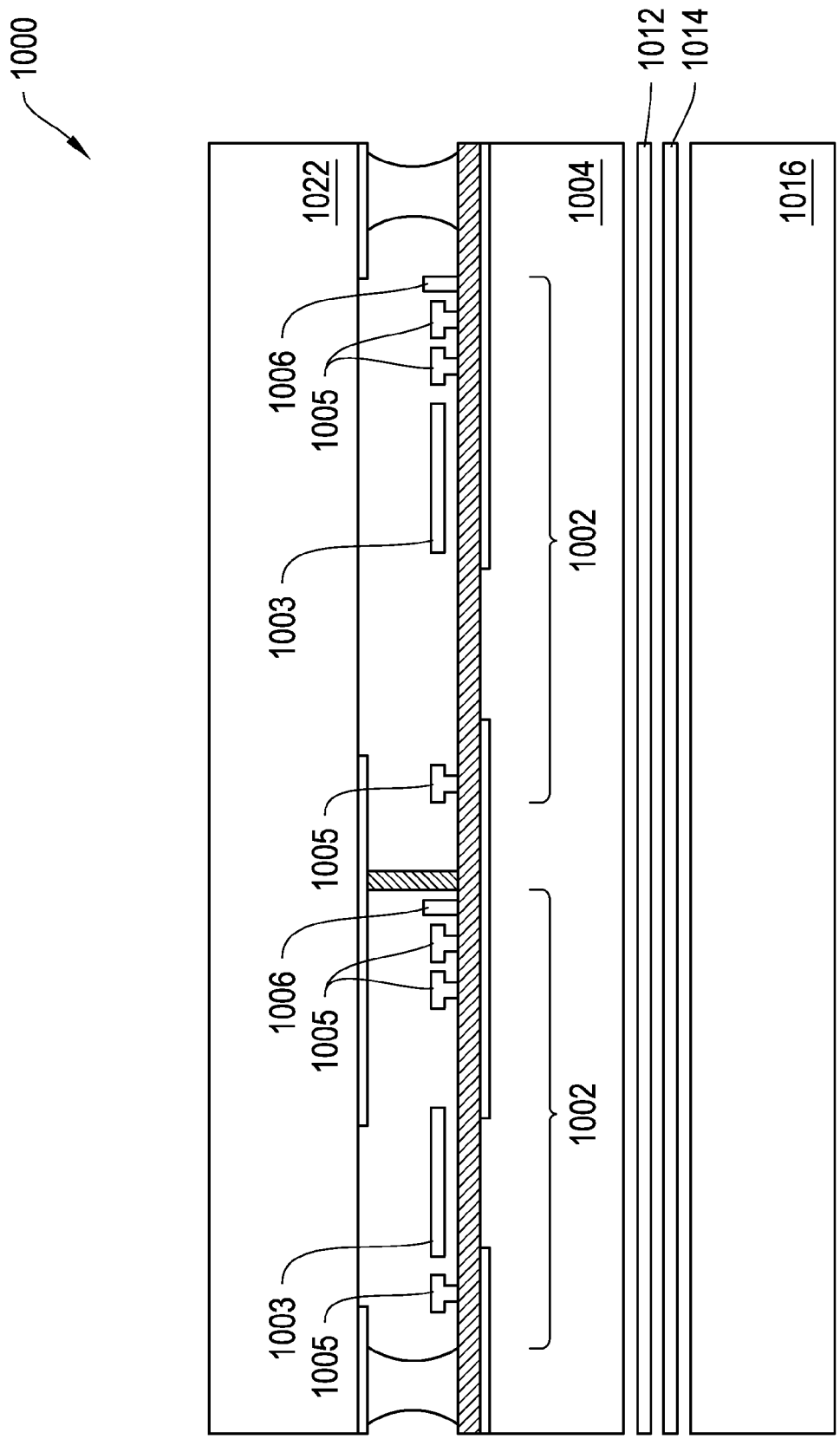
FIG. 10 shows an example cross sectional view of a display apparatus incorporating higher-aspect ratio interconnects.

FIG. 10 shows an example cross sectional view of a display apparatus 1000 incorporating higher-aspect ratio interconnects. The display apparatus 1000 includes a cover plate 1022, a transparent substrate 1004, an optional diffuser 1012, and an optional brightness enhancing film 1014, which separates the substrate 1004 from a planar light guide 1016. Certain aspects of the display apparatus 1000 are similarly implemented as previously described with reference to the display apparatus 500 depicted in FIG. 5, and those aspects are not repeated below.

As depicted in FIG. 10, the display apparatus 1000 includes an array of shutter-based light modulators (shutter assemblies) 1002. Each shutter assembly 1002 incorporates a shutter 1003 and anchors 1005. Scan-line interconnects 1006 are implemented as higher-aspect ratio interconnects, and each scan-line interconnect 1006 electrically connects a write-enabling voltage signal to a corresponding row of shutter assemblies 1002. Not shown are data interconnects and common interconnects, which also can be implemented as higher-aspect ratio interconnects. Although FIG. 10 relates to an EMS display, higher-aspect ratio interconnects can be incorporated into other types of displays, such as a display that generates images by modulating light using liquid crystal cells, light taps, or electrowetting cells, as well as a display that generates images by selectively emitting light, such as a plasma or OLED display.

Figure 11:
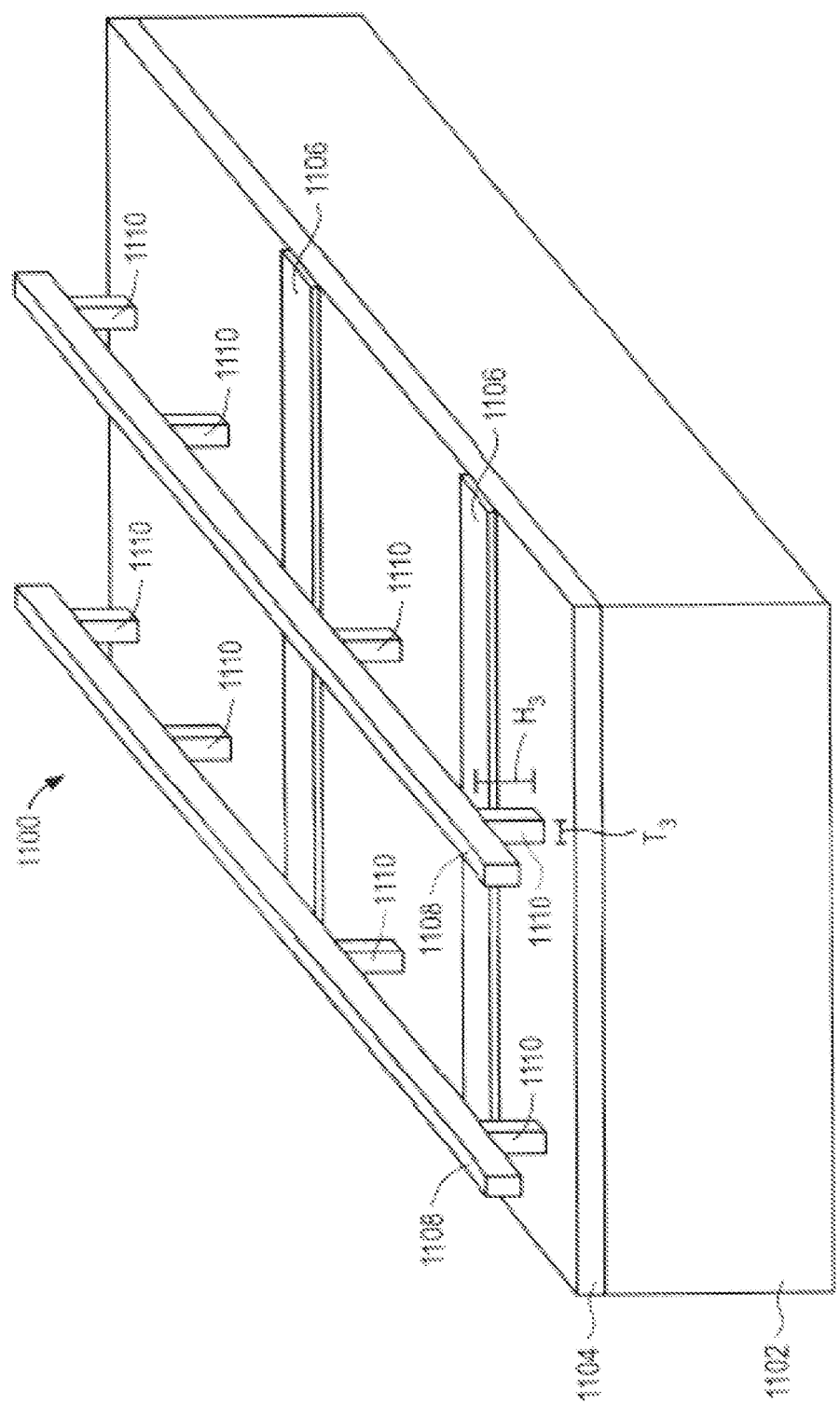
FIG. 11 shows an example perspective view of a display assembly incorporating higher-aspect ratio interconnects.

FIG. 11 shows an example perspective view of another display assembly 1100 incorporating higher-aspect ratio interconnects. The assembly 1100 includes a substrate 1102 upon which an aperture layer 1104 is formed. As depicted in FIG. 11, the substrate 1102 is a transparent substrate formed of, for example, a glass or a plastic, although opaque materials also are suitable candidate materials for the substrate 1102 in other implementations. In addition to the aperture layer 1104, one or more electrically conducting layers are deposited over the substrate 1102 and patterned to form a network of electrical interconnects. As depicted in FIG. 11, at least one layer of electrical interconnects 1108 is formed over the aperture layer 1104 and any underlying layers of electrical interconnects. Specifically, the interconnects 1108 are implemented as higher-aspect ratio interconnects, with cross sectional dimensions and ratios similar to the interconnects 808 depicted in FIG. 8.

As depicted in FIG. 11, the higher-aspect ratio interconnects 1108 are suspended or supported at an elevated plane over the underlying substrate 1102 by anchors 1110. For the example depicted in FIG. 11, the anchors 1110 are discrete structures that are spaced apart from one another along a direction substantially parallel to an upper surface of the substrate 1102, and are arranged in rows and columns. Each of the interconnects 1108 is suspended by and extends substantially linearly on top of a group of the anchors 1110, which are successively arranged to form a particular row or column. In the example of FIG. 11, at least two (or at least three) successive anchors 1110 along a particular row or column are substantially electrically isolated from one another below the elevated plane of the interconnect 1108. Stated in another way, an electrical pathway between the successive anchors 1110 occurs through the interconnect 1108 at the elevated plane, with little or no additional electrical pathway between the anchors 1110 at a lower plane below the interconnect 1108. The arrangement of the interconnects 1108 and the anchors 1110 can be varied for other implementations, such as in which the interconnects 1108 and the anchors 1110 are arranged in a curved, jagged, or irregular pattern, or in which at some of the anchors 1110 are merged or fused.

By elevating the interconnects 1108 over the aperture layer 1104 and any underlying layers of electrical interconnects, capacitive coupling with such layers is further reduced, thereby further increasing a signal propagation rate along the interconnects 1108 and/or decreasing the power associated with propagating a signal along the interconnects. Also, the elevation of the interconnects 1108 by the anchors 1110 further reduces a footprint of the interconnects 1108 on the substrate surface to areas taken up by the anchors 1110, thereby allowing a space below the interconnects 1108 and between the anchors 1110 to be re-dedicated for additional interconnects or for other uses. As depicted in FIG. 11, additional interconnects 1106, which are implemented as traditional lower-aspect ratio interconnects, extend crosswise relative to the interconnects 1108, and extend below the interconnects 1108 and through gaps between the anchors 1110. In the example depicted in FIG. 11, the interconnects 1106 are substantially orthogonal to the interconnects 1108, although other crossing angles are contemplated, such as from about 1° to about 90°, from about 5° to about 90°, from about 20° to about 90°, from about 45° to about 90°, from about 90° to about 179°, from about 90° to about 175°, from about 90° to about 160° or from about 90° to about 135°. In some other implementations, at least one of the interconnects 1106 can be implemented as a higher-aspect ratio interconnect.

The anchors 1110 can be formed of the same or a similar material as the interconnects 1108, thereby allowing the formation of electrical connections through the anchors 1110 to underlying interconnects or to other components formed on or over the substrate 1102, such as a thin film transistor or a light modulator. In other implementations, at least some of the anchors 1110 can be formed of a different material, such as a material selected for its mechanical or load bearing properties. When incorporated in a display apparatus, the interconnects 1108 can be positioned, for instance, at the same or similar level as various structural components of an EMS light modulator. In some implementations, the interconnects 1108 can be suspended at the same or similar level as actuator beams used to actuate an EMS shutter-based light modulator. In such implementations, the interconnect 1108 can serve, for instance, as a column interconnect carrying data across a column of light modulators, or a row interconnect carrying a write-enabling signal across a row of light modulators. The interconnects 1108 also can serve, for instance, as a common interconnect among multiple rows and multiple columns of light modulators.

As depicted in FIG. 11, the anchors 1110 themselves have a cross sectional aspect ratio (corresponding to $H_3/T_3$:1 as labeled in FIG. 11) that is at least or greater than 1:1, such as at least or greater than about 1.3:1, at least or greater than about 1.5:1, at least or greater than about 1.8:1, at least or greater than about 2:1, at least or greater than about 2.3:1, at least or greater than about 2.5:1, at least or greater than about 2.8:1, at least or greater than about 3:1, at least or greater than about 3.3:1, at least or greater than about 3.5:1, at least or greater than about 3.8:1, at least or greater than about 4:1, at least or greater than about 4.3:1, at least or greater than about 4.5:1, at least or greater than about 4.8:1 or at least or greater than about 5:1, and up to about 6:1, up to about 7:1, up to about 8:1, up to about 9:1, up to about 10:1 or more. A cross sectional thickness or width of the anchors 1110 (labeled as "$T_3$" in FIG. 11) is below, and in some implementations well below, a patterning resolution or minimum feature size attainable by the photolithography process used to manufacture the remainder of the display assembly 1100, such as no greater than or less than about 2 microns, no greater than or less than about 1.8 microns, no greater than or less than about 1.5 microns, no greater than or less than about 1.3 microns, no greater than or less than about 1 microns, no greater than or less than about 0.8 microns, no greater than or less than about 0.5 microns or no greater than or less than about 0.3 microns, and down to about 0.2 microns, down to about 0.1 microns or less. The cross sectional dimensions and ratios of the anchors 1110 can be varied for other implementations, such as in which the cross sectional aspect ratio of at least some of the anchors 1110 is less than 1:1, or in which the cross sectional thickness or width of at least some of the anchors 1110 is greater than about 2 microns.

Figure 12:
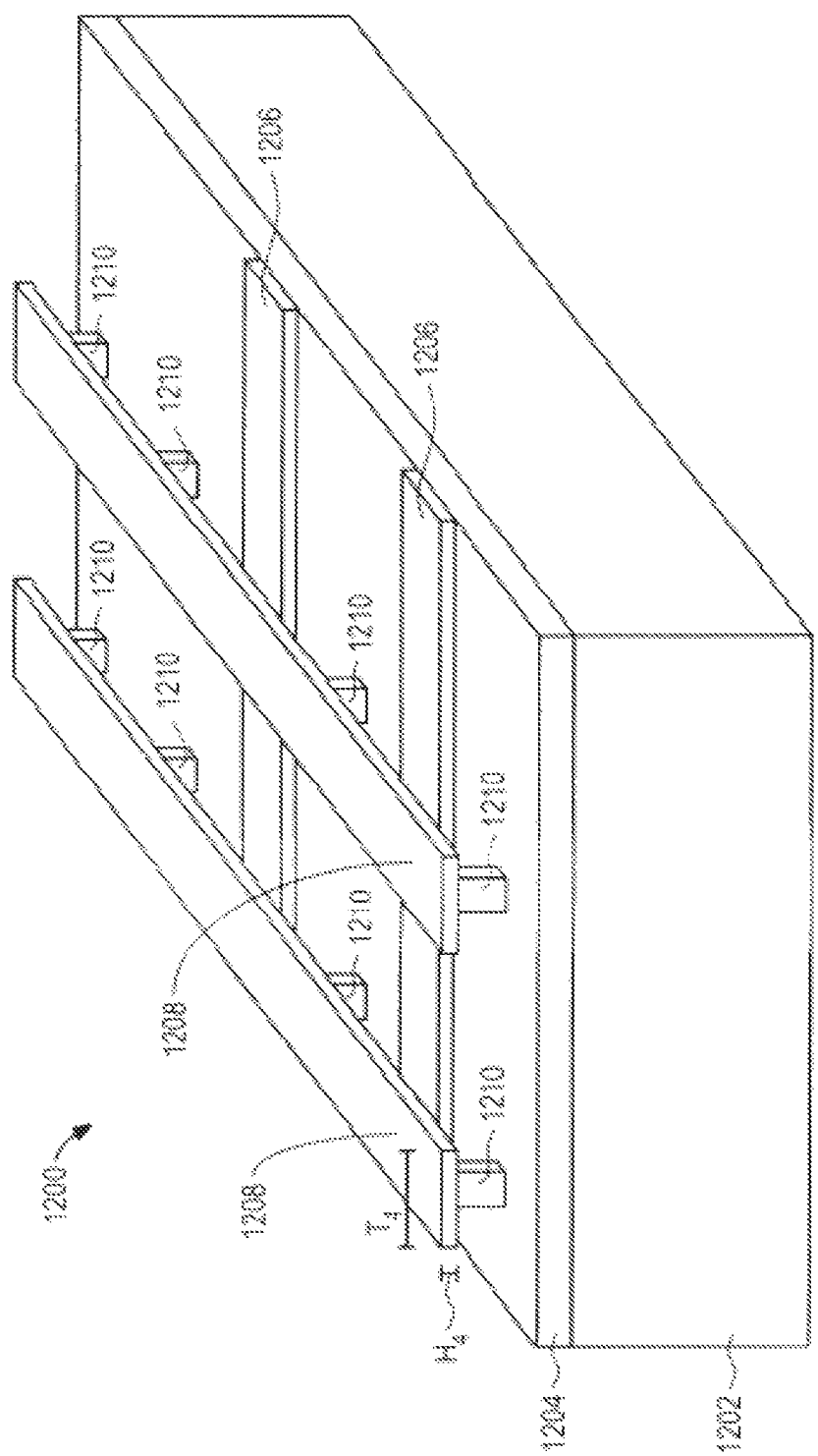
FIG. 12 shows an example perspective view of a display assembly incorporating suspended interconnects.

FIG. 12 shows an example perspective view of another display assembly 1200 incorporating suspended interconnects. The assembly 1200 includes a substrate 1202 upon which an aperture layer 1204 is formed. As depicted in FIG. 12, the substrate 1202 is a transparent substrate formed of, for example, a glass or a plastic, although opaque materials also are suitable candidate materials for the substrate 1202 in other implementations. In addition to the aperture layer 1204, one or more electrically conducting layers are deposited over the substrate 1202 and patterned to form a network of electrical interconnects. As depicted in FIG. 12, at least one layer of electrical interconnects 1208 is formed over the aperture layer 1204 and any underlying layers of electrical interconnects. Specifically, and similar to the interconnects 1108 depicted in FIG. 11, the interconnects 1208 are suspended or supported over the underlying substrate 1202 by anchors 1210, with properties similar to those previously described with reference to the anchors 1110 depicted in FIG. 11.

In contrast to the suspended, higher-aspect ratio interconnects 1108 depicted in FIG. 11, the suspended interconnects 1208 depicted in FIG. 12 are implemented as lower-aspect ratio interconnects. Even though a cross sectional ratio of the interconnects 1208 (corresponding to $H_4/T_4$:1 as labeled in FIG. 12) is no greater than or less than 1:1, such as no greater than about 0.8:1, no greater than about 0.5:1, no greater than about 0.3:1 or no greater than about 0.1:1, the elevation of the interconnects 1208 by the anchors 1210 reduces a capacitive coupling on the interconnects 1208 imparted by underlying electrically conductive layers. As a result, a desired signal propagation rate can be attained with the lower-aspect ratio interconnects 1208, which can be formed by a traditional photolithographic patterning process. Also, the elevation of the interconnects 1208 by the anchors 1210 reduces a footprint of the interconnects 1208 on the substrate surface to areas taken up by the anchors 1210, thereby allowing a space below the interconnects 1208 and between the anchors 1210 to be re-dedicated for additional interconnects or for other uses. As depicted in FIG. 12, additional interconnects 1206 extend below the interconnects 1208 and through gaps between the anchors 1210. In the example depicted in FIG. 12, the interconnects 1206 are substantially orthogonal to the interconnects 1208, although other crossing angles are contemplated, such as from about 1° to about 90°, from about 5° to about 90°, from about 20° to about 90°, from about 45° to about 90°, from about 90° to about 179°, from about 90° to about 175°, from about 90° to about 160° or from about 90° to about 135°.

The higher-aspect ratio interconnects and suspended interconnects described with reference to FIGS. 8-12 can be incorporated in a variety of EMS-based displays and EMS-based display assemblies, such as those described with reference to FIGS. 1A-7D. In addition to EMS-based displays, the interconnects described herein also can be incorporated in other types of displays, such as LCD, OLED, electrophoretic displays, and field emission displays. For instance, while electrodes that apply an electrical field across a LCD cell are typically formed of a transparent conducting material, such as indium-tin-oxide (ITO), interconnects connecting such electrodes to drivers are typically formed as traditional non-transparent metal lines. By replacing such traditional lower-aspect ratio interconnects with higher-aspect ratio or suspended interconnects described herein, substantial space can be saved, thereby allowing for larger color filters, a higher aperture ratio, and a brighter display.

FIG. 13A shows an example perspective view of an EMS-based display apparatus 1300 incorporating suspended interconnects. The display apparatus 1300 includes an array of EMS light modulators 1302 (generally "light modulators 1302") arranged in rows and columns over a substrate 1310. In the example depicted in FIG. 13A, each light modulator 1302 is a shutter-based light modulator, including a shutter 1304 that is supported over the substrate 1310 by beams 1306 and anchors 1308.

The display apparatus 1300 also includes a network of electrical interconnects, including at least one row interconnect 1312 connected to and shared by a row of light modulators 1302 and at least one column interconnect 1314 connected to and shared by a column of light modulators 1302. In some implementations, the row interconnects 1312 can correspond to scan-line interconnects or common interconnects, while the column interconnects 1314 can correspond to data interconnects. In the example of FIG. 13A, the column interconnects 1314 are implemented as suspended interconnects that are supported over the underlying substrate 1310 by anchors 1316 and 1318. The anchors 1316 have properties similar to those previously described with reference to the anchors 1110 depicted in FIG. 11. The anchors 1318 support ends of the column interconnects 1314, and are implemented as extended anchors with multiple contacts 1320 to circuitry on or within the substrate 1310 to reduce contact resistance.

In some implementations, the circuitry can be connected to one or more drivers, such as data drivers, scan drivers, or common drivers.

Referring to FIG. 13A, the column interconnects 1314 are positioned at the same or similar height as various components of the light modulators 1302. For example, the column interconnects 1314 can be suspended at the same or similar height as the shutters 1304, such that an upper surface of at least one column interconnect 1314 is substantially aligned or co-planar with an upper surface of at least one shutter 1304. Such positioning of the column interconnects 1314 and the shutters 1304 can mitigate against the likelihood of vertical displacement of the shutters 1304 towards or away from the substrate 1310, which might otherwise result from electrostatic or other interaction between the column interconnects 1314 and the shutters 1304. By elevating the column interconnects 1314 over the substrate 1310 and any underlying layers of electrical interconnects, the capacitive coupling between the column interconnects 1314 and such layers is reduced. As depicted in FIG. 13A, the row interconnects 1312 extend crosswise relative to the column interconnects 1314, and extend below the column interconnects 1314 and through gaps between the anchors 1316. In some other implementations, the row interconnects 1312 can be implemented as suspended interconnects, while the column interconnects 1314 can extend below the row interconnects 1312. In some other implementations, at least one of the row interconnects 1312 and the column interconnects 1314 can be implemented as a higher-aspect ratio interconnect, such as described with respect to FIG. 8.

In the example of FIG. 13A, the column interconnects 1314 and the anchors 1316 and 1318 are formed in conjunction with various components of the light modulators 1302 using a common manufacturing process, such as described in relation to FIGS. 6A-6E and FIGS. 7A-7D. In some implementations, the column interconnects 1314, the anchors 1316 and 1318 and the light modulators 1302 are formed using at least one common deposition and patterning stage. In such implementations, at least one layer of each column interconnect 1314 and at least one corresponding layer of each light modulator 1302 are formed from the same material that is deposited over the substrate 1310 and patterned. Likewise, at least one layer of each anchor 1316 or 1318 is formed from the same material that is used to form corresponding layers of the column interconnects 1314 and the light modulators 1302. In addition to sharing the same material, corresponding layers of the column interconnects 1314, the anchors 1316 and 1318 and the light modulators 1302 can share other properties, such as having substantially the same thickness, substantially the same surface roughness, and so forth.

FIG. 13B and FIG. 13C show cross sectional views of portions of the display apparatus 1300 of FIG. 13A. The cross section of FIG. 13B is taken across the column interconnect 1314 and a side portion of the shutter 1304 at line A-A' of FIG. 13A. The cross section of FIG. 13C is taken across the anchor 1316 (supporting the column interconnect 1314) at line B-B' of FIG. 13A.

Referring to FIG. 13B and FIG. 13C, the column interconnect 1314, the shutter 1304 and the anchor 1316 are formed from the same material that is deposited and patterned to form corresponding portions of a mechanical layer 1322. Candidate materials for the mechanical layer 1322 include those described in relation to the mechanical layers 605 and 609 of FIGS. 6A-6E. In addition, the column interconnect 1314, the shutter 1304 and the anchor 1316 are formed from the same material that is deposited and patterned to form corresponding portions of a conductor layer 1324. Candidate materials for the conductor layer 1324 include those described in relation to the conductor layer 607 of FIGS. 6A-6E. Although a two-layer stack or composite is depicted in FIG. 13B and FIG. 13C, more or fewer layers can be shared between the column interconnect 1314, the shutter 1304 and the anchor 1316.

Figure 14:
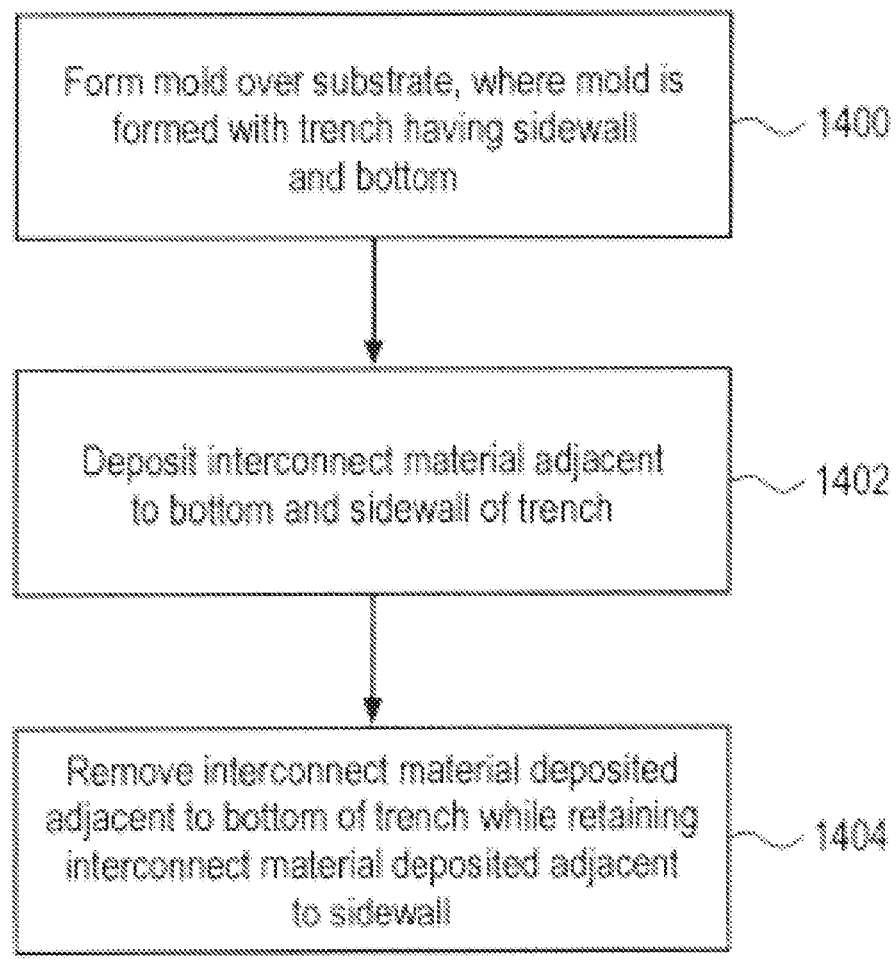
FIG. 14 shows a flow diagram of an example manufacturing process of a display assembly incorporating higher-aspect ratio interconnects.

FIG. 14 shows a flow diagram of an example manufacturing process of a display assembly incorporating higher-aspect ratio interconnects. In block 1400, a mold is formed over a substrate, where the mold is formed with a trench having a sidewall and a bottom. In block 1402, an interconnect material is deposited adjacent to the bottom and the sidewall of the trench. In block 1404, the interconnect material deposited adjacent to the bottom of the trench is removed while retaining at least a portion of the interconnect material deposited adjacent to the sidewall to form an electrical interconnect. In some implementations, the process of FIG. 14 can be carried out in conjunction with the formation of a light modulator, such as a shutter-based light modulator. In such implementations, the electrical interconnect and the light modulator can share at least one common layer that is formed from the same interconnect material. Further aspects of the manufacturing process are described below in relation to FIGS. 15A-15E and FIGS. 16A-16F.

FIGS. 15A-15E show stages of construction of an example display assembly 1500. The depicted process yields higher-aspect ratio interconnects 1502, which have a thickness well below the conventional lithography limits on large glass panels (used for display fabrication) or other transparent substrates (used for display fabrication). In the process depicted in FIGS. 15A-15E, the higher-aspect ratio interconnects 1502 are formed as sidewall features on a mold 1504. The process is referred to as a sidewall interconnects process.

Figure 15:
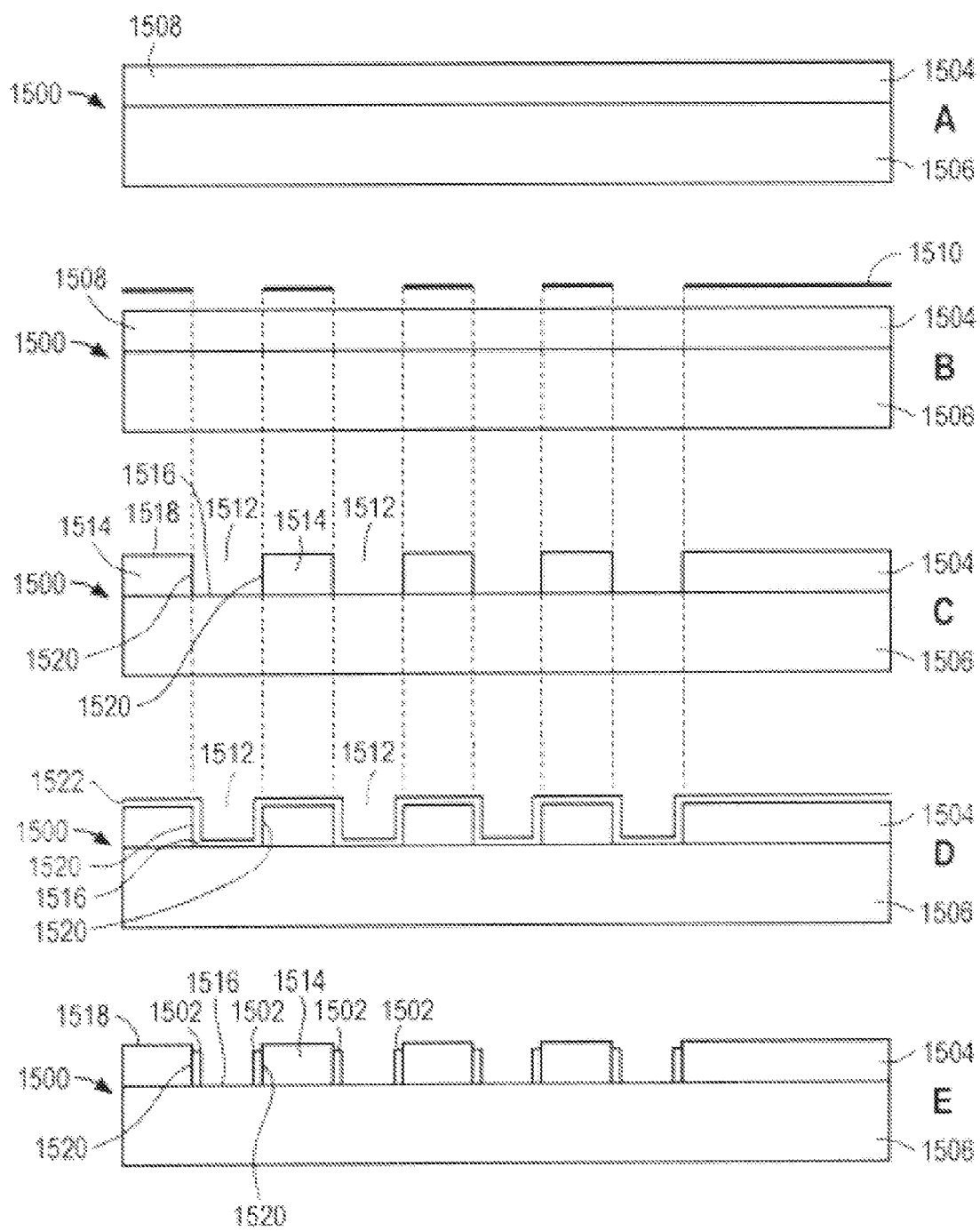
FIGS. 15A-15E show stages of construction of an example display assembly incorporating higher-aspect ratio interconnects.

The process of forming the display assembly 1500 begins, as depicted in FIGS. 15A-15C and block 1400 of FIG. 14, with the formation of the mold 1504 over a substrate 1506. The formation of the mold 1504 is carried out by deposition of a mold material 1508 on the substrate 1506, as depicted in FIG. 15A, followed by patterning of the mold material 1508 using a photomask 1510, as depicted in FIGS. 15B and 15C. Although not depicted in FIGS. 15A-15C, one or more additional layers can be disposed between the substrate 1506 and the mold material 1508. The resulting pattern defined in the mold material 1508 creates elongated openings or trenches 1512 within which the interconnects 1502 for the display assembly 1500 eventually will be formed. The deposition and patterning of the mold material 1508 is similar in concept, and uses similar materials and techniques, as those described for the deposition and patterning of sacrificial layer materials described in relation to FIGS. 6A-6E and FIGS. 7A-7D.

FIG. 15C shows the shape of the mold 1504 that is created after patterning of the mold material 1508. The mold 1504 includes the trenches 1512, which expose the underlying substrate 1506 and are separated by mesas 1514. For other implementations, the patterning of the mold material 1508 can be controlled such that the trenches 1512 partially extend through the mold material 1508, without exposing the underlying substrate 1506. The mold 1504 in FIG. 15C includes or establishes two distinct horizontal levels or surfaces. A bottom horizontal surface 1516 is established by a top surface of the underlying substrate 1506 at locations exposed by the trenches 1512, and a top horizontal surface 1518 is established by a top surface of the mold material 1508 at locations corresponding to the mesas 1514. The mold 1504 depicted in FIG. 15C also includes substantially vertical sidewalls 1520 bounding the trenches 1512. In some other implementations, a profile of the sidewalls 1520 can take on other shapes, such as tapered, curved, or reentrant.

The process of forming the interconnects 1502 continues with the deposition of an interconnect material 1522 onto exposed surfaces of the mold 1504, as depicted in FIG. 15D and block 1402 in FIG. 14. Although one layer of the interconnect material 1522 is depicted in FIG. 15D, multiple layers of the same material or different materials can be deposited in other implementations. Suitable candidates for the interconnect material 1522 are described above with respect to the conductor layer 607 of FIGS. 6A-6E. As depicted in FIG. 15D, the interconnect material 1522 is deposited on the top horizontal surface 1518 of the mold 1504, as well as in the trenches 1512 so as to cover the bottom horizontal surface 1516 and the sidewalls 1520. The interconnect material 1522 is deposited to a thickness of less than about 2 microns. In some implementations, the interconnect material 1522 is deposited to have a thickness that is no greater than or less than about 1.5 microns. In other implementations, the interconnect material 1522 is deposited to have a thickness that is no greater than or less than about 1 microns. In some other implementations, the interconnect material 1522 is deposited to have a thickness that is no greater than or less than about 0.8 microns, and, in some implementations, as thin as about 0.10 microns or less.

The manufacturing process continues with the preferential or selective removal of portions of the interconnect material 1522 by applying an anisotropic etch, according to block 1404 in FIG. 14 and resulting in the structure depicted in FIG. 15E. The anisotropic etch of the interconnect material 1522 is similar in concept, and uses similar materials and techniques, as those described in relation to FIGS. 7A-7D. For instance, the anisotropic etch of the interconnect material 1522 can be carried out in a plasma atmosphere with a voltage bias applied to the substrate 1506 or to an electrode in proximity to the substrate 1506. Along the sidewalls 1520 of the mold 1504, the interconnect material 1522 is substantially protected from the anisotropic etch. Such protected portions of the interconnect material 1522 form the higher-aspect ratio interconnects 1502. Along other horizontal surfaces, such as the top horizontal surface 1518 or the bottom horizontal surface 1516, the interconnect material 1522 is largely or substantially completely removed by the etch.

A cross sectional thickness of the interconnects 1502, as formed adjacent to the sidewalls 1520 of the mold 1504, is similar to the thickness of the interconnect material 1522 as deposited. In some implementations, the cross sectional thickness of the interconnects 1502 can be smaller than the thickness of the interconnect material 1522 as deposited. A cross sectional height of the interconnects 1502 is determined by a thickness of the mold material 1508 as deposited, or, in other words by a depth of the trenches 1512 as created during the patterning operation described in relation to FIG. 15B and FIG. 15C. As long as the thickness of the interconnect material 1522 is chosen to be less than about 2 microns, the process depicted in FIGS. 15A-15E is well suited for the production of narrow, higher-aspect ratio interconnects. Conventional photolithography would yield patterned features to much larger dimensions, for instance allowing minimum resolved features no smaller than about 2 microns or about 5 microns.

In some implementations, an optional stage involves removal of the mold 1504, thereby releasing the interconnects 1502 from the mold 1504 as freestanding structures. In some other implementations, the mold 1504 is at least partially retained, such as by retaining the mesas 1514 to support the interconnects 1502. Details for removing the sacrificial material forming the mold are described above with respect to FIG. 6E.

FIGS. 16A-16F show stages of construction of an example display assembly 1600. The depicted process yields higher-aspect ratio interconnects 1602 that are suspended by anchors 1604. In the process depicted in FIGS. 16A-16F, both the higher-aspect ratio interconnects 1602 and the anchors 1604 are formed as sidewall features according to a sidewall interconnects process.

Figure 16:
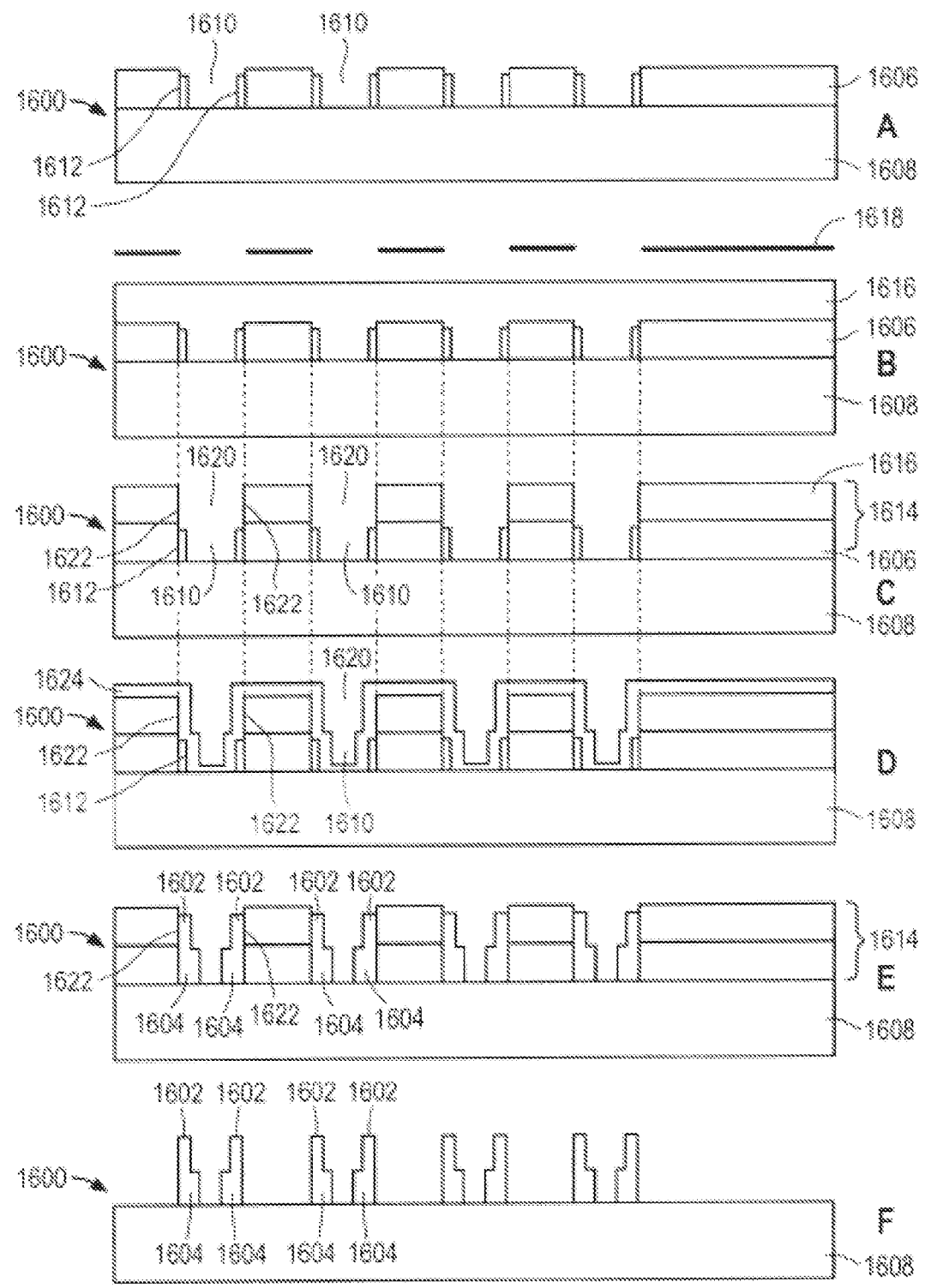
FIGS. 16A-16F show stages of construction of an example display assembly incorporating suspended, higher-aspect ratio interconnects.

The process proceeds with the display assembly 1600 in a stage as depicted in FIG. 16A, with a first mold layer 1606 that is formed over a substrate 1608 by deposition and patterning. The resulting pattern defined in the first mold layer 1606 creates openings or vias 1610 within which an anchor material 1612 is disposed by a sidewall process. The formation of the display assembly 1600 in the stage as depicted in FIG. 16A is similar in concept, and uses similar materials and techniques, as those described for the formation of the display assembly 1500 in relation to FIGS. 15A-15E. One difference is that the anchor material 1612 depicted in FIG. 16A is segmented as discrete structures along a direction extending into the page, rather than a single continuous structure extending along a greater length. In some implementations, the shorter segments of the anchor material 1612 can be formed by patterning the first mold layer 1606 such that the openings 1610 have a corresponding segmented arrangement. In some other implementations, the shorter segments of the anchor material 1612 can be formed by etching to separate or decouple the segments from one another, such as by removing intervening portions of the anchor material 1612.

The process of forming the display assembly 1600 next proceeds with the deposition of a second mold layer 1616 over the first mold layer 1606, as depicted in FIG. 16B, followed by patterning of the second mold layer 1616 using a photomask 1618. A resulting combination of the second mold layer 1616 and the first mold layer 1606 forms a mold 1614 over the substrate 1608, as depicted in FIG. 16C. The pattern defined in the second mold layer 1616 creates elongated openings or trenches 1620, which are aligned with the openings 1610 of the first mold layer 1606. The deposition and patterning of the second mold layer 1616 is similar in concept, and uses similar materials and techniques, as those described for the deposition and patterning of sacrificial layer materials described in relation to FIGS. 6A-6E and FIGS. 7A-7D. As depicted in FIG. 16C, the mold 1614 includes substantially vertical sidewalls 1622 bounding the openings 1610 and 1620, with the anchor material 1612 disposed adjacent to lower portions of the sidewalls 1622. In some other implementations, a profile of the sidewalls 1622 can take on other shapes, such as tapered, curved, or reentrant.

The process continues with the deposition of an interconnect material 1624 on exposed surfaces of the mold 1614, as depicted in FIG. 16D. Suitable candidates for the interconnect material 1624 are described above with respect to the conductor layer 607 of FIGS. 6A-6E. As depicted in FIG. 16D, the interconnect material 1624 is deposited in the openings 1610 and 1620 so as to cover the anchor material 1612 as well as upper portions of the sidewalls 1622.

Next, the manufacturing process continues with the preferential or selective removal of portions of the interconnect material 1624 by applying an anisotropic etch, resulting in the structure depicted in FIG. 16E. Along the upper portions of the sidewalls 1622 of the mold 1614, the interconnect material 1624 is substantially protected from the anisotropic etch. Such protected portions of the interconnect material 1624 form the higher-aspect ratio interconnects 1602. Along the lower portions of the sidewalls 1622 of the mold 1614, the interconnect material 1624 and the anchor material 1612 also are substantially protected from the anisotropic etch. Such protected portions of the interconnect material 1624 and the anchor material 1612 form the anchors 1604. The deposition and anisotropic etch of the interconnect material 1624 is similar in concept, and uses similar materials and techniques, as those described in relation to FIGS. 7A-7D and FIGS. 15A-15E.

The process of forming the suspended interconnects 1602 is completed with the removal of the mold 1614, the result being depicted in FIG. 16F. In other implementations, the mold 1614 is at least partially retained.

As described above, electrical interconnects, or portions of electrical interconnects, can be formed to have an elevated configuration to provide a display apparatus with a lower data loading power and/or a lower signal propagation delay. In some implementations, an elevated configuration of at least a portion of the electrical interconnect is attained by suspending the portion of the electrical interconnect over a substrate by anchors. The elevated configuration of the electrical interconnect reduces the capacitive coupling with underlying layers that otherwise can adversely impact the data loading power and/or the signal propagation delay. As described above, the elevated electrical interconnects may be formed during the same process of forming other components of the display apparatus, for example, the shutter assembly in shutter-based display apparatus.

Manufacturing of various components of displays can involve multiple, distinct photolithography stages where a photo-sensitive resist is deposited and patterned, and undesired portions of the photo-sensitive resist are removed by etching. Due to the costs associated with these masking stages, it is desirable to form electrical interconnects with elevated configurations as part of the manufacturing process, without increasing the number of masking stages. In some implementations, an interconnect can be fabricated without additional masking stages if it is configured in the shape of a loop. The loop configuration avoids additional masking stages that otherwise would be involved to isolate sections of the loops.

In some implementations, looped electrical interconnects are suspended above an underlying substrate via anchors. In some other implementations, elevated looped electrical interconnects are supported over the substrate via base structures. The elevated looped electrical interconnects include portions that are supported by base structures formed on the substrate. The base structures are separated by gaps. Some portions of the elevated looped electrical interconnects that are not supported by the base structures are suspended over portions of the substrate. Other electrical interconnects extend crosswise under the suspended portions of the looped electrical interconnect.

FIG. 17A shows an example perspective view of an EMS-based display apparatus 1700 incorporating U-shaped looped electrical interconnects. One example of a U-shaped looped electrical interconnect is a column interconnect 1715. The display apparatus 1700 includes an array of EMS light modulators 1702 (generally light modulators 1702) arranged in rows and columns over a substrate 1710. Each light modulator 1702 is a shutter-based light modulator, including a shutter 1704 that is supported over underlying layers of the substrate 1710 by beams 1706 and anchors 1708.

The display apparatus 1700 also includes a network of electrical interconnects, including at least one row interconnect 1712 connected to and shared by a row of light modulators 1702 and at least one looped column interconnect 1715 connected to and shared by a column of light modulators 1702. In some implementations, the row interconnects 1712 can correspond to scan-line interconnects or common interconnects, while the looped column interconnects 1715 can correspond to data interconnects.

As depicted in FIG. 17A, each of the column interconnects 1715 is implemented as an elongated loop. That is, each of the column interconnects 1715 defines a boundary that is continuous and encloses an elongated area or space. The elongated loop is formed by two generally elongate sections connected to one another by two end portions at opposite ends of the elongate sections.

In particular, the column interconnect 1715 includes a first elongate interconnect section 1714a and a second elongate interconnect section 1714b (generally interconnect sections 1714) that extend lengthwise along the column of the display apparatus 1700. The interconnect sections 1714a and 1714b are connected at one end by a first end portion and at the other end by a second end portion. In some implementations, at one end portion, the interconnect sections 1714a and 1714b meet one another and terminate to close off the loop. At the other end portion, the interconnect sections 1714 are electrically coupled to one another at a terminal anchor 1718 which likewise closes off the loop. In some implementations, both end portions include terminal anchors 1718. In some implementations, both end portions of interconnect sections 1714a and 1714b meet one another and terminate to close off the loop. In some such implementations, terminated end portions may be attached to anchors, such as anchors 1716, or to other terminated interconnect sections.

By implementing the column interconnects 1715 as loops, the column interconnects 1715 can be fully defined by masking stages used to form the EMS shutter assemblies 1702, without increasing the number of masking stages. As further described below with respect to FIGS. 18 and 19A-19E, the column interconnects 1715 can be formed as part of a 3-mask process used to form the EMS shutter assemblies 1702 of the display 1700.

The interconnect sections 1714a and 1714b are supported over the underlying layers of the substrate 1710 by one or more anchors 1716 and at least one terminal anchor 1718. By elevating or suspending the interconnect sections 1714a and 1714b over underlying layers of the substrate 1710, the capacitive coupling between the interconnect sections 1714a and 1714b and such underlying layers is reduced, thereby decreasing a data loading power and/or a signal propagation delay of the looped column interconnects 1715.

The interconnect sections 1714a and 1714b are positioned at the same or similar height as various components of the light modulators 1702. For example, the interconnect sections 1714a and 1714b can be suspended at the same or similar height as the shutters 1704, such that an upper surface of at least one interconnect section 1714 is substantially aligned or co-planar with an upper surface of at least one shutter 1704. Such positioning of the interconnect sections 1714a and 1714b and the shutters 1704 can mitigate against the likelihood of vertical displacement of the shutters 1704 towards or away from the substrate 1710, which might otherwise result from electrostatic or other interaction between the interconnect sections 1714a and 1714b and the shutters 1704. Such positioning of the interconnect sections 1714a and 1714b can also facilitate direct coupling of the interconnect sections 1714a and 1714b to a shutter 1704 or an actuator coupled to the shutter 1704, avoiding the need to route a signal back to the substrate via an anchor.

Although FIG. 17A shows an EMS shutter-based display, the looped column interconnects 1715 can be incorporated in other types of displays, such as a display that generates images by modulating light using liquid crystal cells, light taps, or electrowetting cells, as well as a display that generates images by selectively emitting light, such as a plasma or OLED display.

Figure 17B:
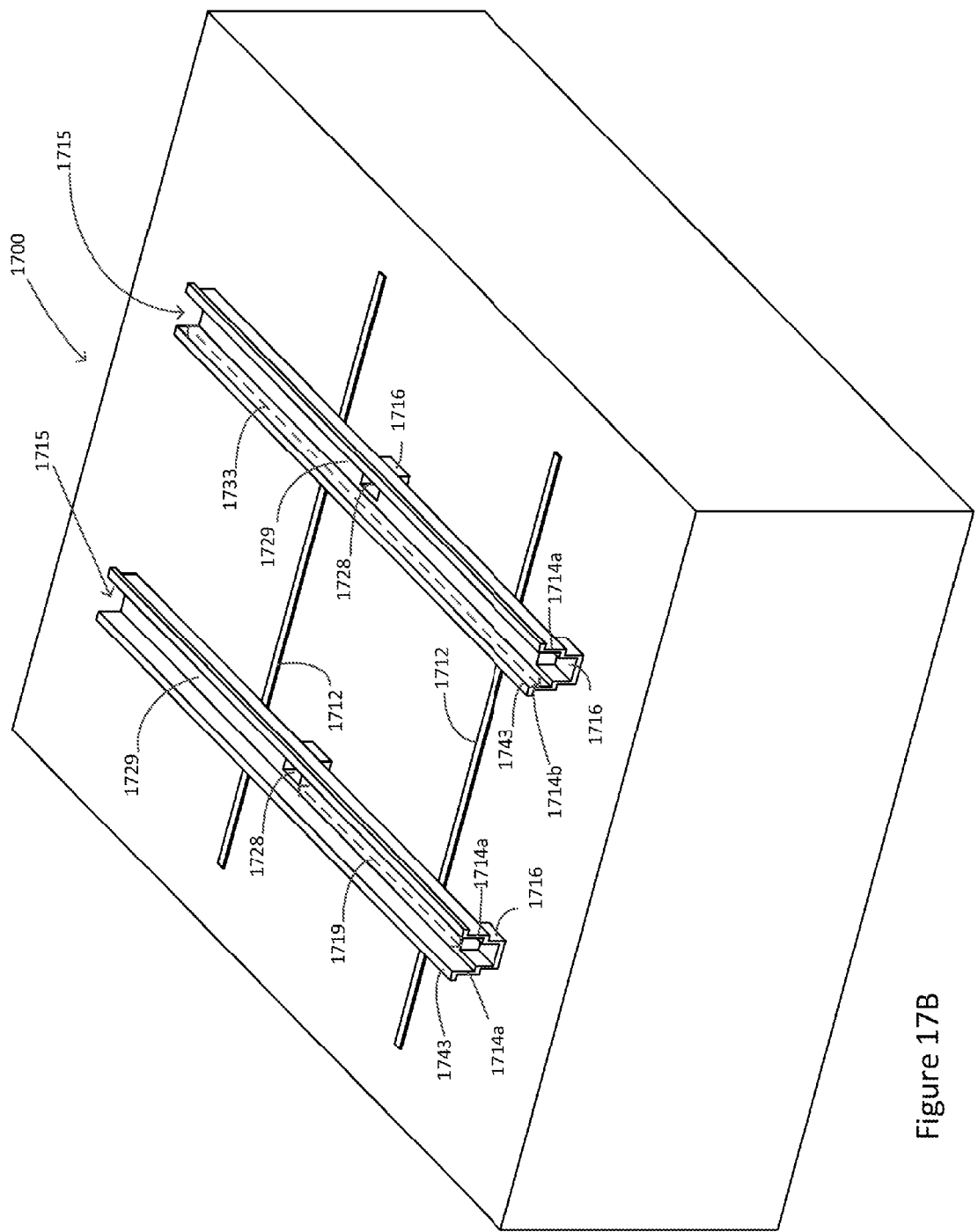
FIG. 17B shows a perspective isometric view of the display apparatus of FIG. 17A.

Referring now to FIGS. 17A and 17B, FIG. 17B shows a perspective view of interconnects included in display apparatus 1700 shown in FIG. 17A. Specifically, FIG. 17B shows the row interconnects 1712, the U-shaped looped interconnects 1715 and the anchors 1716 shown in FIG. 17A.

Each of the column interconnects 1715 is implemented as a U-shaped looped interconnect. That is, each of the column interconnects 1715 has a U-shaped cross section. In some implementations, the U-shaped cross section is formed by connecting the bottom surfaces of the interconnect sections 1714a and 1714b to one another via a horizontal bridge structure 1729.

The horizontal bridge structure 1729 includes a plurality of gaps 1728 that are formed around the regions where the anchors 1716 support the interconnect sections 1714a and 1714b. The distance between the gaps 1728 is about the same distance between neighboring anchors 1716.

The interconnect sections 1714a and 1714b also include horizontal rims 1743 that form a top surface of the interconnect sections 1714a and 1714b. In some implementations, the thickness of the horizontal rims 1743 is substantially the same as the thickness of the horizontal bridge structure 1729. In some implementations, the thickness of the horizontal rims 1743, the horizontal bridge structure 1729 and the interconnect sections 1714a and 1714b are substantially the same. This is possible since the horizontal rims 1743, the horizontal bridge structure 1729 and the interconnect sections 1714a and 1714b are all formed from the same layer or layers of interconnect material. Additional details of how the horizontal rims 1743, the horizontal bridge structure 1729 and the interconnect sections 1714a and 1714b are formed are described below with respect to FIGS. 18 and 19A-19E.

The looped interconnects 1715 are suspended above the substrate 1710 in part by the anchors 1716. The anchors 1716 are spaced apart from one another by a distance 1719. The row interconnects 1712 extend crosswise through gaps separating the anchors 1716 and beneath the column interconnects 1715. As depicted in FIGS. 17A and 17B, the anchors 1716 contact only a small portion of each of the interconnect sections 1714a and 1714b that the anchors 1716 support. As such, the distance 1719 between neighboring anchors 1716 that support portions of a given interconnect section 1714 of the same looped interconnect 1715 is substantially larger than a corresponding length 1731 of the respective anchors 1716 in a direction along a length 1733 of each of the interconnect sections 1714a and 1714b. In some implementations, the distance between neighboring anchors can be between about 50-200 microns. In some such implementations, the distance between neighboring anchors can be about 100 microns. In some implementations, the length of the anchors can be between about 5-100 microns. In some such implementations, the length of the anchors can be about 10 microns. In some such implementations, a length of at least one of the anchors in a direction towards a neighboring anchor is less than or equal to about 50% of distance between the neighboring anchors. In some implementations, the length of at least one of the anchors is less than about 10% and greater than about 5% of a length of the gap separating the neighboring anchors. In some implementations, the length of at least one of the anchors is greater than about 50% of a length of the gap separating the neighboring anchors. In some implementations, the length of at least one of the anchors is greater than about 90% and less than about 95% of a length of the gap separating the neighboring anchors.

In some such implementations, the anchors 1716 are placed at locations proximate to the row interconnects 1712. In doing so, the anchors 1716 can support the interconnect sections 1714a and 1714b at least a minimum distance above the underlying row interconnects 1712 even if the interconnect sections 1714a and 1714b experience some degree of sagging between neighboring anchors 1716. The minimum distance may be a distance large enough to ensure that there is negligible, or at least diminished, capacitive coupling between the interconnect sections 1714a and 1714b and the underlying row interconnects 1712. In some implementations in which the anchors 1716 are conductive, the anchors 1716 may be placed at locations away from the row interconnects 1712 (for example, at least about 5 microns away, or in some implementations, even at least about 10 micrometer away). This is to ensure that the amount of capacitive coupling between the anchor and the row interconnects 1712 is reduced. In some implementations, other factors may determine the location of the anchors 1716 relative to the row interconnects, for example, the location of other electrical components on the surface of the substrate 1710 to which the looped interconnects connect.

The anchors 1716 that suspend the interconnect sections 1714a and 1714b over the underlying substrate 1710 can have properties similar to those previously described with reference to the anchors 1110 depicted in FIG. 11. In some implementations, the anchors 1716 can be made from the same material as the interconnect sections 1714a and 1714b, thereby providing opportunities for forming electrical connections to underlying interconnects or to other components formed on the substrate 1710. In some implementations, one or more of the anchors 1716 also can be formed from non-conductive structural materials, such as dielectrics, including but not limited to silicon oxide and/or silicon nitride As described above, a terminal anchor 1718 forms the second end portions of the interconnect sections 1714a and 1714b. Terminal anchors 1718 are implemented with multiple contacts 1720 to circuitry on or within the substrate 1710 to reduce contact resistance. In some implementations, the circuitry can be connected to one or more drivers, such as data drivers, scan drivers, or common drivers.

In some other implementations, the row interconnects 1712 can be implemented as suspended interconnects, while the column interconnects 1715 can extend crosswise below the row interconnects 1712.

Figure 17C:
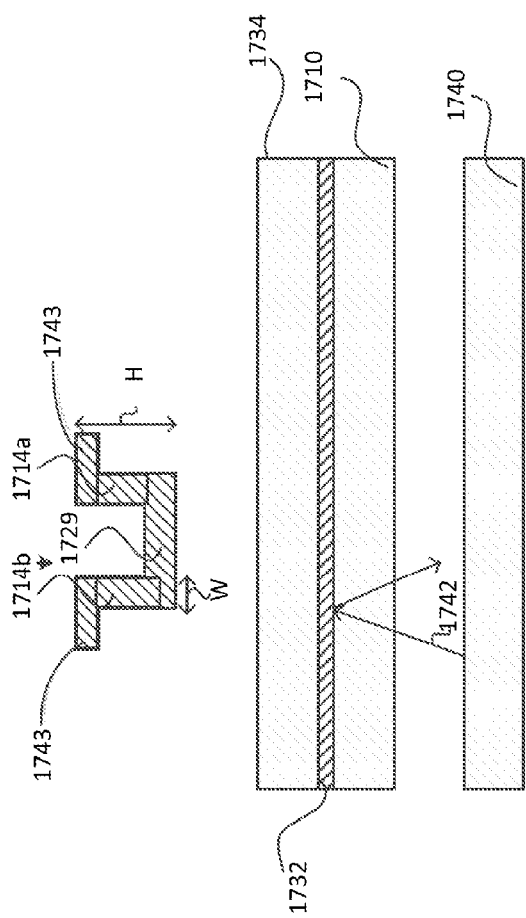
FIGS. 17C and 17D show cross sectional views of portions of the display apparatus of FIG. 17A.
Figure 17D:
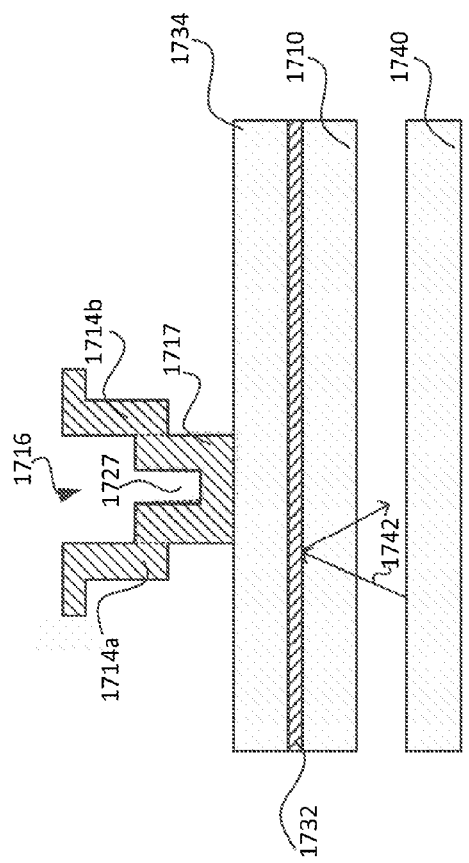

FIGS. 17C and 17D show cross sectional views of portions of the display apparatus 1700 of FIG. 17A. The cross section in FIG. 17C is taken along the line 1722 intersecting the first interconnect section 1714a and the second interconnect section 1714b of FIG. 17A between two neighboring anchors 1716. The cross section in FIG. 17D is taken along line 1724 intersecting an anchor 1716 shown in FIG. 17A.

As shown in FIG. 17C, each of the interconnect sections 1714a and 1714b include the horizontal rims 1743 that form the top surface of the interconnect sections 1714a and 1714b. The interconnect sections 1714a and 1714b are connected to one another by the horizontal bridge structure 1729 as shown.

Each of the interconnect sections 1714a and 1714b have an aspect ratio that is greater than 1:1. That is, the heights (H) of the interconnect sections 1714a and 1714b are greater than their respective widths (W), with respect to a plane defined by the substrate 1710. In some implementations, the aspect ratio is at least about 2:1, about 3:1, about 4:1, about 5:1 or even about 10:1 or higher. These tall, thin interconnect sections 1714a and 1714b can be formed using a sidewall manufacturing process, which is described herein with respect to FIGS. 19A-19E. By orienting the interconnect sections 1714*a* and 1714*b* vertically according to their higher aspect ratios, more interconnect material is spaced further away from underlying metal layers on the substrate, thereby reducing the capacitive coupling that otherwise could adversely impact the data loading power and/or the signal propagation delay of the interconnect. Even though a cross sectional area of the higher-aspect ratio interconnect sections 1714*a* and 1714*b* can be smaller than that of traditional lower-aspect ratio interconnects, the vertical orientation of the higher-aspect ratio interconnect sections 1714*a* and 1714*b* and their elevation above the row interconnect 1712 reduce parasitic capacitance sufficiently to mitigate against or offset any detrimental impact the decreased area might have on the interconnect resistance, and hence the signal propagation delay. In some other implementations, the aspect ratio is less than or equal to 1:1.

As shown in FIG. 17D, the anchor 1716 includes a base section 1717, which is formed on the substrate 1710, and portions of the interconnect sections 1714*a* and 1714*b*. The anchor 1716 provides support to the interconnect sections 1714*a* and 1714*b* with the interconnect sections 1714*a* and 1714*b* extending from a top surface of the base section 1717. The anchor 1716 also includes an opening 1727 which corresponds to the gap 1729 formed in the horizontal bridge structure 1729 shown in FIGS. 17B and 17C.

In addition to the anchors 1716 and interconnects 1712 and 1715, one or more layers can be formed over the substrate 1710 beneath the anchors 1716. For example, a reflective layer 1732 is formed over the substrate 1710, and provides a light recycling function by reflecting light 1742 from a backlight 1740, as described with respect to the reflective aperture layer 506 shown in FIG. 5. In some implementations, the reflective layer 1732 is a metal layer. In one example, the reflective layer 1732 is an Al layer. To reduce any parasitic capacitance imparted by the reflective layer 1732 and overlying layers of interconnects, such as the row interconnect 1712, other layers including one or more dielectric layers, such as dielectric layer 1734, can be formed between the reflective layer 1732 and the layer that forms the row interconnects 1712. In some other implementations, the reflective layer 1732 can be patterned so as to be substantially absent in regions with overlying anchors 1716, regions with overlying interconnect sections 1714*a* and 1714*b*, or both. In some other implementations, the reflective layer 1732 also can be patterned so as to be substantially absent in regions with overlying row interconnects 1712.

Figure 18:
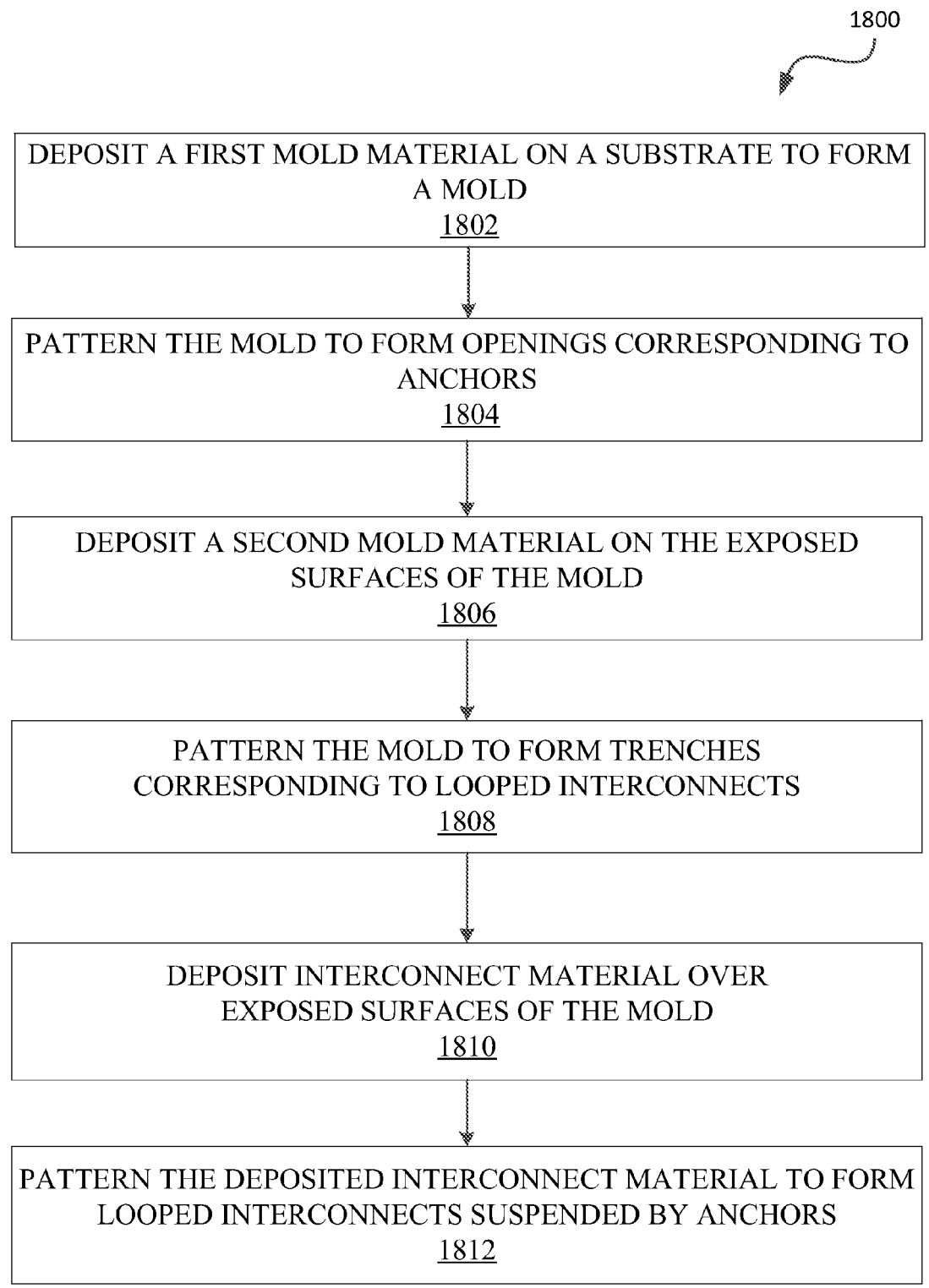
FIG. 18 shows a flow diagram of an example manufacturing process of a display assembly incorporating looped interconnects.

FIG. 18 shows a flow diagram of an example manufacturing process 1800 for manufacturing suspended looped electrical interconnects incorporated into a display assembly. In particular, the manufacturing process 1800 corresponds to the process of manufacturing the suspended looped electrical interconnects 1715 depicted in FIG. 17A-17D. The process can be referred to as a "3-mask process", meaning that the process incorporates 3 distinct photolithography stages. Each photolithography stage includes a deposition stage and a patterning stage. The 3-mask process can be incorporated into processes for forming an EMS shutter assembly along with elevated looped interconnects having higher aspect ratio interconnect sections.

Referring to FIGS. 17A-17D and FIG. 18, in block 1802, a first mold material is deposited on a substrate to form a mold. In block 1804, the mold is patterned to form openings within which base portions of anchors, such as the base portion 1717 of the anchor 1716 depicted in FIG. 17D, eventually will be formed. The base portion 1717 is configured to support the looped interconnect sections. In block 1806, a second mold material is deposited on the exposed surfaces of the mold. In block 1808, the mold is then patterned to form trenches within which the looped interconnect sections, such as the looped interconnect sections 1714*a* and 1714*b* depicted in FIGS. 17C-17D, will eventually be formed. In block 1810, an interconnect material is deposited on the exposed surfaces of the mold. In block 1812, the interconnect material deposited on the exposed surfaces of the mold is patterned to form the looped interconnect sections as well as the anchors that support portions of the looped interconnect sections such that the looped interconnect sections are suspended over the substrate between neighboring anchors.

In some implementations, the process of FIG. 18 can be carried out in conjunction with the formation of light modulators, such as shutter-based light modulators. In such implementations, the elevated looped interconnects and the light modulators can share at least one common layer that is formed from the same interconnect material. Further aspects of the manufacturing process are described below in relation to FIGS. 19A-19E.

FIGS. 19A-19E show various stages of a manufacturing process for forming a display assembly. In particular, FIGS. 19A-19E show the various stages of the manufacture of the looped interconnects 1715 of the display assembly 1700 depicted in FIGS. 17A-17D. The various stages of the manufacturing process yield the suspended looped interconnect sections 1714*a* and 1714*b* supported by the anchors 1716 spaced apart from one another. The left side of FIGS. 19A-19E show various stages of forming the anchor 1716 depicted in FIGS. 17A-17D, while the right side of FIGS. 19A-19E show various stages of forming looped interconnect sections 1714*a* and 1714*b* of the looped interconnect 1715 depicted in FIGS. 17A-17D.

Figure 19A:
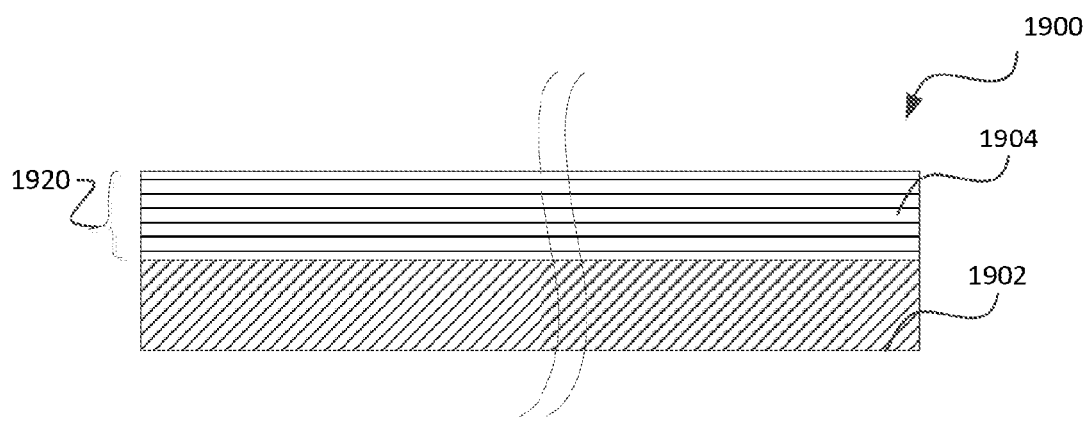
FIGS. 19A-19E show various stages of a manufacturing process for forming a display assembly.
Figure 19B:
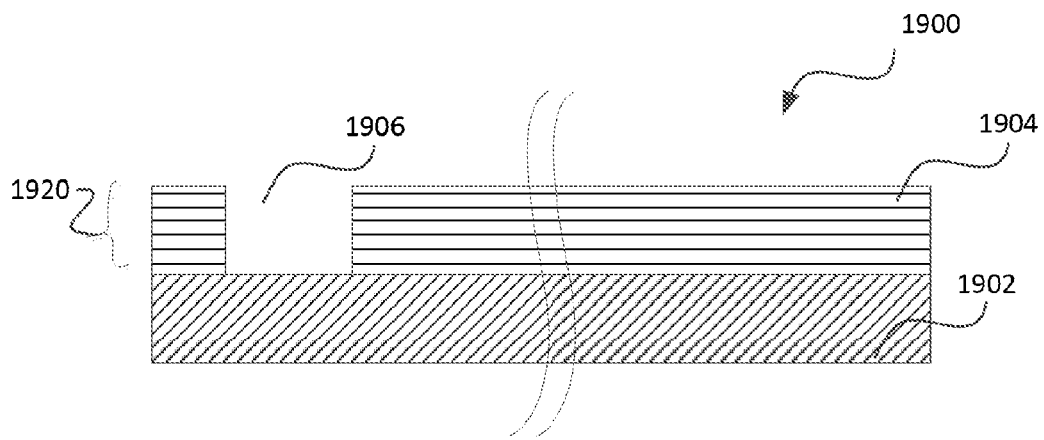
Figure 19C:
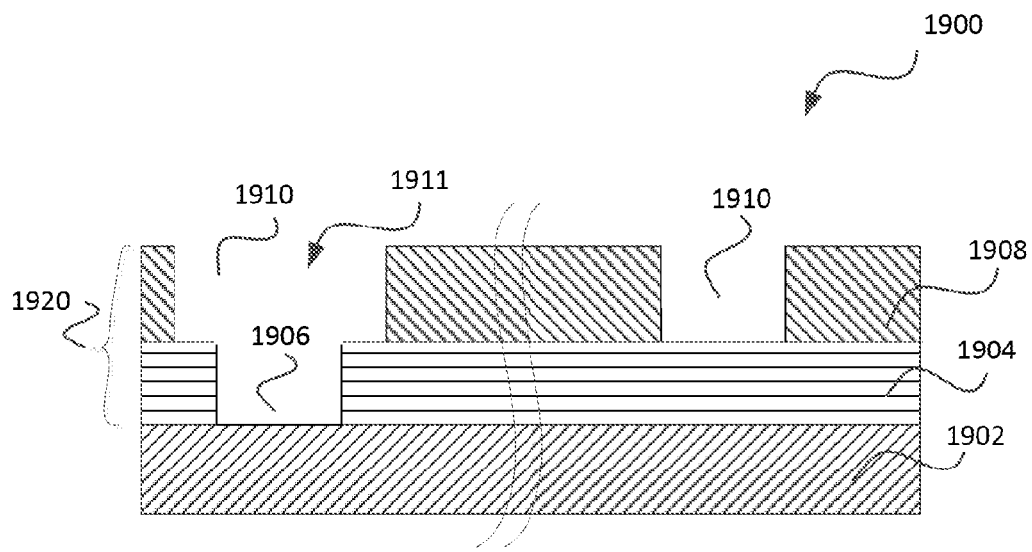

Referring to FIGS. 17A-17D, 18 and 19A-19E, the process of forming the display assembly 1700 begins with the formation of a mold 1920 over a substrate 1902 (blocks 1802-1808 and FIGS. 19A-19C). As shown in FIG. 19A, the formation of the mold 1920 proceeds with depositing a first mold material 1904 on the substrate 1902 (block 1802). Although not depicted in FIGS. 19A-19E, one or more additional layers can be disposed between the substrate 1902 and the first mold material 1904. For example, one or more light recycling layers, such as the light recycling layer 1732 depicted in FIGS. 17C and 17D, may be disposed between the substrate 1902 and the first mold material 1904. In addition, one or more additional layers of interconnects may be disposed between the substrate and the first mold material 1904. An example layer of interconnects may include a row interconnect, such as the row interconnect 1712 depicted in FIGS. 17A-17C.

As shown in FIG. 19B, the mold 1920 is then patterned to create openings 1906 within which the anchors 1716 supporting the interconnect sections 1714*a* and 1714*b* of the display assembly 1900 eventually will be formed (block 1804). The dimensions of the openings 1906 will determine the shape of the base of the anchors that will support the interconnect sections 1714*a* and 1714*b* over the surface of the substrate 1902. The deposition and patterning of the first mold material 1904 is similar in concept, and can use similar materials and techniques, as those described for the deposition and patterning of sacrificial layer materials described in relation to FIGS. 6A-6E and FIGS. 7A-7D.

As shown in FIG. 19C, the process continues with the deposition and patterning of a second mold material 1908 over the mold 1920 according to the second masking stage (blocks 1806 and 1808). The second mold material 1908 is deposited on the exposed surfaces of the mold 1920 (block 1806). The second mold material 1908 is deposited such that the material fills in the openings 1906 while forming a flat top surface. The second mold material 1908 can be the same or different from the first mold material 1904. The thickness of the second mold material 1908 determines the eventual height of the interconnect sections 1714a and 1714b.

The mold 1920 is then patterned by creating a trench 1910 that has a depth corresponding to the thickness of the second mold material in the region where the openings 1906 were previously not patterned (block 1808 and FIG. 19C). The trench 1910 corresponds to the region where the interconnect sections 1714a and 1714b eventually will be formed. The length of the trench 1910 defines the length of the respective interconnect sections 1714a and 1714b of the looped interconnect that will eventually be formed. The region of the mold 1920 where the anchors 1716 will eventually be formed is further patterned to form openings 1911. The openings 1911 are partially formed by creating the trench 1910 over the region where the second mold material 1908 was deposited to fill the opening 1906. The remaining portion of the openings 1911 are formed by removing the second mold material 1908 from the region of the mold 1920 where the openings 1906 were previously formed. As such, the openings 1911 are defined by a bottom corresponding to the substrate 1902 (or by the top most layer of material deposited between the substrate and the mold 1920), a first sidewall corresponding to the first mold material 1904 and a second sidewall corresponding to the second mold material 1908. In some implementations, the regions of the trench 1910 that lie above the openings 1906 can be about the same width as the opening 1906. The deposition and patterning of the second mold material 1908 also is similar in concept, and uses similar materials and techniques, as those described for the deposition and patterning of sacrificial layer materials described in relation to FIGS. 6A-6E and FIGS. 7A-7D.

Figure 19D:
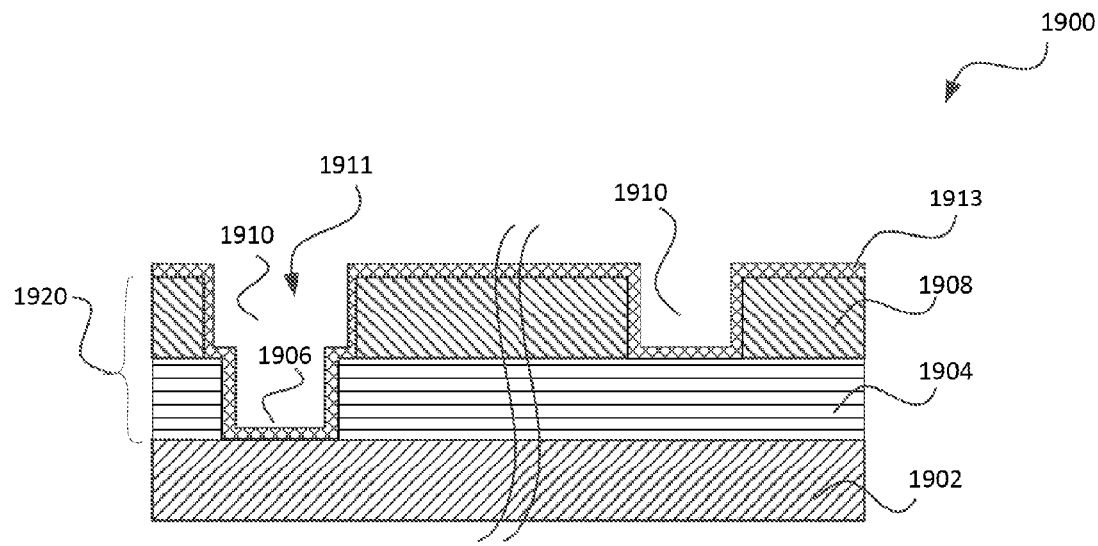

The process continues with the deposition and patterning of an interconnect material 1913 over exposed surfaces of the mold 1920 according to the third masking stage (blocks 1810 and 1812). The left side of FIG. 19D shows the interconnect material 1913 deposited over exposed surfaces of the opening 1911 corresponding to the locations where the anchors 1716 eventually will be formed. The right side of FIG. 19D depicts the interconnect material 1913 deposited over exposed surfaces of the trench 1910 corresponding to the locations where the interconnect sections 1714a and 1714b will be formed. Although one layer of the interconnect material 1913 is shown in FIG. 19D, multiple layers, such as a stack of layers, can be deposited. In some implementations, the interconnect sections 1714a and 1714b and the anchor 1716 can be formed using the same stack of layers used to form other components of an EMS shutter assembly. For example, the stack of layers can include a layer of aluminum between layers of titanium and/or amorphous-Si to impart desired electrical conductivity while maintaining light blocking functionality for the shutter assembly.

Figure 19E:
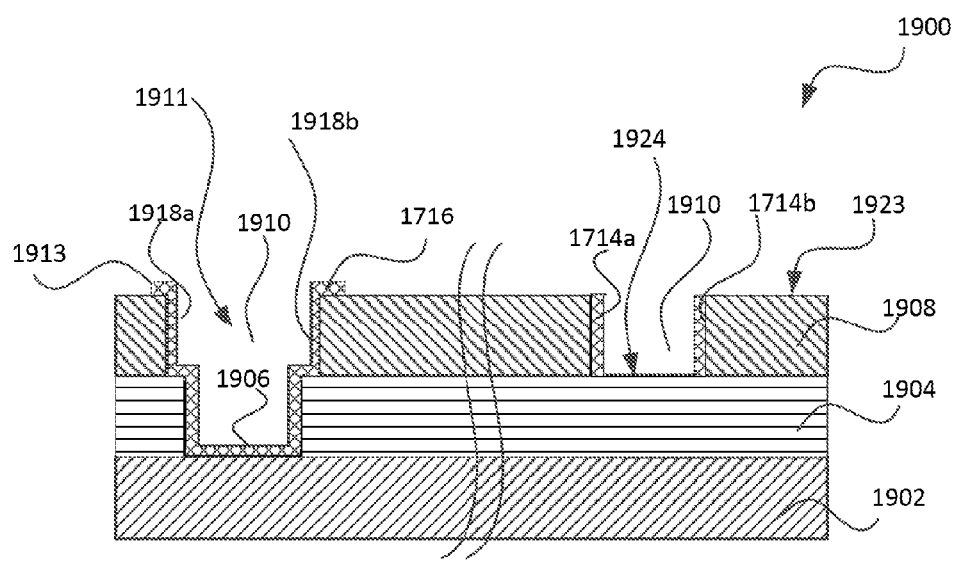

Then, as shown in FIG. 19E, the interconnect material 1913 is patterned to form the interconnect sections 1714a and 1714b, the horizontal bridge structure 1729 connecting the interconnect sections 1714a and 1714b and the anchor 1716 (block 1812 and FIG. 19E). In some implementations, the interconnect material 1913 may be patterned to selectively remove portions of the interconnect material 1913 by applying an etch resulting in the structures depicted in FIG. 19E. As depicted in the left side of FIG. 19E, the top horizontal surface 1923 of the interconnect material 1913 is etched to form the anchor 1716 supporting the interconnect sections 1714a and 1714b. As depicted in the right side of FIG. 19E, a portion of the top horizontal surface 1923 is also removed, leaving behind the interconnect sections 1714a and 1714b having the horizontal ribs 1743 formed at the top surface of the interconnect sections and being connected to one another along the bottom surface of the interconnect sections by the horizontal bridge structure 1729.

A cross sectional thickness or width of the interconnect sections 1714a and 1714b is similar to the thickness of the deposited layer of interconnect material 1913. In some implementations, the cross sectional thickness of the interconnect sections 1714a and 1714b can be smaller than the thickness of the interconnect material 1913 as deposited. A height of the interconnect sections 1714a and 1714b is determined by a thickness of the second mold material 1908 as deposited, or, in other words by a depth of the trenches 1910 as created during the patterning operation described in relation to FIGS. 19B-19D. In some implementations, as long as the thickness of the interconnect material 1913 is chosen to be less than about 2 microns, the process depicted in FIGS. 19A-19E is well suited for the production of narrow, higher-aspect ratio interconnects. Conventional thin film photolithography would yield patterned features having significantly larger dimensions, for instance allowing minimum resolved features no smaller than about 2 microns or about 5 microns.

Once the three-stage masking process is completed, the mold 1920 is removed, thereby releasing the anchors 1716 and the interconnect sections 1714a and 1714b from the mold 1920 such that the interconnect sections 1714a and 1714b are supported over the substrate by the anchors 1716. Details for removing the sacrificial material forming the mold 1920 are described above with respect to FIG. 6E.

In the implementations depicted in FIGS. 17A-17D, the anchors 1716 are configured to only support a small portion of the interconnect sections 1714a and 1714b and spaced apart from one another such that a majority portion of the interconnect sections 1714a and 1714b are not in contact with the anchors 1716. Further, in some such implementations, the anchors supporting the suspended interconnect sections are not electrically conductive. In some other implementations, elevated looped electrical interconnects are supported over the substrate via base structures. The base structures are configured to support a relatively larger portion of the elevated looped electrical interconnects. As such, neighboring base structures are spaced apart from one another such that a small portion of the elevated looped electrical interconnects is suspended over the substrate. Other electrical interconnects extend crosswise under the suspended portions of the looped electrical interconnects.

Figure 20A:
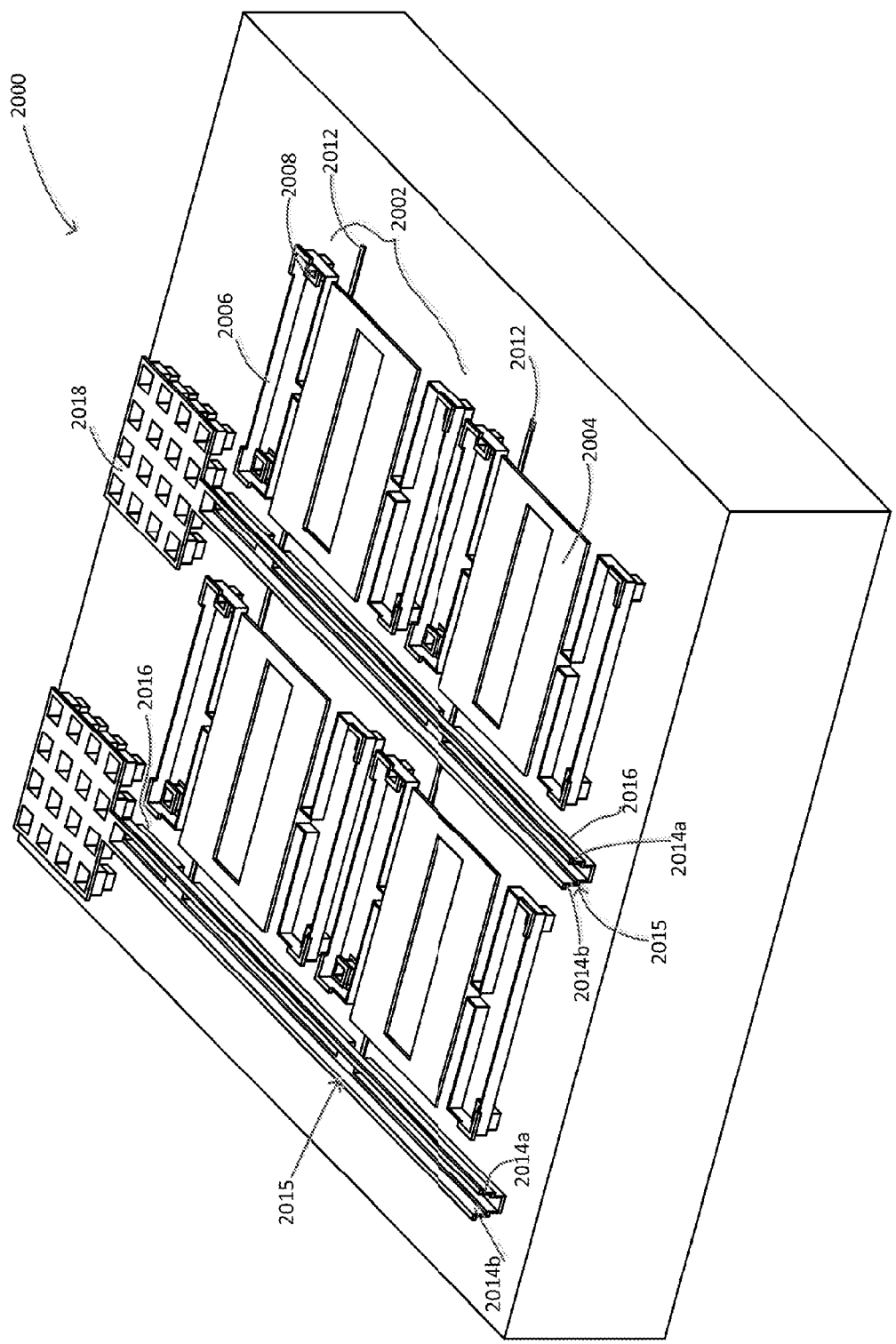
FIG. 20A shows an example perspective view of an EMS-based display apparatus incorporating looped electrical interconnects.

FIG. 20A shows an example perspective view of an EMS-based display apparatus 2000 incorporating looped electrical interconnects 2015. The looped electrical interconnects 2015 are similar to the looped electrical interconnects 1715 shown in FIGS. 17A and 17B in that the looped electrical interconnects 2015 are elevated but differ in that the looped electrical interconnects 2015 do not include a horizontal section that connects the bottom surfaces of two parallel elongate interconnect sections 2014a and 2014b. Instead, these elevated interconnect sections 2014a and 2014b are connected to one another and to the substrate 2010 via the base structures 2016 that support the interconnect sections 2014a and 2014b over the substrate 2010. One example of a looped electrical interconnect is the column interconnect 2015. The first elevated interconnect section 2014a and the second elevated interconnect section 2014b (generally elevated interconnect sections 2014) extend lengthwise along the lengthwise portion of a loop. The elevated interconnect sections 2014 have high aspect ratios. Row interconnects 2012 extend crosswise through gaps separating the base structures 2016 and beneath the elevated interconnect sections 2014a and 2014b.

Similar to the column interconnects 1715 depicted in FIGS. 17A-17D, each of the column interconnects 2015 may be implemented as an elongated loop. That is, each of the column interconnects 2015 defines a boundary that is substantially or completely continuous and that substantially or completely encloses an elongated area or space.

The first elevated interconnect section 2014a is connected to the second elevated interconnect section 2014b at their respective ends. In some implementations, the ends of the elevated interconnect sections 2014a and 2014b are coupled to terminal anchors 2018 closing off the other end of the loop structure.

In some other implementations, the column interconnects 2015 need not form a loop. The elevated interconnect sections 2014a and 2014b merely terminate at one end without meeting to close off that end of the loop.

The display apparatus 2000 includes an array of EMS light modulators 2002 (generally "light modulators 2002") arranged in rows and columns over a substrate 2010. Each light modulator 2002 is a shutter-based light modulator, including a shutter 2004 that is supported over underlying layers of the substrate 2010 by beams 2006 and anchors 2008.

The display apparatus 2000 also includes a network of electrical interconnects, including at least one of the electrical interconnects 2015 connected to and shared by a column of light modulators 2002. The network of electrical interconnects also includes at least one row interconnect 2012 connected to and shared by a row of light modulators 2002. In some implementations, the row interconnects 2012 can correspond to scan-line interconnects or common interconnects, while the column interconnects 2015 can correspond to data interconnects.

The base structures 2016 support the elevated interconnect sections 2014a and 2014b over regions of the substrate 2010 that are free of underlying row interconnects 2012. Moreover, the base structures 2016 suspend the elevated interconnect sections 2014a and 2014b over regions of the substrate 2010 that include underlying row interconnects 2012. By suspending the elevated interconnect sections 2014a and 2014b over the row interconnects 2012, the capacitive coupling between the looped interconnects 2015 and the row interconnects 2012 is reduced, thereby decreasing a data loading power and/or a signal propagation delay of the looped interconnects 2015.

In some implementations, the elevated interconnect sections 2014a and 2014b are positioned at the same or similar height as various components of the display elements 2002. For example, the elevated interconnect sections 2014a and 2014b can be suspended at the same or similar height as the shutters 2004, such that the upper surfaces of the interconnect sections are substantially aligned or co-planar with an upper surface of at least one shutter 2004. Such positioning of the elevated interconnect sections 2014a and 2014b and the shutters 2004 can mitigate against the likelihood of vertical displacement of the shutters 2004 towards or away from the substrate 2010, which might otherwise result from electrostatic or other interaction between the column interconnects 2015 and the shutters 2004. It can also facilitate direct coupling of the interconnect sections 2014a and 2014b to a shutter 2004 or an actuator coupled to the shutter 2004, avoiding the need to route a signal back to the substrate via an anchor.

Although FIG. 20A shows an EMS shutter-based display, the looped column interconnects 2015 can be incorporated in other types of displays, such as a display that generates images by modulating light using liquid crystal cells, light taps, or electrowetting cells, as well as a display that generates images by selectively emitting light, such as a plasma or OLED display.

FIG. 20B shows a perspective view of the looped interconnects 2015 included in the display apparatus 2000 shown in FIG. 20A. Specifically, FIG. 20B shows the row interconnects 2012, the looped interconnects 2015 and the base structures 2016 shown in FIG. 20A. As described above, the looped interconnects 2015 include base structures 2016. In some implementations, the base structures 2016 are implemented as generally U-shaped structures that include a first vertical section 2017a and a second vertical section 2017b (generally vertical sections 2017, where vertical refers to a dimension normal to the surface of the substrate 2010) that are connected by a horizontal bridge section 2017c. The vertical sections 2017a and 2017b are configured to support the elevated interconnect sections 2014 elevated above the substrate 2010.

Each of the base structures 2016 extends lengthwise between two adjacent row interconnects 2012. The length 2031 of each of the base structures 2016 may be sized such that the length 2031 is slightly smaller than the distance between the adjacent row interconnects 2012 between which the base structure 2016 extends. Further, the distance 2019 between neighboring base structures 2016 may be sized to be slightly larger than the width of the underlying row interconnects 2012. In this way, a majority of the total length 2033 of the elevated interconnect sections 2014a and 2014b is supported by the base structures 2016, while a minority of the total length 2033 of the elevated interconnect sections 2014a and 2014b is suspended. In some implementations, the distance 2019 between neighboring base structures can be between 50 and 200 microns. In some such implementations, the distance 2019 between neighboring base structures can be about 100 microns. In some implementations, the length of the base structures 2031 can be between about 5-100 microns. In some such implementations, the length of the base structures 2031 can be between about 10 microns. In some such implementations, a length of at least one of the base structures 2016 in a direction towards a neighboring base structure 2016 is greater than or equal to about 25% of the distance between the neighboring base structures. In some implementations, the length of at least one of the base structures is greater than about 90% of a length of the gap separating the neighboring base structures. In some implementations, the distance between neighboring base structures is less than about 95%.

In some implementations, the base structures 2016 can be sized and positioned such that there is negligible, or at least diminished, capacitive coupling between the base structures 2016 and the underlying row interconnects 2012, while at the same time, providing sufficient structural support to the elevated interconnect sections 2014a and 2014b. In some such implementations, the additional cross-sectional area of the base structure 2016 added to the cross-sectional area of the elevated interconnect sections 2014a and 2014b can lower the overall resistance of the electrical interconnect 2015. As such, when determining the size and position of the base structures 2016, various factors including the overall resistance of the electrical interconnect 2015, the capacitive coupling between the base structure 2016 and the underlying row interconnects 2012 as well as the structural support provided to the interconnect sections should be considered. In some implementations, one or more of the base structures 2016 also can be formed from non-conductive structural materials, such as silicon oxide and silicon nitride Similar to the looped interconnects 1715 shown in FIG. 17A, by implementing the column interconnects 2015 as loops, the looped interconnects 2015 can be fully defined by masking stages used to form the EMS shutter assemblies 2002, without increasing the number of masking stages. The column interconnects 2015 can be formed as part of a 3-mask process used to form the EMS shutter assemblies 2002 of the display 2000. The 3-mask process is substantially similar to the 3-mask process described with respect to FIGS. 18 and 19A-19E. The differences in the fabrication process are due to use of longer base sections 2016 to support the elevated interconnect sections 2014a and 2014b instead of supporting the elevated interconnect sections 2014a and 2014b using anchors, such as the anchors 1716 shown in FIG. 17D. These differences are described in further detail with respect to FIGS. 20C and 20D.

Figure 20C:
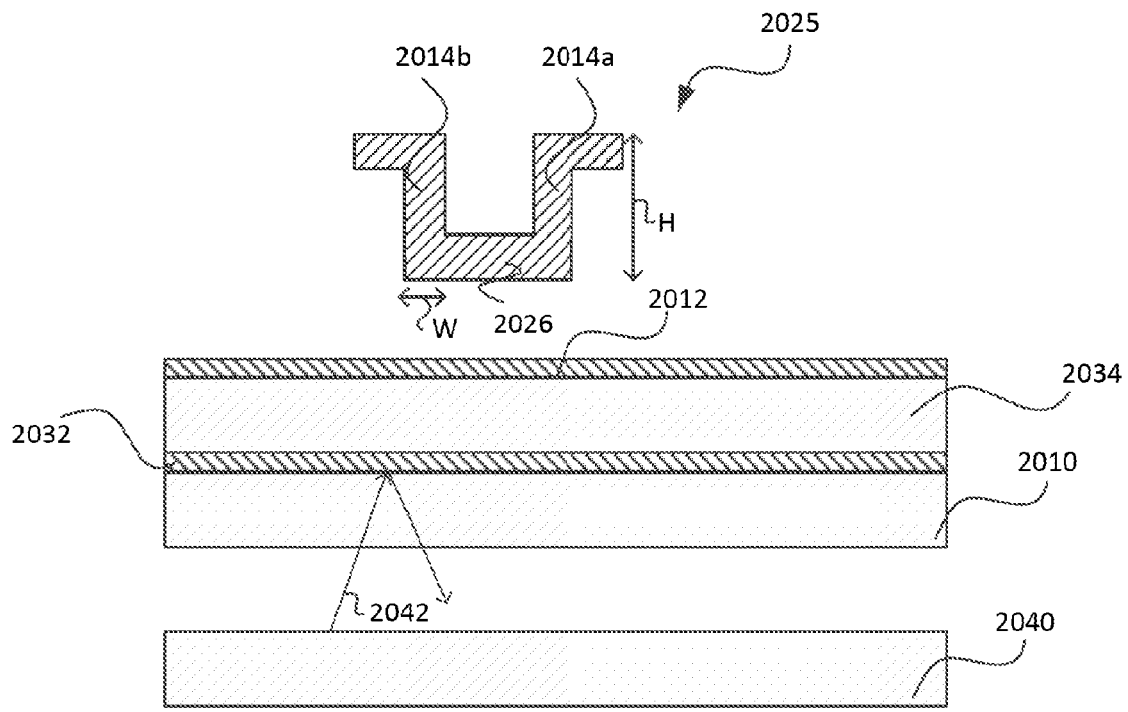
FIGS. 20C and 20D show cross sectional views of portions of the display apparatus of FIG. 20A.
Figure 20D:
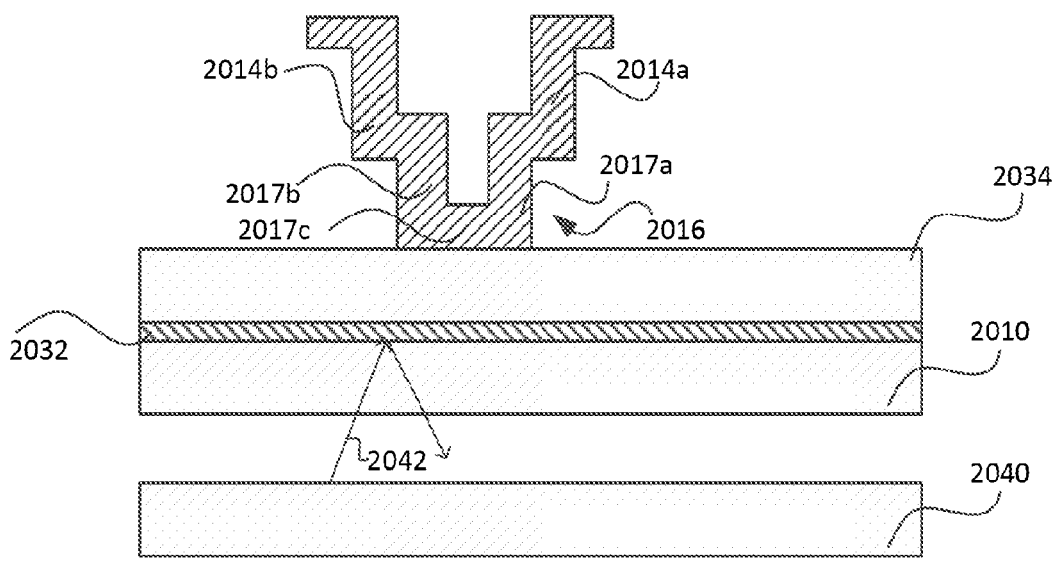

FIGS. 20C and 20D show cross sectional views of portions of the display apparatus 2000 shown in FIGS. 20A and 20B. The cross section in FIG. 20C is taken along the line 2022 intersecting the first elevated interconnect section 2014a and the second elevated interconnect section 2014b depicted in FIG. 20B. The cross section in FIG. 20D is taken along the line 2024 intersecting a base structure 2016 depicted in FIG. 20B.

As shown in FIG. 20C, the elevated interconnect sections 2014a and 2014b have an aspect ratio that is greater than 1:1. That is, the heights (H) of the elevated interconnect sections 2014a and 2014b are greater than their widths (W), with respect to a plane defined by the substrate 2010. In some implementations, the aspect ratio is at least about 2:1, about 3:1, about 4:1, about 5:1 or even about 10:1 or higher. Similar to the interconnect sections 1714a and 1714b depicted in FIGS. 17A-17B, by orienting the elevated interconnect sections 2014a and 2014b vertically according to their higher aspect ratios, more interconnect material is spaced further away from underlying metal layers on the substrate 2010, thereby reducing the capacitive coupling that otherwise could adversely impact the data loading power and/or the signal propagation delay of the interconnect 2015. Even though a cross sectional area of the higher-aspect ratio elevated interconnect sections 2014a and 2014b can be smaller than that of traditional lower-aspect ratio interconnects, the vertical orientation of the higher-aspect ratio elevated interconnect sections 2014a and 2014b and their elevation above the row interconnect 2012 reduce parasitic capacitance sufficiently to mitigate against or offset any detrimental impact the decreased area might have on the data loading power and/or the signal propagation delay. Moreover, in comparison to the column interconnects 1715 shown in FIGS. 17A-17D, the cross sectional area of the column interconnects 2015 is much larger given that most of its length includes both a conductive elevated interconnect section 2014 and a conductive base structure 2016.

In contrast to the interconnect sections 1714a and 1714b depicted in FIG. 17C, the elevated interconnect sections 2014 are connected to one another by a horizontal bridge section 2026. In this way, the portions of the elevated interconnect sections 2014 that are suspended over the underlying row interconnects 2012 remain connected to one another even though they are not supported by a base structure 2016.

As described above, the looped interconnects 2015 are formed using a manufacturing process that is substantially similar to the manufacturing process used to form the looped interconnects 1715 depicted in FIGS. 17A-17D. One difference between the manufacturing process used to form the looped interconnects 2015 occurs during the first masking stage. In particular, after the first mold material is deposited on the substrate, the first mold material is patterned to form openings. The size of these openings should correspond to the size of the base structures 2016. As such, the openings should be patterned to accommodate the relatively larger size of the base structures 2016 as compared to the openings corresponding to the anchors 1716 depicted in FIGS. 17A-17D.

Another difference in the manufacturing process occurs in the third masking stage depicted in FIG. 19D. During this stage, after the interconnect material is deposited onto the mold, the interconnect material is etched such that interconnect material that is deposited on the portions of the first mold material that connect the first elevated interconnect section 2014a and the second elevated interconnect section 2014b remains intact. In this way, after the interconnect 2015 is released from the mold, the interconnect material connecting the first elevated interconnect section 2014a and the second elevated interconnect section 2014b forms the horizontal bridge section 2026.

Referring now to FIG. 20D, the base structure 2016 includes a base section 2017c that is formed on the substrate 2010 and connects the two vertical sections 2017a and 2017b. The vertical sections 2017 support the elevated interconnect sections 2014 such that the elevated interconnect sections 2014 are elevated above the substrate 2010 by a distance substantially equal to the height of the vertical sections 2017.

Similar to the substrate 1710 depicted in FIGS. 17C and 17D, in addition to the base structures 2016 and interconnects 2012 and 2015, one or more layers can be formed over the substrate 2010 beneath the base structures 2016. For example, a reflective layer 2032 can be formed over the substrate 2010 to provide a light recycling function by reflecting light 2042 from a backlight 2040 as described in relation to the reflective aperture layer 506 shown in FIG. 5. In some implementations, the reflective layer 2032 is a metal layer. In one example, the reflective layer 2032 is an Al layer. To reduce any parasitic capacitance imparted by the reflective layer 2032 and overlying layers of interconnects, such as the row interconnect 2012, other layers including one or more dielectric layers, such as dielectric layer 2034, can be formed between the reflective layer 2032 and the layer that forms the row interconnects 2012. In some other implementations, the reflective layer 2032 can be patterned so as to be substantially absent in regions with overlying base structures 2016, regions with overlying elevated interconnect sections 2014a and 2014b, or both. In some other implementations, the reflective layer 2032 also can be patterned so as to be substantially absent in regions with overlying row interconnects 2012.

Figure 21A:
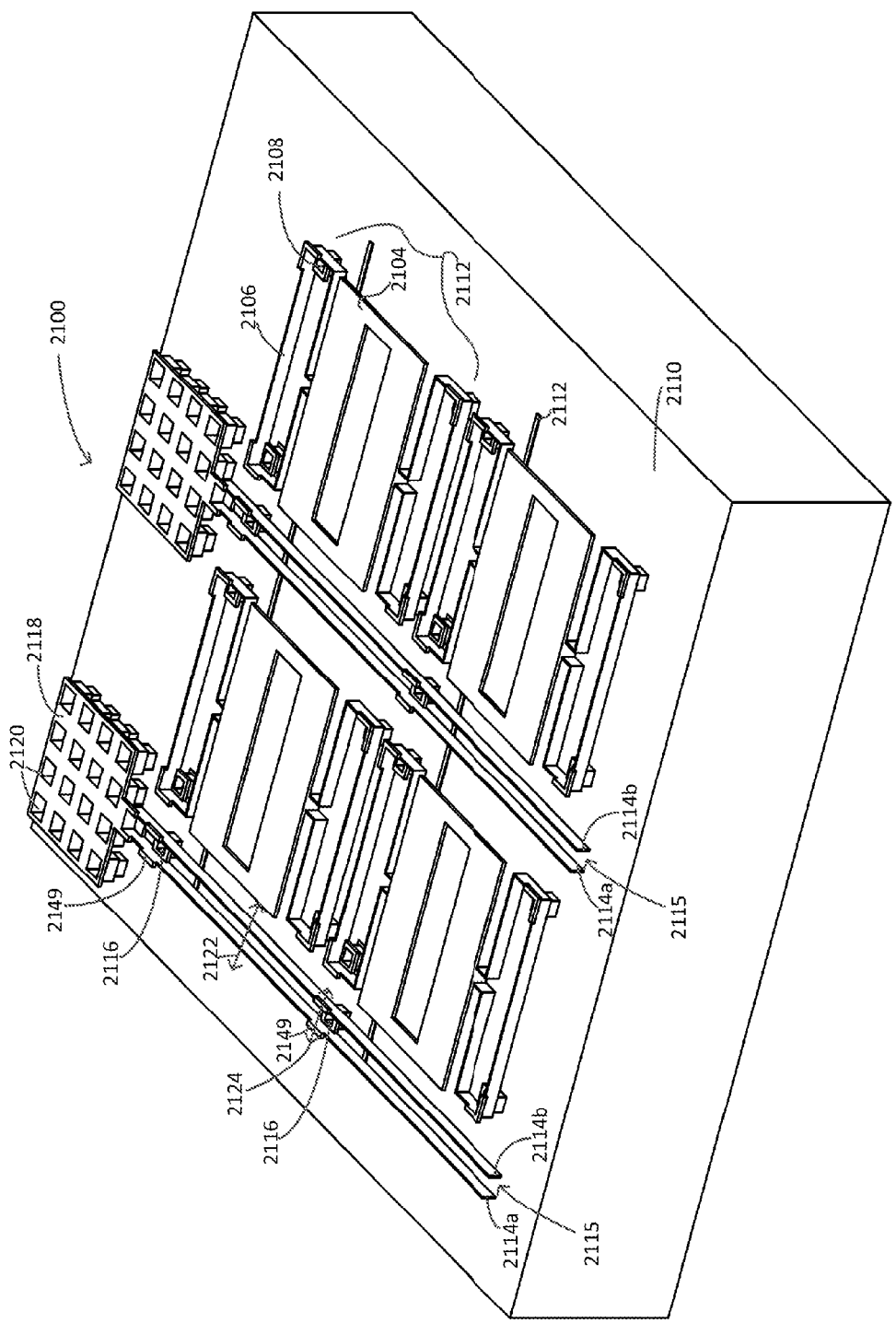
FIG. 21A shows an example perspective view of an EMS-based display apparatus incorporating looped electrical interconnects.

FIG. 21A shows an example perspective view of an EMS-based display apparatus 2100 incorporating looped electrical interconnects 2115. The electrical interconnects 2115 are similar to the electrical interconnects 1715 shown in FIG. 17A except that the electrical interconnects 2115 do not include a horizontal bridge structure that connects the bottom surfaces of two elongate interconnect sections 2114a and 2114b. In addition, unlike the interconnect sections 1714a and 1714b, which include horizontal rims 1743 that form the top surfaces of the interconnect sections 1714a and 1714b and extend throughout the length of the elongate interconnect sections 1714a and 1714b, as shown in FIGS. 17A and 17B, the interconnect sections 2114a and 2114b include horizontal rim portions 2149 that only extend along portions of the elongate interconnect sections 2114a and 2114b that are directly supported by an underlying anchor 2116. Similar to the display apparatus 1700 shown in FIG. 17A and the display apparatus 2000 shown in FIG. 20A, the display apparatus 2100 also includes an array of EMS light modulators 2102 (generally light modulators 2102) arranged in rows and columns over a substrate 2110. Each light modulator 2102 is a shutter-based light modulator, including a shutter 2104 that is supported over underlying layers of the substrate 2110 by beams 2106 and anchors 2108.

The display apparatus 2100 also includes a network of electrical interconnects, including at least one row interconnect 2112 connected to and shared by a row of light modulators 2102 and at least one looped column interconnect 2115 connected to and shared by a column of light modulators 2102. In some implementations, the row interconnects 2112 can correspond to scan-line interconnects or common interconnects, while the looped column interconnects 2115 can correspond to data interconnects.

As depicted in FIG. 21A, each of the column interconnects 2115 is implemented as an elongated loop. That is, each of the column interconnects 2115 defines a boundary that is continuous and encloses an elongated area or space. The elongated loop is formed by two generally elongate sections connected to one another by two end portions at opposite ends of the elongate sections.

The column interconnect 2115 includes the first elongate interconnect section 2114a and the second elongate interconnect section 2114b (generally interconnect sections 2114) that extend lengthwise along the column of the display apparatus 2100. The interconnect sections 2114a and 2114b are connected at one end by a first end portion and at the other end by a second end portion. In some implementations, at one end portion, the interconnect sections 2114a and 2114b meet one another and terminate to close off the loop. At the other end portion, the interconnect sections 2114 are electrically coupled to one another at a terminal anchor 2118 which likewise closes off the loop. In some implementations, both end portions include terminal anchors 2118. In some implementations, both end portions of interconnect sections 2114a and 2114b meet one another and terminate to close off the loop. In some such implementations, terminated end portions may be attached to anchors, such as anchors 2116, or to other terminated interconnect sections.

By implementing the column interconnects 2115 as loops, the column interconnects 2115 can be fully defined by masking stages used to form the EMS shutter assemblies 2102, without increasing the number of masking stages. As described above with respect to FIGS. 18 and 19A-19E, the column interconnects 2115 can be formed as part of a 3-mask process, similar to the process used to form the EMS shutter assemblies 1702 of the display 1700 shown in FIG. 17A.

The interconnect sections 2114a and 2114b are supported over the underlying layers of the substrate 2110 by one or more anchors 2116 and at least one terminal anchor 2118. By elevating or suspending the interconnect sections 2114a and 2114b over underlying layers of the substrate 2110, the capacitive coupling between the interconnect sections 2114a and 2114b and such underlying layers is reduced, thereby decreasing data loading power and/or signal propagation delay of the looped column interconnects 2115.

In some implementations, the interconnect sections 2114a and 2114b are positioned at the same or similar height as various components of the light modulators 2102. For example, the interconnect sections 2114a and 2114b can be suspended at the same or similar height as the shutters 2104, such that an upper surface of at least one interconnect section 2114 is substantially aligned or co-planar with an upper surface of at least one shutter 2104. Such positioning of the interconnect sections 2114a and 2114b and the shutters 2104 can mitigate the likelihood of vertical displacement of the shutters 2104 towards or away from the substrate 2110, which might otherwise result from electrostatic or other interaction between the interconnect sections 2114a and 2114b and the shutters 2104. Such positioning of the interconnect sections 2114a and 2114b can also facilitate direct coupling of the interconnect sections 2114a and 2114b to the shutter 2104 or an actuator coupled to the shutter 2104, avoiding the need to route a signal back to the substrate 2110 via an anchor.

Although FIG. 21A shows an EMS shutter-based display, the looped column interconnects 2115 can be incorporated in other types of displays, such as a display that generates images by modulating light using liquid crystal cells, light taps, or electrowetting cells, as well as a display that generates images by selectively emitting light, such as a plasma or OLED display.

Figure 21B:
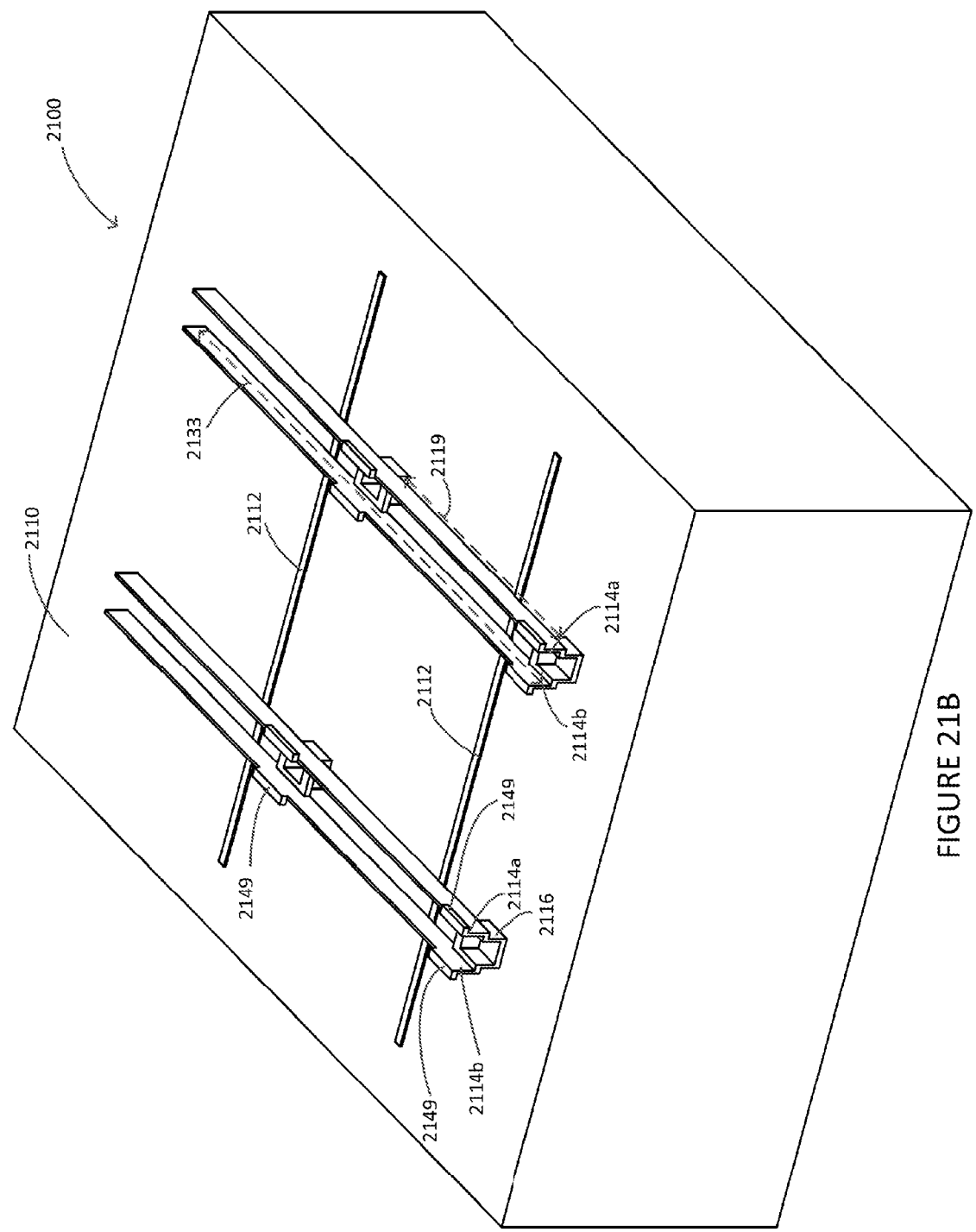
FIG. 21B shows a perspective view of the display apparatus of FIG. 21A.

Referring now to FIGS. 21A and 21B, FIG. 21B shows a perspective view of interconnects included in display apparatus 2100 shown in FIG. 21A. Specifically, FIG. 21B shows the row interconnects 2112, the looped interconnects 2115 and the anchors 2116 shown in FIG. 21A.

The interconnect sections 2114a and 2114b include horizontal rim portions 2149 along a portion of the length of the interconnect sections 2114a and 2114b that is directly supported by the underlying anchor 2116. The remaining portions of the length of the interconnect sections 2114a and 2114b do not include the horizontal rim portions. In some implementations, the horizontal rim portions 2149 have substantially the same thickness as the interconnect sections 2114a and 2114b. This is possible since the horizontal rims 2149, and the interconnect sections 2114a and 2114b are all formed from the same interconnect material.

The looped interconnects 2115 are suspended above the substrate 2110 in part by the anchors 2116. The anchors 2116 are spaced apart from one another by a distance 2119. The row interconnects 2112 extend crosswise through gaps separating the anchors 2116 and beneath the column interconnects 2115. As depicted in FIGS. 21A and 21B, the anchors 2116 contact only a small portion of each of the interconnect sections 2114a and 2114b that the anchors 2116 support. As such, the distance 2119 between neighboring anchors 2116 that support portions of a given interconnect section 2114 of the same looped interconnect 2115 is substantially larger than a corresponding length 2131 of the respective anchors 2116 in a direction along a length 2133 of each of the interconnect sections 2114a and 2114b. In some implementations, the distance between neighboring anchors can be between about 50-200 microns. In some such implementations, the distance between neighboring anchors can be about 100 microns. In some implementations, the length of the anchors 2116 can be between about 5-100 microns. In some such implementations, the length of the anchors 2116 can be about 10 microns. In some such implementations, a length of at least one of the anchors 2116 in a direction towards a neighboring anchor is less than or equal to about 50% of the distance between the neighboring anchors. In some implementations, the length of at least one of the anchors is less than about 10% of a length of the gap separating the neighboring anchors. In some implementations, the length of at least one of the anchors is greater than about 25% of a length of the gap separating the neighboring anchors. In some implementations, the length of at least one of the anchors is greater than about 90% of a length of the gap separating the neighboring anchors. In some implementations, the distance between neighboring anchors is less than about 95%.

In some such implementations, the anchors 2116 are placed at locations proximate to the row interconnects 2112. In doing so, the anchors 2116 can support the interconnect sections 2114a and 2114b at least a minimum distance above the underlying row interconnects 2112 even if the interconnect sections 2114a and 2114b experience some degree of sagging between neighboring anchors 2116. The minimum distance may be a distance large enough to ensure that there is negligible, or at least diminished, capacitive coupling between the interconnect sections 2114a and 2114b and the underlying row interconnects 2112. In some implementations in which the anchors 2116 are conductive, the anchors 2116 may be placed at locations away from the row interconnects 2112 (for example, at least about 5 microns away, or in some implementations, even at least about 10 micrometer away). This is to ensure that the amount of capacitive coupling between the anchor and the row interconnects 2112 is reduced. In some implementations, other factors may determine the location of the anchors 2116 relative to the row interconnects, for example, the location of other electrical components on the surface of the substrate 2110 to which the looped interconnects connect.

The anchors 2116 that suspend the interconnect sections 2114a and 2114b over the underlying substrate 2110 can have properties similar to those previously described with reference to the anchors 1110 depicted in FIG. 11. In some implementations, the anchors 2116 can be made from the same material as the interconnect sections 2114a and 2114b, thereby providing opportunities for forming electrical connections to underlying interconnects or to other components formed on the substrate 2110. In some implementations, one or more of the anchors 2116 also can be formed from non-conductive structural materials, such as dielectrics, including but not limited to silicon oxide and/or silicon nitride As described above, a terminal anchor 2118 forms the second end portions of the interconnect sections 2114a and 2114b. Terminal anchors 2118 are implemented with multiple contacts 2120 to circuitry on or within the substrate 2110 to reduce contact resistance. In some implementations, the circuitry can be connected to one or more drivers, such as data drivers, scan drivers, or common drivers.

In some other implementations, the row interconnects 2112 can be implemented as suspended interconnects, while the column interconnects 2115 can extend crosswise below the row interconnects 2112.

Figure 21C:
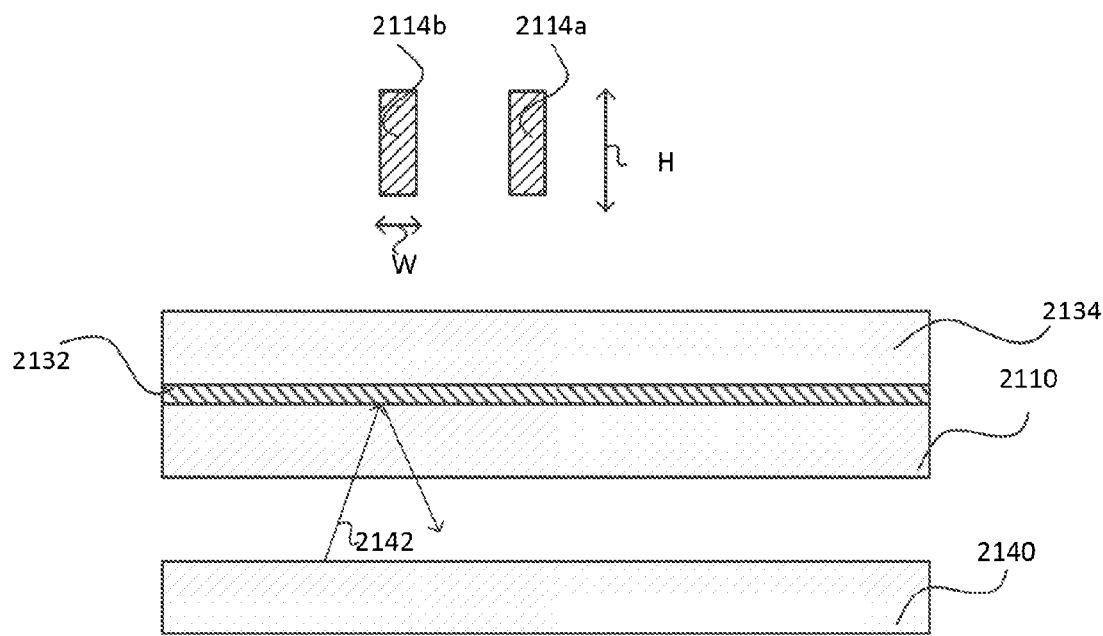
FIGS. 21C and 21D show cross sectional views of portions of the display apparatus of FIG. 21A.
Figure 21D:
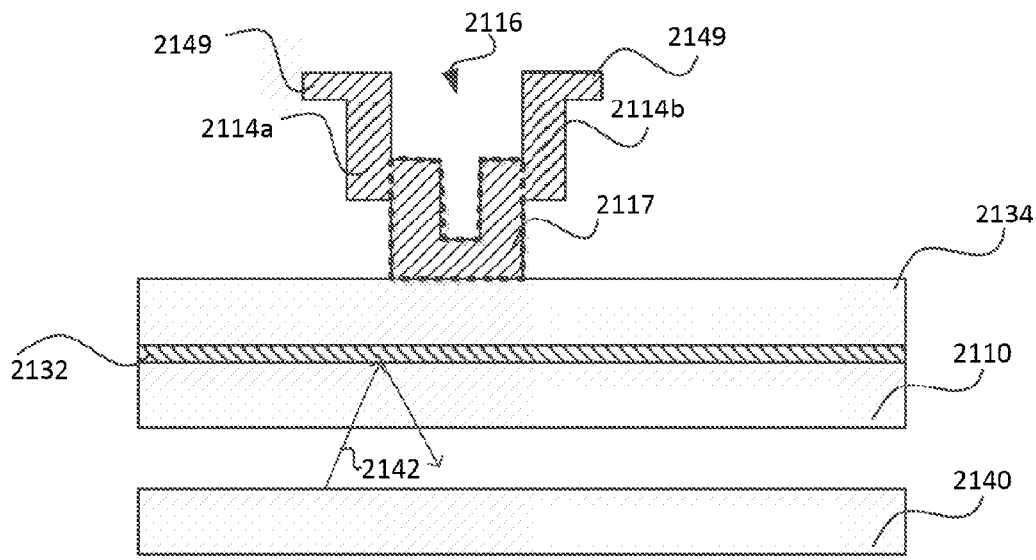

FIGS. 21C and 21D show cross sectional views of portions of the display apparatus 2100 of FIG. 21A. The cross section in FIG. 21C is taken along the line 2122 intersecting the first interconnect section 2114a and the second interconnect section 2114b of FIG. 21A between two neighboring anchors 2116. The cross section in FIG. 21D is taken along line 2124 intersecting an anchor 2116 shown in FIG. 21A.

As shown in FIG. 21C, each of the interconnect sections 2114a and 2114b have an aspect ratio that is greater than 1:1. That is, the heights (H) of the interconnect sections 2114a and 2114b are greater than their respective widths (W), with respect to a plane defined by the substrate 2110. In some implementations, the aspect ratio is at least about 2:1, about 3:1, about 4:1, about 5:1 or even about 10:1 or higher. These tall, thin interconnect sections 2114a and 2114b can be formed using a sidewall manufacturing process, which is described herein with respect to FIGS. 19A-19E. By orienting the interconnect sections 2114a and 2114b vertically according to their higher aspect ratios, more interconnect material is spaced further away from underlying metal layers on the substrate, thereby reducing the capacitive coupling that otherwise could adversely impact the data loading power and/or the signal propagation delay of the interconnect. Even though a cross sectional area of the higher-aspect ratio interconnect sections 2114a and 2114b can be smaller than that of traditional lower-aspect ratio interconnects, the vertical orientation of the higher-aspect ratio interconnect sections 2114a and 2114b and their elevation above the row interconnect 2112 reduce parasitic capacitance sufficiently to mitigate against or offset any detrimental impact the decreased area might have on the interconnect resistance, and hence the signal propagation delay. In some other implementations, the aspect ratio is less than or equal to 1:1.

As shown in FIG. 21D, the anchor 2116 includes a base section 2117, which is formed on the substrate 2110, and portions of the interconnect sections 2114a and 2114b. The anchor 2116 provides support to the interconnect sections 2114a and 2114b with the interconnect sections 2114a and 2114b extending from a top surface of the base section 2117. The portions of the interconnects 2114a and 2114b that are directly supported by the base portion 2117 of the anchor 2116 include horizontal rim portions 2149 formed on a top surface of the interconnect sections 2114a and 2114b. The rim portion 2149 on the first interconnect section 2114a and the rim portion 2149 on the second interconnect section 2114b extend away from one another. The rim portions 2149 can be formed in a manner similar to the method described above with respect to the formation of the horizontal rims 2149 shown in FIG. 21A-21D.

In addition to the anchors 2116 and interconnects 2112 and 2115, one or more layers can be formed over the substrate 2110 beneath the anchors 2116. For example, a reflective layer 2132 is formed over the substrate 2110, and provides a light recycling function by reflecting light 2142 from a backlight 2140, as described with respect to the reflective aperture layer 506 shown in FIG. 5. In some implementations, the reflective layer 2132 is a metal layer. In one example, the reflective layer 2132 is an Al layer. To reduce any parasitic capacitance imparted by the reflective layer 2132 and overlying layers of interconnects, such as the row interconnect 2112, other layers including one or more dielectric layers, such as dielectric layer 2134, can be formed between the reflective layer 2132 and the layer that forms the row interconnects 2112. In some other implementations, the reflective layer 2132 can be patterned so as to be substantially absent in regions with overlying anchors 2116, regions with overlying interconnect sections 2114a and 2114b, or both. In some other implementations, the reflective layer 2132 also can be patterned so as to be substantially absent in regions with overlying row interconnects 2112.

Figure 22A:
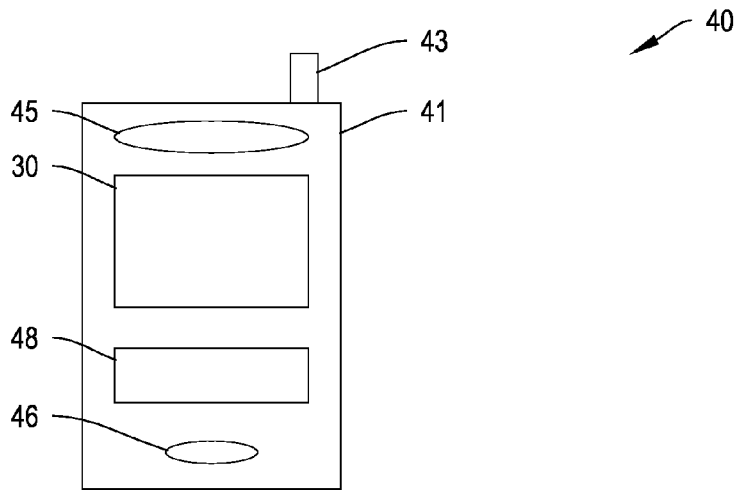
FIGS. 22A and 22B are example system block diagrams illustrating a display device that includes a set of display elements.
Figure 22B:
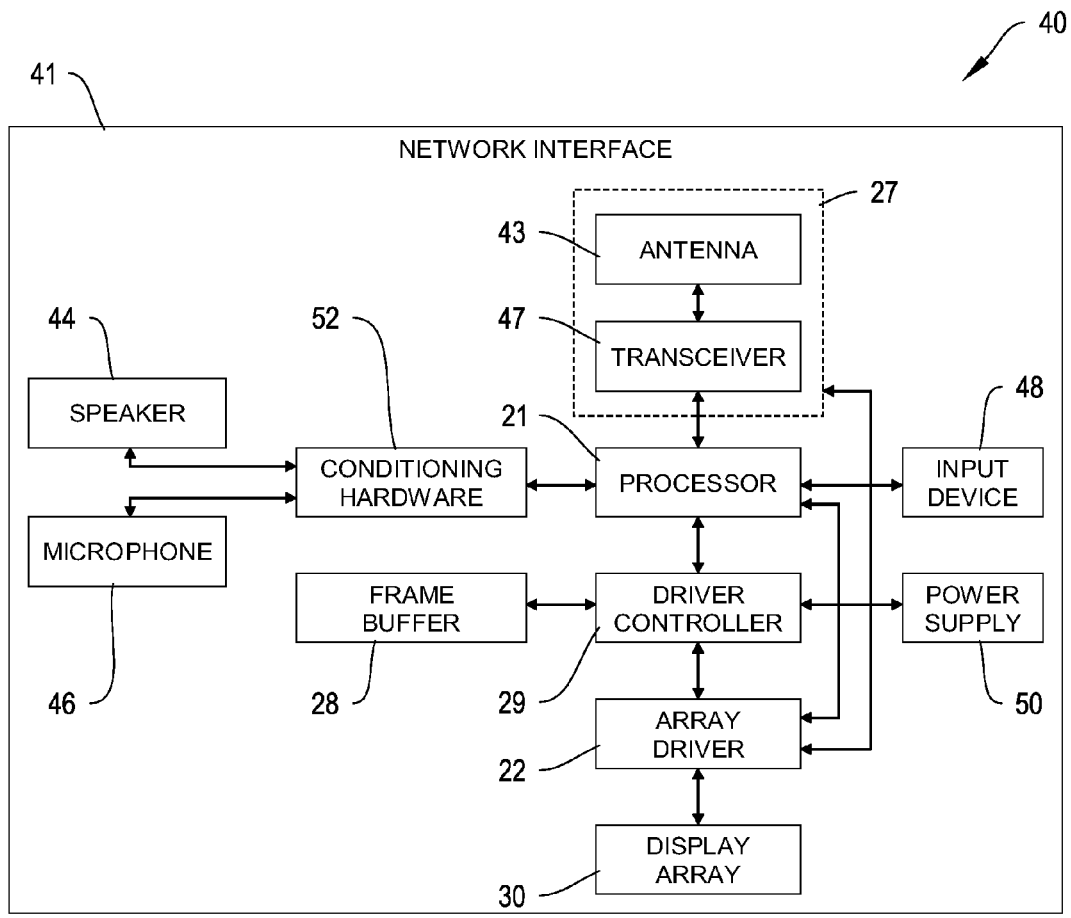

FIGS. 22A and 22B are system block diagrams illustrating a display device 40 that includes a set of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device.

The components of the display device 40 are schematically illustrated in FIG. 22B. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 22B, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HS-DPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller or a bi-stable display controller. Additionally, the array driver 22 can be a conventional driver or a bi-stable display driver. Moreover, the display array 30 can be a conventional display array or a bi-stable display array. In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photo-voltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The invention claimed is:
1. A display apparatus, comprising:
a substrate;
an array of display elements formed on the substrate; and
a high-aspect ratio electrical interconnect connected to at least one display element in the array of display elements, wherein the high-aspect ratio electrical interconnect has an aspect ratio that is greater than at least about

1:1 and less than about 10:1 and wherein the electrical interconnect is elevated over the substrate by a plurality of base structures, wherein a length of at least one of the plurality of base structures in a direction towards a neighboring base structure is greater than about 25% and less than about 95% of a length of a gap separating the neighboring base structures.

2. The display apparatus of claim 1, wherein the electrical interconnect forms a loop that defines a closed boundary.

3. The display apparatus of claim 1, wherein a portion of the elevated electrical interconnect is supported by the base structures and another portion of the elevated interconnect is suspended over the substrate.

4. The display apparatus of claim 1, wherein the base structures are electrically conductive.

5. The display apparatus of claim 1, wherein the electrical interconnect is a first electrical interconnect, and the display apparatus further includes a second electrical interconnect that extends crosswise relative to the first electrical interconnect, and the second electrical interconnect extends below the first electrical interconnect and through the gap separating the neighboring base structures.

6. The display apparatus of claim 5, wherein the length of the first base structure is greater than about 90% and less than about 95% of the length of the gap separating the neighboring base structures.

7. The display apparatus of claim 1, wherein the elevated electrical interconnect includes a pair of interconnect sections connected to one another at a first end portion.

8. The display apparatus of claim 7, wherein the pair of interconnect sections are connected to one another by the base structures along portions of the electrical interconnect where the base structures support the electrical interconnect and wherein the pair of interconnects are connected to one another by a horizontal bridge section that is suspended over the substrate along portions of the electrical interconnect where the electrical interconnect is suspended over the substrate.

9. The display apparatus of claim 7, wherein each of the pair of interconnect sections has a cross sectional aspect ratio that is greater than 1:1 and less than about 10:1.

10. The display apparatus of claim 1, further comprising:
a processor that is configured to communicate with the display, the processor being configured to process image data; and
a memory device that is configured to communicate with the processor.

11. The display apparatus of claim 10, further comprising:
a driver circuit configured to send at least one signal to the display apparatus; and
a controller configured to send at least a portion of the image data to the driver circuit.

12. The display apparatus of claim 10, further comprising:
an image source module configured to send the image data to the processor, wherein the image source module comprises at least one of a receiver, transceiver, and transmitter.

13. The display apparatus of claim 10, further comprising:
an input device configured to receive input data and to communicate the input data to the processor.

* * * * *